US012003946B2

(12) United States Patent
Seefeldt et al.

(10) Patent No.: US 12,003,946 B2
(45) Date of Patent: Jun. 4, 2024

(54) ADAPTABLE SPATIAL AUDIO PLAYBACK

(71) Applicants: DOLBY LABORATORIES LICENSING CORPORATION, San Francisco, CA (US); DOLBY INTERNATIONAL AB, Amsterdam Zuidoost (NL)

(72) Inventors: Alan J. Seefeldt, Alameda, CA (US); Joshua B. Lando, Mill Valley, CA (US); Daniel Arteaga, Barcelona (ES); Glenn N. Dickins, Como (AU); Mark Richard Paul Thomas, Walnut Creek, CA (US)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 179 days.

(21) Appl. No.: 17/630,098

(22) PCT Filed: Jul. 16, 2020

(86) PCT No.: PCT/US2020/042391

§ 371 (c)(1), (2) Date: Jan. 25, 2022

(87) PCT Pub. No.: WO2021/021460

PCT Pub. Date: Feb. 4, 2021

(65) Prior Publication Data

US 2022/0337969 A1 Oct. 20, 2022

Related U.S. Application Data

(60) Provisional application No. 62/705,410, filed on Jun. 25, 2020, provisional application No. 62/705,351, (Continued)

(30) Foreign Application Priority Data

Jul. 30, 2019 (ES) ................................ ES201930702
Dec. 18, 2019 (EP) .................................... 19217580

(51) Int. Cl.
*H04S 7/00* (2006.01)
*H04R 5/02* (2006.01)

(52) U.S. Cl.
CPC ............... *H04S 7/302* (2013.01); *H04R 5/02* (2013.01)

(58) Field of Classification Search
None
See application file for complete search history.

(56) References Cited

U.S. PATENT DOCUMENTS 8,208,663 B2 6/2012 Jeong
9,031,268 B2 5/2015 Fejzo
(Continued)

FOREIGN PATENT DOCUMENTS

CN 104010265 A 8/2014
CN 104604257 A 5/2016
(Continued)

OTHER PUBLICATIONS

A. Plinge, G. A. Fink and S. Gannot, "Passive Online Geometry Calibration of Acoustic Sensor Networks," IEEE Signal Processing Letters, vol. 24, No. 3, pp. 324-328, Mar. 2017.
(Continued)

*Primary Examiner* — Kenny H Truong

(57) ABSTRACT

A rendering mode may be determined for received audio data, including audio signals and associated spatial data. The audio data may be rendered for reproduction via a set of loudspeakers of an environment according to the rendering mode, to produce rendered audio signals. Rendering the audio data may involve determining relative activation of a (Continued)

set of loudspeakers in an environment. The rendering mode may be variable between a reference spatial mode and one or more distributed spatial modes. The reference spatial mode may have an assumed listening position and orientation. In the distributed spatial mode(s), one or more elements of the audio data may each be rendered in a more spatially distributed manner than in the reference spatial mode and spatial locations of remaining elements of the audio data may be warped such that they span a rendering space of the environment more completely than in the reference spatial mode.

29 Claims, 35 Drawing Sheets

Related U.S. Application Data filed on Jun. 23, 2020, provisional application No. 62/992,068, filed on Mar. 19, 2020, provisional application No. 62/971,421, filed on Feb. 7, 2020, provisional application No. 62/949,998, filed on Dec. 18, 2019, provisional application No. 62/880,114, filed on Jul. 30, 2019.

(56) References Cited

U.S. PATENT DOCUMENTS 9,086,475 B2 7/2015 Kleijn
9,215,545 B2 12/2015 Dublin
9,264,806 B2 2/2016 Hyun
9,316,717 B2 4/2016 Gicklhorn
9,396,731 B2 7/2016 Herre
9,549,253 B2 1/2017 Alexandridis
9,900,694 B1 2/2018 List
9,942,686 B1 4/2018 Family
9,955,253 B1 4/2018 Chavez
10,075,791 B2 9/2018 Milne
10,097,944 B2 10/2018 Christoph
10,142,758 B2 11/2018 Sikora
10,506,361 B1 12/2019 Pallamsetty
2011/0316996 A1 12/2011 Abe
2012/0230497 A1 9/2012 Dressler
2014/0119581 A1* 5/2014 Tsingos .................. H04S 3/008 381/300
2014/0172435 A1 6/2014 Thiergart
2015/0016642 A1 1/2015 Walsh
2015/0128194 A1 5/2015 Kuang
2015/0131966 A1 5/2015 Zurek
2016/0080886 A1* 3/2016 De Bruijn ................ H04R 5/02 381/17
2016/0134988 A1 5/2016 Gorzel
2016/0142763 A1 5/2016 Kim
2016/0322062 A1 11/2016 Li
2016/0337755 A1 11/2016 Bagby
2017/0012591 A1 1/2017 Rider
2017/0086008 A1* 3/2017 Robinson .................. H04S 7/30
2017/0125023 A1 5/2017 Oh
2017/0280264 A1 9/2017 Wang
2017/0374465 A1 12/2017 Family
2018/0060025 A1 3/2018 Hill
2018/0165054 A1 6/2018 Kang
2018/0184199 A1 6/2018 Fontana
2018/0192223 A1 7/2018 Satheesh
2018/0249267 A1 8/2018 Klingler
2018/0288556 A1 10/2018 Kyung
2018/0332420 A1 11/2018 Salume
2018/0357038 A1 12/2018 Olivieri
2019/0104366 A1 4/2019 Johnson
2019/0124458 A1 4/2019 Sheen
2019/0158974 A1 5/2019 Tsingos
2019/0166447 A1 5/2019 Seldess

FOREIGN PATENT DOCUMENTS

CN 104054126 A 3/2017
CN 104604256 A 9/2017
CN 105637901 A 1/2018
CN 105191354 A 7/2018
EP 1206161 A1 5/2002
EP 3148224 A2 3/2017
EP 3209034 A1 8/2017
EP 3032847 B1 1/2020
EP 3223542 B1 4/2021
GB 2561844 A 10/2018
WO 2014007724 A1 1/2014
WO 2015017037 A1 2/2015
WO 2016048381 A1 3/2016
WO 2017039632 A1 3/2017
WO 2018064410 A1 4/2018
WO 2018202324 A1 11/2018
WO 19012131 W 1/2019
WO 2019004524 A1 1/2019
WO 2019067620 A1 4/2019
WO 2019089322 5/2019
WO 2020232180 11/2020

OTHER PUBLICATIONS

Lee, Chang Ha "Location-Aware Speakers for the Virtual Reality Environments" IEEE Access, vol. 5, pp. 2636-2640, Feb. 2017.
Nielsen, Jesper Kjaer "Loudspeaker and Listening Position Estimation Using Smart Speakers" IEEE International Conference on Acoustics, Speech and Signal Processing, Apr. 2018, pp. 81-85.
Plinge, A. et al Acoustic Microphone Geometry Calibration: An overview and Experimental Evaluation of State-of-the-Art Algorithm: IEEE, Jul. 2016.
Plinge, A. et al "Geometry Calibration of Distributed Microphone Arrays Exploiting Audio-Visual Correspondences" IEEE Conference Location: Lisbon, Portugal Sep. 2014.
Spatal Audio for VR: An Overview, Feb. 15, 2018.

* cited by examiner

900

2200a

2200b

ADAPTABLE SPATIAL AUDIO PLAYBACK

CROSS REFERENCE TO RELATED APPLICATIONS

This application is U.S. national stage of PCT/US2020/042391 filed Jul. 16, 2020, which claims following priorities:

U.S. Provisional Patent Application No. 62/880,114, filed Jul. 30, 2019;

Spanish Patent Application No. P201930702, filed 30 Jul. 2019;

European Patent Application No. 19217580.0, filed 18 Dec. 2019;

U.S. Provisional Patent Application No. 62/949,998, filed Dec. 18, 2019;

U.S. Provisional Patent Application No. 62/971,421, filed 7 Feb. 2020;

U.S. Provisional Patent Application No. 62/992,068, filed 19 Mar. 2020

U.S. Provisional Patent Application No. 62/705,351, filed Jun. 23, 2020; and

U.S. Provisional Patent Application No. 62/705,410, filed 25 Jun. 2020; each of which is hereby incorporated by reference in its entirety.

TECHNICAL FIELD

This disclosure pertains to systems and methods for playback, and rendering for playback, of audio by some or all speakers of a set of speakers.

BACKGROUND

Audio devices, including but not limited to smart audio devices, have been widely deployed and are becoming common features of many homes. Although existing systems and methods for controlling audio devices provide benefits, improved systems and methods would be desirable.

Notation and Nomenclature

Throughout this disclosure, including in the claims, "speaker" and "loudspeaker" are used synonymously to denote any sound-emitting transducer (or set of transducers) driven by a single speaker feed. A typical set of headphones includes two speakers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Herein, we use the expression "smart audio device" to denote a smart device which is either a single purpose audio device or a multi-purpose audio device (e.g., an audio device that implements at least some aspects of virtual assistant functionality) A single purpose audio device is a device (e.g., a TV or a mobile phone) including or coupled to at least one microphone (and optionally also including or coupled to at least one speaker and/or at least one camera) and which is designed largely or primarily to achieve a single purpose. Although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single purpose audio device having speaker(s) and microphone(s) is often configured to run a local application and/or service to use the speaker(s) and microphone(s) directly. Some single purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera) and which may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a very discrete and conditionally defined way. For example, two or more virtual assistants may work together in the sense that one of them, i.e., the one which is most confident that it has heard a wakeword, responds to the word. The connected devices may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (i.e., is listening for) a sound command. In some instances, what may be referred to herein as a "wake-word" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a good compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

SUMMARY

Some embodiments involve methods for rendering (or rendering and playback) of a spatial audio mix (e.g., rendering of a stream of audio or multiple streams of audio) for playback by at least one (e.g., all or some) of the smart audio devices of a set of smart audio devices, and/or by at least one (e.g., all or some) of the speakers of another set of speakers. Some embodiments are methods (or systems) for such rendering (e.g., including generation of speaker feeds), and also playback of the rendered audio (e.g., playback of generated speaker feeds).

A class of embodiments involve methods for rendering (or rendering and playback) of audio by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some of (i.e., by speaker(s) included in or coupled to all or some of) the smart audio devices.

In accordance with some embodiments, operation of a flexible renderer (e.g., to render a spatial audio mix) is variable between a reference mode (which assumes a listener having a listening position and orientation relative to the speakers which are to play the rendered audio) and a distributed mode. The reference mode may be referred to herein as a "reference spatial mode." The distributed mode may be referred to herein as a "distributed spatial mode." To render a spatial audio mix in the distributed mode, the renderer (a rendering system) may render at least one element (e.g., certain elements) of the spatial audio mix in a manner more spatially distributed than the reference mode while leaving at least one other element of the mix spatialized. For example, in the distributed mode, elements (for example rendered content) of the mix deemed important (e.g., content which would be rendered, in the reference mode, as front soundstage) can be distributed uniformly across the speakers, while the surround field of the mix is (e.g., content which would be rendered, in the reference mode, as a surround field) of the mix may be rendered with relatively more spatial diversity across the listening area. Such variable rendering operations can strike a balance between uniformity of coverage (playback, of some content of the mix, with uniformity within the listening area or within a zone of the listening area) and maintenance of the mix's spatial interest.

In some embodiments which render audio for playback by speaker(s) included in (or coupled to) at least one smart audio device (e.g., all or some smart audio devices) of a set of smart audio devices (e.g., a set of coordinated smart audio devices, for example, a set of connected smart speakers) in a space, some aspects of the rendering may be advantageously controlled by a user's voice input. For example, the intended listening position and orientation (of the reference mode) may be dynamically set based on detection of a user's location from the user's voice input. In some embodiments, switching to the distributed mode may be achieved in response to an explicit voice command. However, in other embodiments switching to the distributed mode may be based on other user input (e.g., input to a graphical user interface (GUI) such as those disclosed herein) or in response to automatic detection of a number of people in the space. In some embodiments, a continuously variable control between the reference mode and the distributed mode may be implemented. In some such embodiments, a continuously variable control between the reference spatial mode and the distributed mode may be implemented according to user input, e.g., via a "slider," a control knob, etc., depicted in a GUI.

In a class of embodiments, an audio rendering system may render at least one audio stream (e.g., a plurality of audio streams for simultaneous playback), and/or plays the rendered stream(s) over a plurality of arbitrarily placed loudspeakers, wherein at least one (e.g., two or more) of said program stream(s) is (or determines) a spatial mix.

Some aspects of the disclosure include a system configured (e.g., programmed) to perform one or more disclosed methods or steps thereof, and a tangible, non-transitory, computer readable medium which implements non-transitory storage of data (for example, a disc or other tangible storage medium) which stores code for performing (e.g., code executable to perform) one or more embodiments of the disclosed methods or steps thereof. For example, embodiments of the disclosed system can be or include a programmable general purpose processor, digital signal processor, or microprocessor, programmed with software or firmware and/or otherwise configured to perform any of a variety of operations on data, including an embodiment of the disclosed method or steps thereof. Such a general purpose processor may be or include a computer system including an input device, a memory, and a processing subsystem that is programmed (and/or otherwise configured) to perform an embodiment of the disclosed method (or steps thereof) in response to data asserted thereto.

In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some implementations, the control system is configured for receiving audio data via the interface system. In some examples, the audio data includes one or more audio signals and associated spatial data, the spatial data indicating an intended perceived spatial position corresponding to an audio signal. In some instances, the spatial data includes at least one of channel data or spatial metadata.

In some examples, the control system is configured for determining a rendering mode and for rendering the audio data for reproduction via a set of loudspeakers of an environment according to the rendering mode, to produce rendered audio signals. According to some such examples, rendering the audio data involves determining relative activation of a set of loudspeakers in an environment. In some such examples, the rendering mode is variable between a reference spatial mode and one or more distributed spatial modes. According to some such examples, the reference spatial mode has an assumed listening position and orientation. In some such examples, in the one or more distributed spatial modes, one or more elements of the audio data is or are each rendered in a more spatially distributed manner than in the reference spatial mode and spatial locations of remaining elements of the audio data are warped such that they span a rendering space of the environment more completely than in the reference spatial mode. According to some such implementations, the control system is configured for providing, via the interface system, the rendered audio signals to at least some loudspeakers of the set of loudspeakers of the environment.

In some implementations, determining the rendering mode may involve receiving, via the interface system, a rendering mode indication. In some such implementations, receiving the rendering mode indication may involve receiving microphone signals corresponding to a voice command. In some examples, the rendering mode may be selectable from a continuum of rendering modes ranging from the reference spatial mode to a most distributed spatial mode.

According to some examples, the audio processing system may include a display device and a sensor system proximate the display device. In some such examples, the control system may be further configured for controlling the display device to present a graphical user interface. Receiving the rendering mode indication may involve receiving sensor signals corresponding to user input via the graphical user interface. In some examples, the sensor signals may be touch sensor signals or gesture sensor signals.

In some implementations, receiving the rendering mode indication may involve receiving an indication of a number of people in a listening area. In some such implementations, the control system may be further configured for determining the rendering mode based, at least in part, on the number of people in the listening area. In some such implementations, the indication of the number of people in the listening area may be based on at least one of microphone data from a microphone system or image data from a camera system.

According to some examples, the control system may be configured to determine the assumed listening position and/or orientation of the reference spatial mode according to reference spatial mode data received via the interface system. In some instances, the reference spatial mode data may include microphone data from a microphone system and/or image data from a camera system.

As noted above, according to some examples the audio processing system may include a display device and a sensor system proximate the display device. In some such examples, the control system may be further configured for controlling the display device to present a graphical user interface. In some such instances, receiving reference spatial mode data may involve receiving sensor signals corresponding to user input via the graphical user interface.

In some implementations, the one or more elements of the audio data each rendered in a more spatially distributed manner may correspond to one or more of front sound stage data, music vocals, dialogue, bass, percussion, or other solo or lead instruments. In some such examples, the front sound stage data may include one or more of the left, right or center signals of audio data received in, or upmixed to, a Dolby 5.1, Dolby 7.1 or Dolby 9.1 format. In some examples, the front sound stage data may include audio data received in Dolby Atmos format and having spatial metadata indicating an (x,y) spatial position wherein $y<0.5$.

According to some examples, the audio data may include spatial distribution metadata indicating which elements of the audio data are to be rendered in a more spatially distributed manner. In some such examples, the control system may be configured for identifying the one or more elements of the audio data to be rendered in a more spatially distributed manner according to the spatial distribution metadata. Alternatively, or additionally, the control system may be configured for implementing a content type classifier to identify the one or more elements of the audio data to be rendered in a more spatially distributed manner.

In some instances, at least one of the one or more distributed spatial modes may involve applying a time-varying modification to the spatial location of the at least one element. According to some examples, the time-varying modification may be a periodic modification. In some instances, the periodic modification may correspond with user input, a tempo of music being reproduced in the environment, a beat of music being reproduced in the environment, and/or one or more other features of audio data being reproduced in the environment.

In some examples, rendering the one or more elements of the audio data in a more spatially distributed manner than in the reference spatial mode may involve creating copies of the one or more elements. Some such examples may involve rendering all of the copies simultaneously at a distributed set of positions across the environment.

According to some examples, the rendering may be based on Center of Mass Amplitude Panning, Flexible Virtualization or a combination thereof. In some such examples, rendering the one or more elements of the audio data in a more spatially distributed manner than in the reference spatial mode may involve warping a rendering position of each of the one or more elements towards a zero radius.

At least some aspects of the present disclosure may be implemented via methods, such as audio processing methods. In some instances, the methods may be implemented, at least in part, by a control system such as those disclosed herein. Some such methods may involve receiving audio data by a control system and via an interface system. In some examples, the audio data includes one or more audio signals and associated spatial data, the spatial data indicating an intended perceived spatial position corresponding to an audio signal. In some examples, the audio data includes channel data and/or spatial metadata.

Some such methods may involve determining, by the control system, a rendering mode and rendering, by the control system, the audio data for reproduction via a set of loudspeakers of an environment according to the rendering mode, to produce rendered audio signals. According to some such examples, rendering the audio data involves determining relative activation of a set of loudspeakers in an environment. In some such examples, the rendering mode is variable between a reference spatial mode and one or more distributed spatial modes. According to some such examples, the reference spatial mode has an assumed listening position and orientation. In some such examples, in the one or more distributed spatial modes, one or more elements of the audio data is or are each rendered in a more spatially distributed manner than in the reference spatial mode and spatial locations of remaining elements of the audio data are warped such that they span a rendering space of the environment more completely than in the reference spatial mode. According to some such implementations, the method involves providing, via the interface system, the rendered audio signals to at least some loudspeakers of the set of loudspeakers of the environment.

In some implementations, determining the rendering mode may involve receiving, via the interface system, a rendering mode indication. In some such implementations, receiving the rendering mode indication may involve receiving microphone signals corresponding to a voice command. In some examples, the rendering mode may be selectable from a continuum of rendering modes ranging from the reference spatial mode to a most distributed spatial mode.

According to some examples, the method may involve controlling a display device to present a graphical user interface. Receiving the rendering mode indication may involve receiving sensor signals corresponding to user input via the graphical user interface. In some examples, the sensor signals may be touch sensor signals or gesture sensor signals.

In some implementations, receiving the rendering mode indication may involve receiving an indication of a number of people in a listening area. In some such implementations, the method may involve determining the rendering mode based, at least in part, on the number of people in the listening area. In some such implementations, the indication of the number of people in the listening area may be based on at least one of microphone data from a microphone system or image data from a camera system.

According to some examples, the method may involve determining the assumed listening position and/or orientation of the reference spatial mode according to reference spatial mode data received via the interface system. In some instances, the reference spatial mode data may include microphone data from a microphone system and/or image data from a camera system.

In some implementations, the one or more elements of the audio data each rendered in a more spatially distributed manner may correspond to one or more of front sound stage data, music vocals, dialogue, bass, percussion, or other solo or lead instruments. In some such examples, the front sound stage data may include one or more of the left, right or center signals of audio data received in, or upmixed to, a Dolby 5.1, Dolby 7.1 or Dolby 9.1 format. In some examples, the front sound stage data may include audio data received in Dolby Atmos format and having spatial metadata indicating an (x,y) spatial position wherein $y<0.5$.

According to some examples, the audio data may include spatial distribution metadata indicating which elements of the audio data are to be rendered in a more spatially distributed manner. In some such examples, the method may involve identifying the one or more elements of the audio data to be rendered in a more spatially distributed manner according to the spatial distribution metadata. Alternatively, or additionally, the method may involve implementing a content type classifier to identify the one or more elements of the audio data to be rendered in a more spatially distributed manner.

In some instances, at least one of the one or more distributed spatial modes may involve applying a time-varying modification to the spatial location of the at least one element. According to some examples, the time-varying modification may be a periodic modification. In some instances, the periodic modification may correspond with user input, a tempo of music being reproduced in the environment, a beat of music being reproduced in the environment, and/or one or more other features of audio data being reproduced in the environment.

In some examples, rendering the one or more elements of the audio data in a more spatially distributed manner than in the reference spatial mode may involve creating copies of the one or more elements. Some such examples may involve rendering all of the copies simultaneously at a distributed set of positions across the environment.

According to some examples, the rendering may be based on Center of Mass Amplitude Panning, Flexible Virtualization or a combination thereof. In some such examples, rendering the one or more elements of the audio data in a more spatially distributed manner than in the reference spatial mode may involve warping a rendering position of each of the one or more elements towards a zero radius.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method that involves audio processing. Some such methods may involve receiving audio data by a control system and via an interface system. In some examples, the audio data includes one or more audio signals and associated spatial data, the spatial data indicating an intended perceived spatial position corresponding to an audio signal. In some examples, the audio data includes channel data and/or spatial metadata.

Some such methods may involve determining, by the control system, a rendering mode and rendering, by the control system, the audio data for reproduction via a set of loudspeakers of an environment according to the rendering mode, to produce rendered audio signals. According to some such examples, rendering the audio data involves determining relative activation of a set of loudspeakers in an environment. In some such examples, the rendering mode is variable between a reference spatial mode and one or more distributed spatial modes. According to some such examples, the reference spatial mode has an assumed listening position and orientation. In some such examples, in the one or more distributed spatial modes, one or more elements of the audio data is or are each rendered in a more spatially distributed manner than in the reference spatial mode and spatial locations of remaining elements of the audio data are warped such that they span a rendering space of the environment more completely than in the reference spatial mode. According to some such implementations, the method involves providing, via the interface system, the rendered audio signals to at least some loudspeakers of the set of loudspeakers of the environment.

In some implementations, determining the rendering mode may involve receiving, via the interface system, a rendering mode indication. In some such implementations, receiving the rendering mode indication may involve receiving microphone signals corresponding to a voice command. In some examples, the rendering mode may be selectable from a continuum of rendering modes ranging from the reference spatial mode to a most distributed spatial mode.

According to some examples, the method may involve controlling a display device to present a graphical user interface. Receiving the rendering mode indication may involve receiving sensor signals corresponding to user input via the graphical user interface. In some examples, the sensor signals may be touch sensor signals or gesture sensor signals.

In some implementations, receiving the rendering mode indication may involve receiving an indication of a number of people in a listening area. In some such implementations, the method may involve determining the rendering mode based, at least in part, on the number of people in the listening area. In some such implementations, the indication of the number of people in the listening area may be based on at least one of microphone data from a microphone system or image data from a camera system.

According to some examples, the method may involve determining the assumed listening position and/or orientation of the reference spatial mode according to reference spatial mode data received via the interface system. In some instances, the reference spatial mode data may include microphone data from a microphone system and/or image data from a camera system.

In some implementations, the one or more elements of the audio data each rendered in a more spatially distributed manner may correspond to one or more of front sound stage data, music vocals, dialogue, bass, percussion, or other solo or lead instruments. In some such examples, the front sound stage data may include one or more of the left, right or center signals of audio data received in, or upmixed to, a Dolby 5.1, Dolby 7.1 or Dolby 9.1 format. In some examples, the front sound stage data may include audio data received in Dolby Atmos format and having spatial metadata indicating an (x,y) spatial position wherein $y<0.5$.

According to some examples, the audio data may include spatial distribution metadata indicating which elements of the audio data are to be rendered in a more spatially distributed manner. In some such examples, the method may involve identifying the one or more elements of the audio data to be rendered in a more spatially distributed manner according to the spatial distribution metadata. Alternatively, or additionally, the method may involve implementing a content type classifier to identify the one or more elements of the audio data to be rendered in a more spatially distributed manner.

In some instances, at least one of the one or more distributed spatial modes may involve applying a time-varying modification to the spatial location of the at least one element. According to some examples, the time-varying modification may be a periodic modification. In some instances, the periodic modification may correspond with user input, a tempo of music being reproduced in the environment, a beat of music being reproduced in the environment, and/or one or more other features of audio data being reproduced in the environment.

In some examples, rendering the one or more elements of the audio data in a more spatially distributed manner than in the reference spatial mode may involve creating copies of the one or more elements. Some such examples may involve rendering all of the copies simultaneously at a distributed set of positions across the environment.

According to some examples, the rendering may be based on Center of Mass Amplitude Panning, Flexible Virtualization or a combination thereof. In some such examples, rendering the one or more elements of the audio data in a more spatially distributed manner than in the reference spatial mode may involve warping a rendering position of each of the one or more elements towards a zero radius.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1:
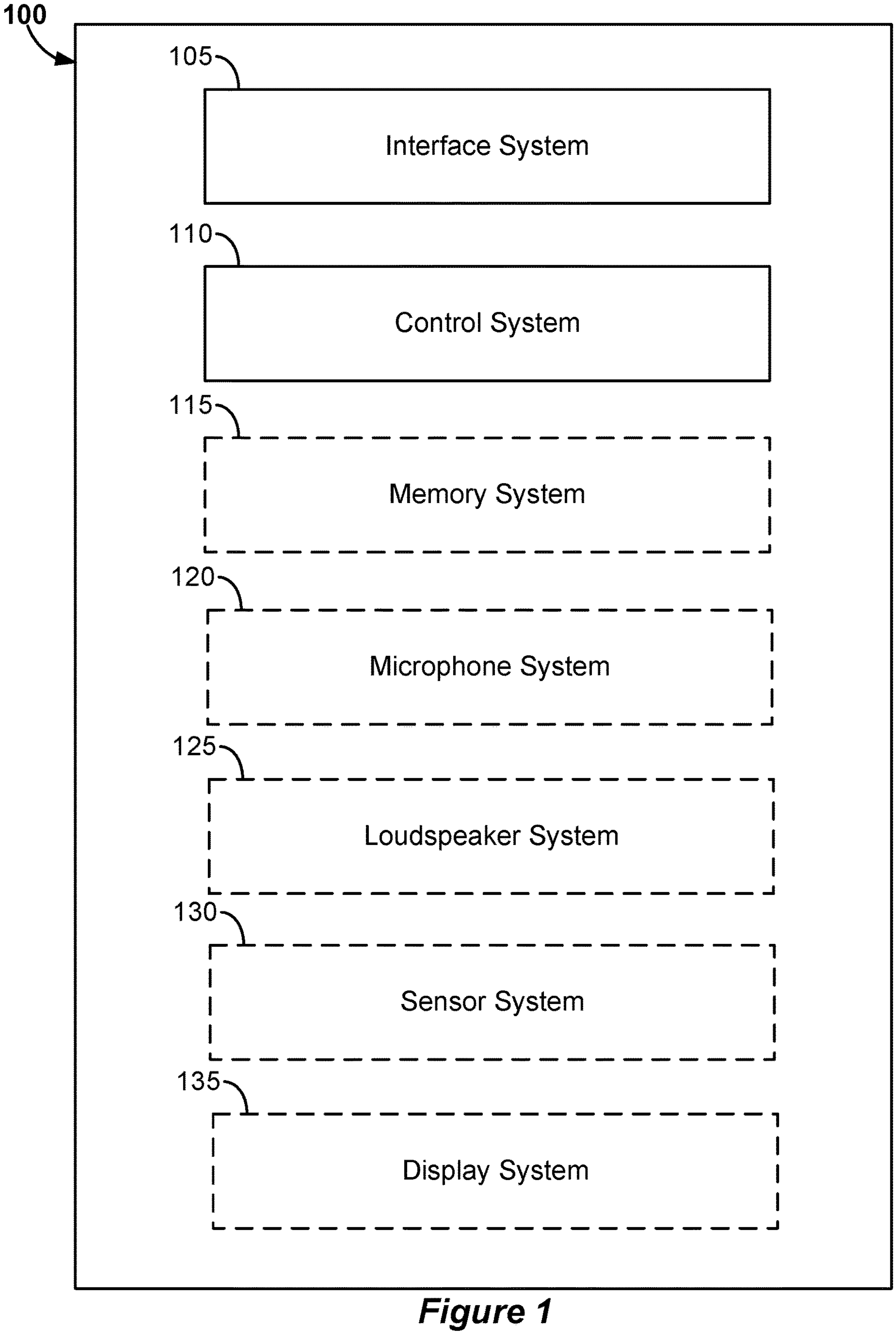
FIG. 1 is a block diagram that shows examples of components of an apparatus capable of implementing various aspects of this disclosure.

In flexible rendering, spatial audio may be rendered over an arbitrary number of arbitrarily placed speakers. With the widespread deployment of smart audio devices (e.g., smart speakers) in the home, there is need for realizing flexible rendering technology which allows consumers to perform flexible rendering of audio, and playback of the so-rendered audio, using smart audio devices.

Several technologies have been developed to implement flexible rendering, including: Center of Mass Amplitude Panning (CMAP), and Flexible Virtualization (FV).

Current flexible rendering contemplates rendering spatial audio program material in a reference spatial mode where there is an assumed listening position and orientation. In other words, a person seated in the assumed listening position and orientation will hear the mix in a manner meant to approximate how the content creator heard the mix in the studio. For example, with a movie soundtrack, dialog will typically come from in front of the listener and surround sound from behind the listener. Similarly for music, vocals will in general come from in front of the listener. This works well for listeners in or near the intended listening position, but there are cases, such as a party, where numerous people may be spread across the space within which the set of loudspeakers are placed. In the reference rendering mode just described, the experience for different listeners may vary dramatically. For example, when music is playing, someone at the notional front of the room might be blasted by vocals, while someone at the back of the room might hear mostly diffuse ambience from the mix. A simple existing solution to this problem is to send the same mix of the audio program to all speakers so that everyone hears the same thing. Indeed, many conventional whole home audio solutions do just that. With such a solution, however, the spatial aspects of the audio mix across the listening space are completely lost.

Some disclosed embodiments involve systems and methods for rendering (or rendering and playback) of a spatial audio mix (e.g., rendering of a stream of audio or multiple streams of audio) for playback by at least one (e.g., all or some) of the smart audio devices of a set of smart audio devices (e.g., a set of coordinated smart audio devices), and/or by at least one (e.g., all or some) of the speakers of another set of speakers. Some embodiments are methods (or systems) for such rendering (e.g., including generation of speaker feeds), and also playback of the rendered audio (e.g., playback of generated speaker feeds). Examples of such embodiments include the following enumerated example embodiments (EEEs):

EEE1. An audio rendering method which renders (or an audio rendering system which is configured to render) at least one spatial audio program stream for playback over a plurality of speakers (e.g., arbitrarily placed loudspeakers), wherein said rendering is variable between a reference spatial mode (having an assumed listening position and orientation) and at least one (e.g., a) distributed spatial mode, wherein in the distributed spatial mode (or in each distributed spatial mode), one or more elements (i.e., some content indicated by) of the spatial audio program stream(s) is or are rendered in a more spatially distributed (i.e. distributed more uniformly across the speakers in the listening area manner than in the reference spatial mode;

EEE2. The method or system of claim EEE1, wherein said one or more elements of the spatial audio program stream(s) are, or are part of (e.g., are indicative of audio for playback as or by), a front sound stage, wherein a front sound stage comprises an area of a reference listening environment forward of a reference listening position and orientation.

EEE3. The method or system of claim EEE2, wherein for (or in) the distributed spatial mode, the spatial locations of the remaining elements of the spatial audio program stream(s) (i.e., the elements other than the one or more elements which are or are part of the front sound stage) are warped such that they span the rendering space (e.g., the listening space in which the rendered audio is to be played) more completely (than in the reference spatial mode);

EEE4. The method or system of any one of claims EEE1-EEE3, wherein said one or more elements of the spatial audio program stream(s) are identified by associated metadata labeling them as appropriate for distributed playback (e.g., in a distributed spatial mode);

EEE5. The method or system of any one of claims EEE1-EEE4, wherein the assumed listening position and orientation of (e.g., associated with) the reference spatial mode is dynamically set by a user (e.g., a user of the system);

EEE6. The method or system of claim EEE5, wherein the listening position and orientation is derived from the voice of said user as captured by one or more microphones (e.g., one or more microphones of or associated with said rendering system);

EEE7. The method or system of any one of claims EEE1-EEE6, wherein the variable setting between the two rendering modes (i.e., the distributed spatial mode and the reference spatial mode) is controlled by the voice of a user;

EEE8. The method or system of claim EEE7, wherein setting to the reference spatial mode is achieved by the user uttering a predetermined phrase (e.g., the phrase "Play [optionally insert name of content] for me" or the phrase "Play [optionally insert name of content] in personal mode");

EEE9. The method or system of claim EEE7, wherein setting to the distributed spatial mode is achieved by the user uttering a predetermined phrase (e.g., the phrase "Play [optionally insert name of content] in distributed mode"); and EEE10. The method or system of any one of claims EEE1-EEE9, wherein variable setting between the two rendering modes (i.e., the distributed spatial mode and the reference spatial mode) is automatically set according to detection of the number of people in a listening area (e.g., using one of more sensors of or associated with said rendering system).

FIG. 1 is a block diagram that shows examples of components of an apparatus capable of implementing various aspects of this disclosure. According to some examples, the apparatus 100 may be, or may include, a smart audio device that is configured for performing at least some of the methods disclosed herein. In other implementations, the apparatus 100 may be, or may include, another device that is configured for performing at least some of the methods disclosed herein, such as a laptop computer, a cellular telephone, a tablet device, a smart home hub, etc. In some such implementations the apparatus 100 may be, or may include, a server.

In this example, the apparatus 100 includes an interface system 105 and a control system 110. The interface system 105 may, in some implementations, be configured for receiving audio data. The audio data may include audio signals that are scheduled to be reproduced by at least some speakers of an environment. The audio data may include one or more audio signals and associated spatial data. The spatial data may, for example, include channel data and/or spatial metadata. The interface system 105 may be configured for providing rendered audio signals to at least some loudspeakers of the set of loudspeakers of the environment. The interface system 105 may, in some implementations, be configured for receiving input from one or more microphones in an environment.

The interface system 105 may include one or more network interfaces and/or one or more external device interfaces (such as one or more universal serial bus (USB) interfaces). According to some implementations, the interface system 105 may include one or more wireless interfaces. The interface system 105 may include one or more devices for implementing a user interface, such as one or more microphones, one or more speakers, a display system, a touch sensor system and/or a gesture sensor system. In some examples, the interface system 105 may include one or more interfaces between the control system 110 and a memory system, such as the optional memory system 115 shown in FIG. 1. However, the control system 110 may include a memory system in some instances.

The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 110 may reside in more than one device. For example, a portion of the control system 110 may reside in a device within one of the environments depicted herein and another portion of the control system 110 may reside in a device that is outside the environment, such as a server, a mobile device (e.g., a smartphone or a tablet computer), etc. In other examples, a portion of the control system 110 may reside in a device within one of the environments depicted herein and another portion of the control system 110 may reside in one or more other devices of the environment. For example, control system functionality may be distributed across multiple smart audio devices of an environment, or may be shared by an orchestrating device (such as what may be referred to herein as a smart home hub) and one or more other devices of the environment. The interface system 105 also may, in some such examples, reside in more than one device.

In some implementations, the control system 110 may be configured for performing, at least in part, the methods disclosed herein. According to some examples, the control system 110 may be configured for implementing methods of managing playback of multiple streams of audio over multiple speakers.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 115 shown in FIG. 1 and/or in the control system 110. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 110 of FIG. 1.

In some examples, the apparatus 100 may include the optional microphone system 120 shown in FIG. 1. The optional microphone system 120 may include one or more microphones. In some implementations, one or more of the microphones may be part of, or associated with, one or more other devices, such as a speaker of the speaker system, a smart audio device, etc. In some such implementations, signals to or from one or more such microphones may be transmitted or received by the apparatus 100 via the interface system 105.

According to some implementations, the apparatus 100 may include the optional loudspeaker system 125 shown in FIG. 1. The optional speaker system 125 may include one or more loudspeakers. Loudspeakers may sometimes be referred to herein as "speakers." In some examples, at least some loudspeakers of the optional loudspeaker system 125 may be arbitrarily located. For example, at least some speakers of the optional loudspeaker system 125 may be placed in locations that do not correspond to any standard prescribed speaker layout, such as Dolby 5.1, Dolby 7.1, Dolby 9.1, Hamasaki 22.2, etc. In some such examples, at least some loudspeakers of the optional loudspeaker system 125 may be placed in locations that are convenient to the space (e.g., in locations where there is space to accommodate the loudspeakers), but not in any standard prescribed loudspeaker layout. In some implementations, one or more of the speakers may be part of, or associated with, one or more other devices. In some such implementations, signals to or from one or more such devices may be transmitted or received by the apparatus 100 via the interface system 105.

In some implementations, the apparatus 100 may include the optional sensor system 130 shown in FIG. 1. The optional sensor system 130 may include one or more cameras, touch sensors, gesture sensors, motion detectors, etc. According to some implementations, the optional sensor system 130 may include one or more cameras. In some implementations, the cameras may be free-standing cameras. In some examples, one or more cameras of the optional sensor system 130 may reside in a smart audio device, which may be a single purpose audio device or a virtual assistant. In some such examples, one or more cameras of the optional sensor system 130 may reside in a TV, a mobile phone or a smart speaker. Accordingly, in some implementations, one or more of the cameras, touch sensors, gesture sensors, motion detectors, etc., may be part of, or associated with, one or more other devices. In some such implementations, signals to or from one or more such devices may be transmitted or received by the apparatus 100 via the interface system 105.

In some implementations, the apparatus 100 may include the optional display system 135 shown in FIG. 1. The optional display system 135 may include one or more displays, such as one or more light-emitting diode (LED) displays. In some instances, the optional display system 135 may include one or more organic light-emitting diode (OLED) displays. In some examples wherein the apparatus 100 includes the display system 135, the sensor system 130 may include a touch sensor system and/or a gesture sensor system proximate one or more displays of the display system 135. According to some such implementations, the control system 110 may be configured for controlling the display system 135 to present a graphical user interface (GUI), such as one of the GUIs disclosed herein.

According to some examples the apparatus 100 may be, or may include, a smart audio device. In some such implementations the apparatus 100 may be, or may include, a wakeword detector. For example, the apparatus 100 may be, or may include, a virtual assistant.

Figure 2:
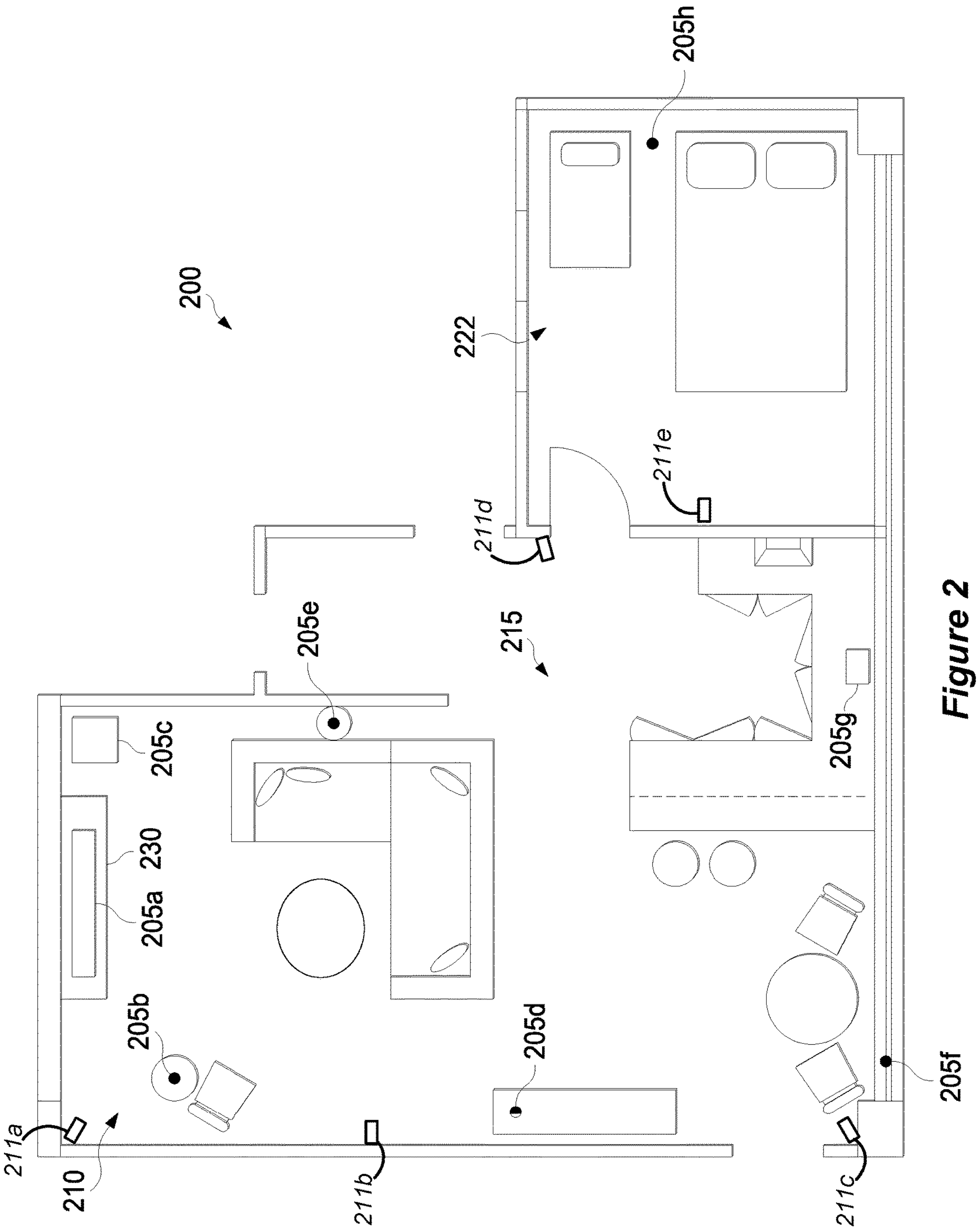
FIG. 2 depicts a floor plan of a listening environment, which is a living space in this example.

With reference to FIG. 2, we describe an example embodiment. As with other figures provided herein, the types and numbers of elements shown in FIG. 2 are merely provided by way of example. Other implementations may include more, fewer and/or different types and numbers of elements. FIG. 2 depicts a floor plan of a listening environment, which is a living space in this example. According to this example, the environment 200 includes a living room 210 at the upper left, a kitchen 215 at the lower center, and a bedroom 222 at the lower right. Boxes and circles distributed across the living space represent a set of loudspeakers 205*a*-205*h*, at least some of which may be smart speakers in some implementations, placed in locations convenient to the space, but not adhering to any standard prescribed layout (arbitrarily placed). In some examples, the loudspeakers 205*a*-205*h* may be coordinated to implement one or more disclosed embodiments. In this example, the environment 200 includes cameras 211*a*-211*e*, which are distributed throughout the environment. In some implementations, one or more smart audio devices in the environment 200 also may include one or more cameras. The one or more smart audio devices may be single purpose audio devices or virtual assistants. In some such examples, one or more cameras of the optional sensor system 130 may reside in or on the television 230, in a mobile phone or in a smart speaker, such as one or more of the loudspeakers 205*b*, 205*d*, 205*e* or 205*h*. Although cameras 211*a*-211*e* are not shown in every depiction of the environment 200 presented in this disclosure, each of the environments 200 may nonetheless include one or more cameras in some implementations.

FIGS. 3A, 3B, 3C and 3D show examples of flexibly rendering spatial audio in a reference spatial mode for a plurality of different listening positions and orientations in the living space shown in FIG. 2. FIGS. 3A-3D depict this capability at four example listening positions. In each example, the arrow 305 that is pointing towards the person 320*a* represents the location of the front sound stage (where the person 320*a* is facing). In each example, the arrow 310*a* represents the left surround field and the arrow 310*b* represents the right surround field.

Figure 3A:
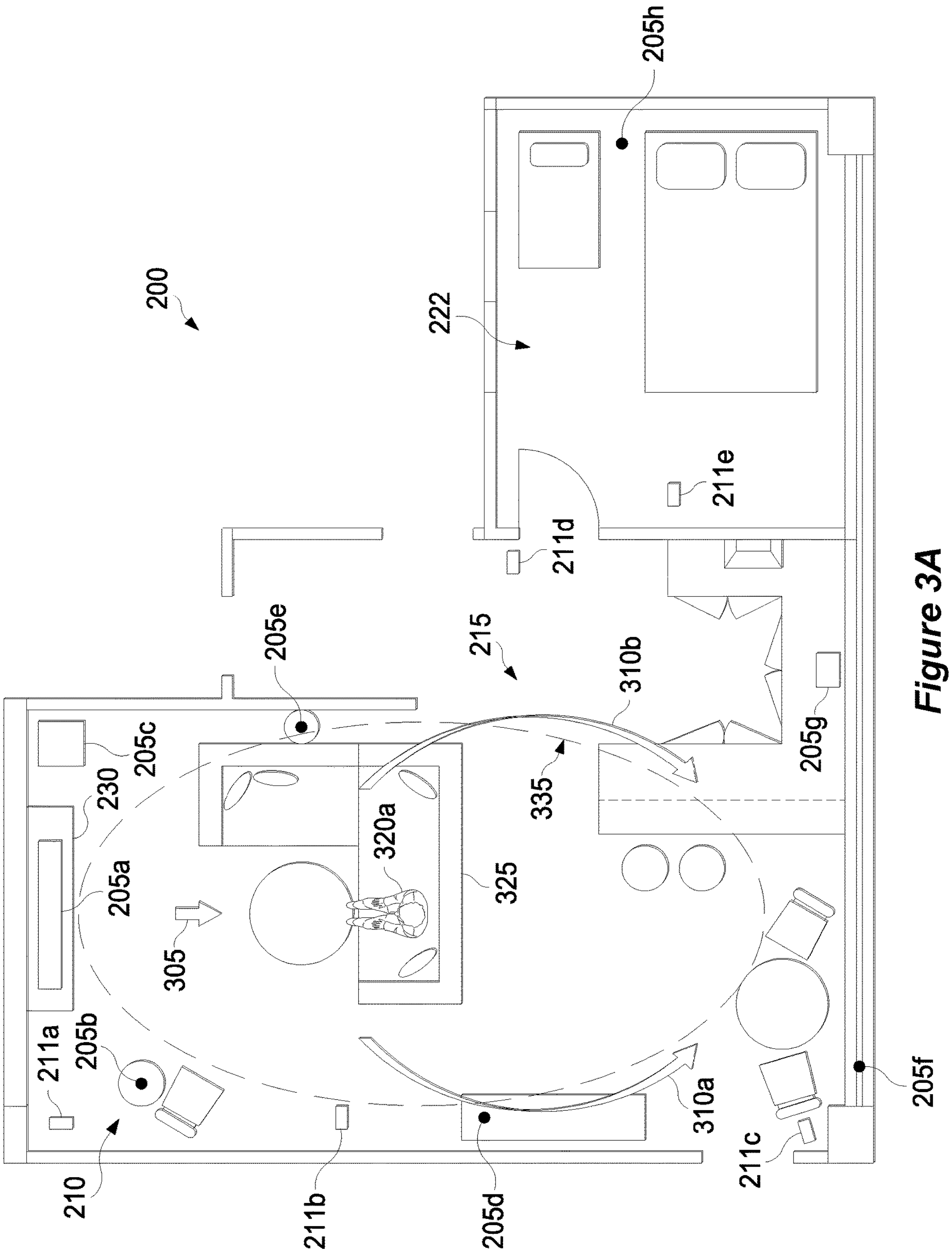
FIGS. 3A, 3B, 3C and 3D show examples of flexibly rendering spatial audio in a reference spatial mode for a plurality of different listening positions and orientations in the living space shown in FIG. 2.

In FIG. 3A, a reference spatial mode has been determined, and spatial audio has been flexibly rendered, for a person 320*a* sitting on the living room couch 325. According to some implementations, a control system (such as the control system 110 of FIG. 1A may be configured to determine the assumed listening position and/or the assumed orientation of the reference spatial mode according to reference spatial mode data received via an interface system, such as the interface system 105 of FIG. 1A. Some examples are described below. In some such examples, the reference spatial mode data may include microphone data from a microphone system (such as the microphone system 120 of FIG. 1A).

In some such examples, the reference spatial mode data may include microphone data corresponding to a wakeword and a voice command, such as "[wakeword], make the television the front sound stage." Alternatively, or additionally, microphone data may be used to triangulate a user's position according to the sound of the user's voice, e.g., via direction of arrival (DOA) data. For example, three or more of loudspeakers 205*a*-205*e* may use microphone data to triangulate the position of the person 320*a*, who is sitting on the living room couch 325, according to the sound of the person 320*a*'s voice, via DOA data. The person 320*a*'s orientation may be assumed according to the person 320*a*'s position: if the person 320*a* is at the position shown in FIG. 3A, the person 320*a* may be assumed to be facing the television 230.

Alternatively, or additionally, the person 320*a*'s position and orientation may be determined according to image data from a camera system (such as the sensor system 130 of FIG. 1A).

In some examples, the person 320*a*'s position and orientation may be determined according to user input obtained via a graphical user interface (GUI). According to some such examples, a control system may be configured for controlling a display device (e.g., a display device of a cellular telephone) to present a GUI that allows the person 320*a* to input the person 320*a*'s position and orientation.

Figure 4A:
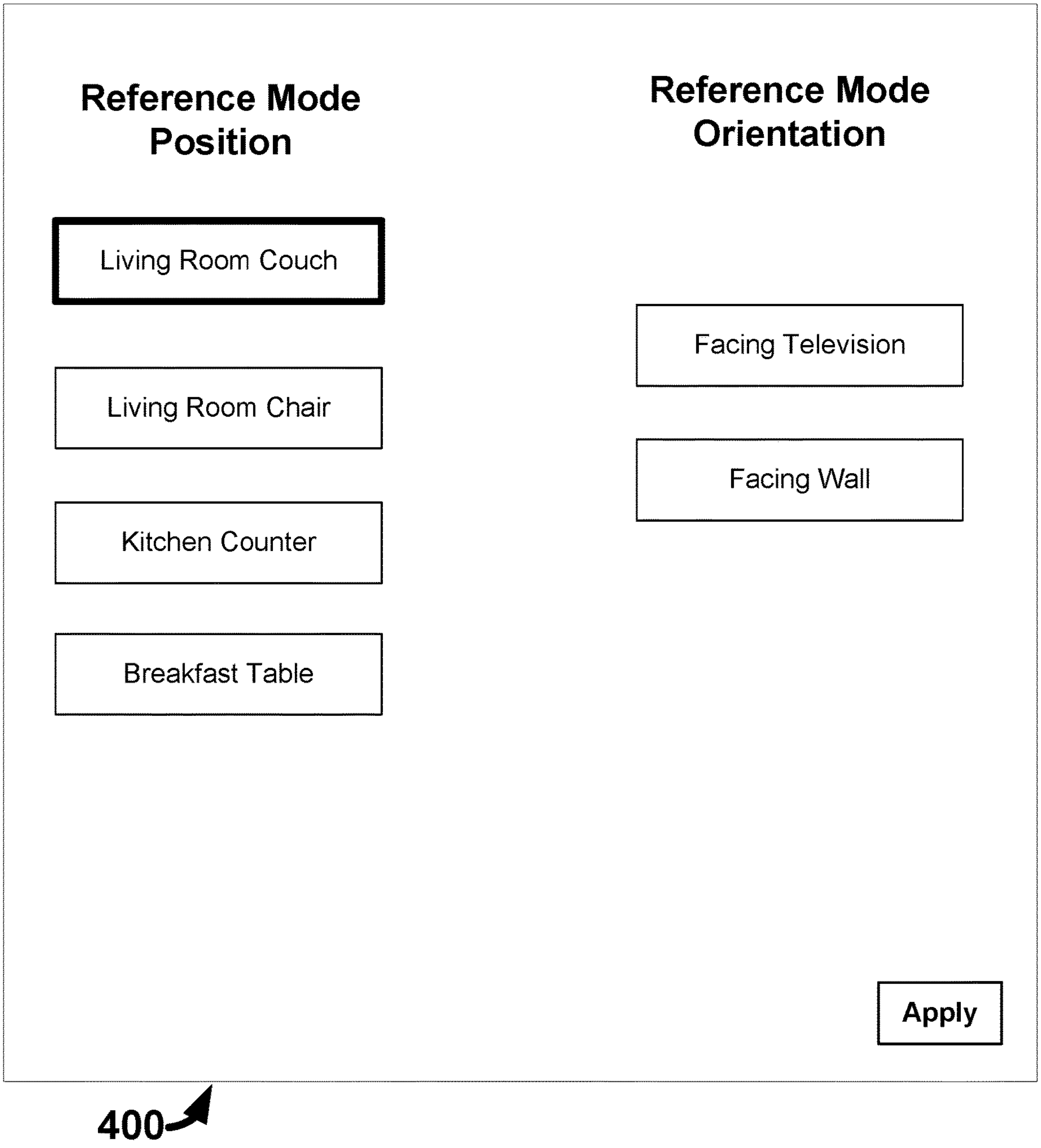
FIG. 4A shows an example of a graphical user interface (GUI) for receiving user input regarding a listener's position and orientation.

FIG. 4A shows an example of a GUI for receiving user input regarding a listener's position and orientation. According to this example, the user has previously identified several possible listening positions and corresponding orientations. Loudspeaker locations corresponding to each position and corresponding orientation have already been input and stored during a set-up process. Some examples are described below. For example, a listening environment layout GUI may have been provided and the user may have been prompted to touch locations corresponding to possible listening positions and speaker positions, and to name the possible listening positions. In this example, at the time depicted in FIG. 4A, the user has already provided user input to the GUI 400 regarding the user's position by touching the virtual button "living room couch." Because there are two possible front-facing positions, given the L-shaped couch 325, the user is being prompted to indicate which direction the user is facing.

Figure 3B:
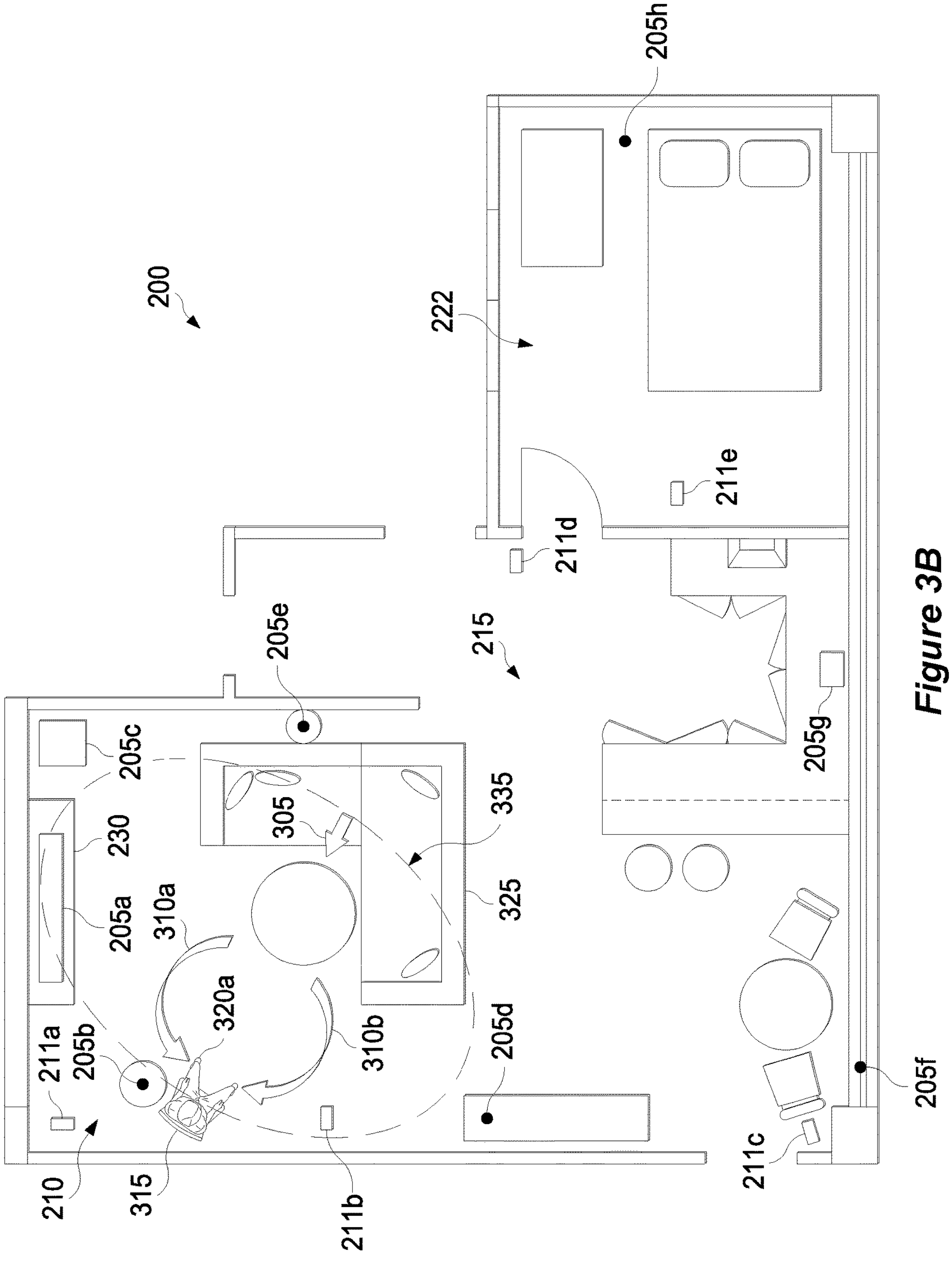
Figure 3C:
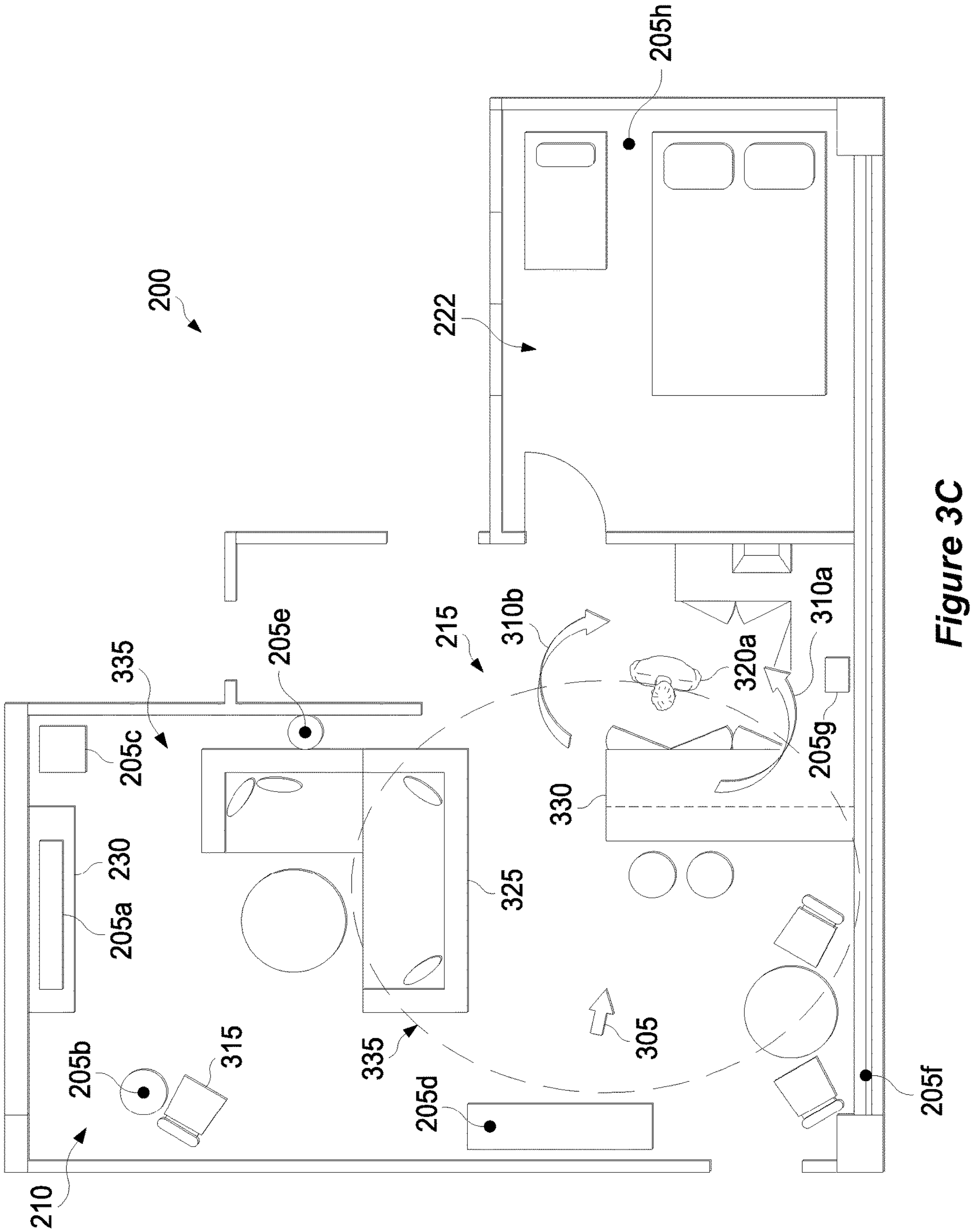
Figure 3D:
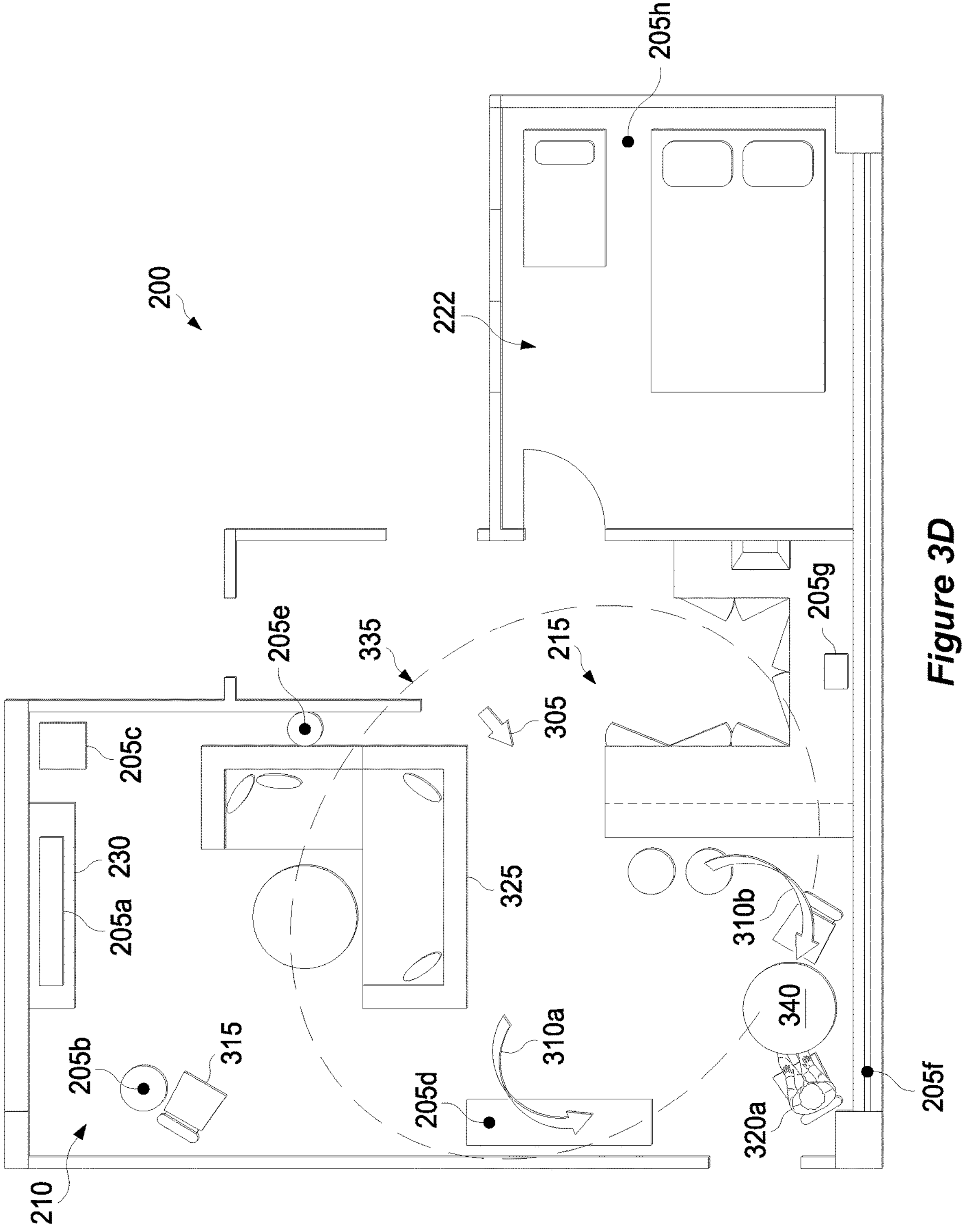

In FIG. 3B, a reference spatial mode has been determined, and spatial audio has been flexibly rendered, for the person 320*a* sitting on the living room reading chair 315. In FIG. 3C, a reference spatial mode has been determined, and spatial audio has been flexibly rendered, for the person 320*a* standing next to the kitchen counter 330. In FIG. 3D, a reference spatial mode has been determined, and spatial audio has been flexibly rendered, for the person 320*a* sitting at the breakfast table 340. One may observe that the front sound stage orientation, as indicated by the arrow 305, does not necessarily correspond with any particular loudspeaker within the environment 200. As the listener's location and orientation vary, so do the speakers' responsibilities for rendering the various components of the spatial mix.

Figure 3E:
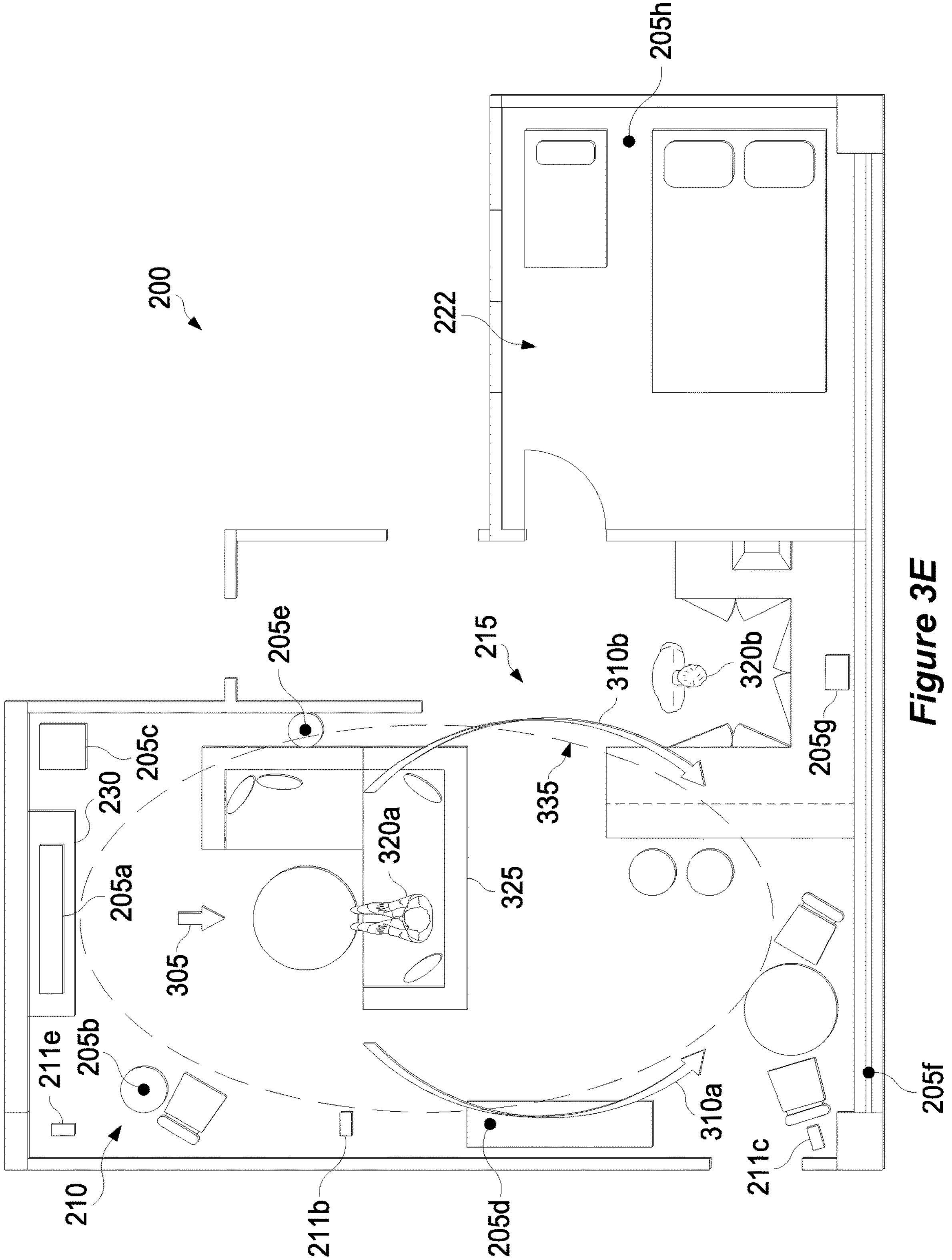
FIG. 3E shows an example of reference spatial mode rendering when two listeners are in different locations of a listening environment.

For the person 320*a* in any of FIGS. 3A-3D, he or she hears the spatial mix as intended for each of the positions and orientations shown. However, the experience may be suboptimal for additional listeners in the space. FIG. 3E shows an example of reference spatial mode rendering when two listeners are in different locations of a listening environment. FIG. 3E depicts the reference spatial mode rendering for a person 320*a* on the couch and a person 320*b* standing in the kitchen. Rendering is optimal for the person 320*a*, but the person 320*b* will hear mostly signals from the surround field and little of the front sound stage given his/her location.

Figure 4B:
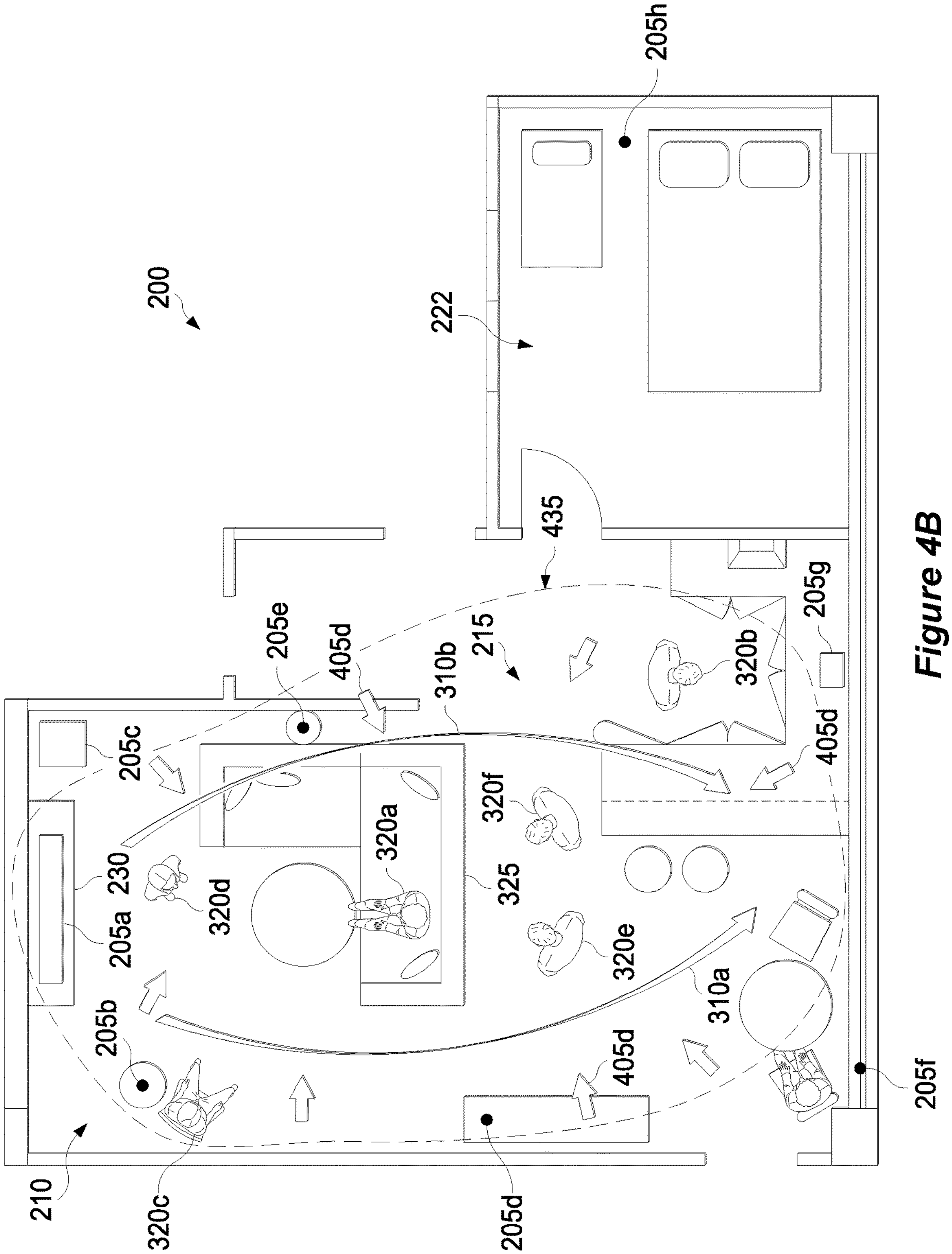
FIG. 4B depicts a distributed spatial rendering mode according to one example embodiment.

In this case and others where multiple people may be in the space moving around in an unpredictable manner (a party, for example) there exists a need for a rendering mode that is more appropriate for such a distributed audience. FIG. 4B depicts a distributed spatial rendering mode according to one example embodiment. In this example of a distributed spatial mode, the front sound stage is now rendered uniformly across the entire listening space instead of only from the location forward of the listener on the couch. This distribution of the front sound stage is represented by the multiple arrows 405*d* circling the cloud 435, all of the arrows 405*d* having the same length, or approximately the same length. The intended meaning of the arrows 405*d* is that the plurality of listeners depicted (persons 320*a*-3201) are all able to hear this part of the mix equally well, regardless of their location. However, if this uniform distribution were applied to all components of the mix then all spatial aspects of the mix would be lost; persons 320*a*-320*f* would essentially hear mono. In order to maintain some spaciousness, the left and right surround components of the mix, represented by the arrows 310*a* and 310*b*, respectively, are still rendered in a spatial manner (In many instances there may be left and right side surrounds, left and right back surrounds, overheads, and dynamic audio objects with spatial positions within this space. The arrows 310*a* and 310*b* are meant to represent the left and right portions of all of these possibilities.) And in order to maximize the perceived spaciousness, the area over which these components are spatialized is expanded to cover the entire listening space more completely, including the space formerly occupied by the front sound stage alone. This expanded area over which the surround components are rendered may be appreciated by comparing the relatively elongated arrows 310*a* and 310*b* shown in FIG. 4B with the relatively shorter arrows 310*a* and 310*b* shown in FIG. 3A. Moreover, the arrows 310*a* and 310*b* shown in FIG. 3A, which represent the surround components in the reference spatial mode, extend approximately from the sides of the person 320*a* to the back sides of the listening environment and do not extend into the front stage area of the listening environment.

In this example, care is taken in implementing the uniform distribution of the front sound stage and expanded spatialization of the surround components such that the perceived loudness of these components is largely maintained in comparison to the rendering for the reference spatial mode. The goal is to shift the spatial impression of these components to optimize for multiple people while still maintaining the relative level of each component in the mix. It would be undesirable, for example, if the front sound stage became twice as loud with respect to the surround components as a result of its uniform distribution.

To switch between the various reference rendering modes and the distributed rendering mode of the example embodiment, in some examples a user may interact with a voice assistant associated with the system of orchestrated speakers. For example, to play audio in the reference spatial mode, a user may utter the wake-word for the voice assistant (e.g. "Listen Dolby") followed by the command, "Play [insert name of content] for me.", or "Play [insert name of content] in personal mode." Then, based on recordings from the various microphones associated with the system, the system may automatically determine the location and orientation of the user, or the closest of one of several pre-determined zones to the user, and start playing audio in the reference mode corresponding to this determined location. To play audio in a distributed spatial mode, a user may utter a different command, for example, "Play [insert name of content] in distributed mode."

Alternatively, or in addition, the system may be configured to automatically switch between the reference mode and distributed mode based on other inputs. For example, the system may have the means to automatically determine how many listeners are in the space and their locations. This may be achieved, for example, by monitoring voice activity in the space from associated microphones and/or through the use of other associated sensors, such as one or more cameras. In this case, the system may also be configured with a mechanism to vary the rendering continuously between the reference spatial mode, such as depicted in FIG. 3E, and a fully distributed spatial mode, such as depicted in FIG. 4B. The point at which the rendering is set on this continuum may be computed as a function, for example, of the number of people reported in the space.

Figure 5A:
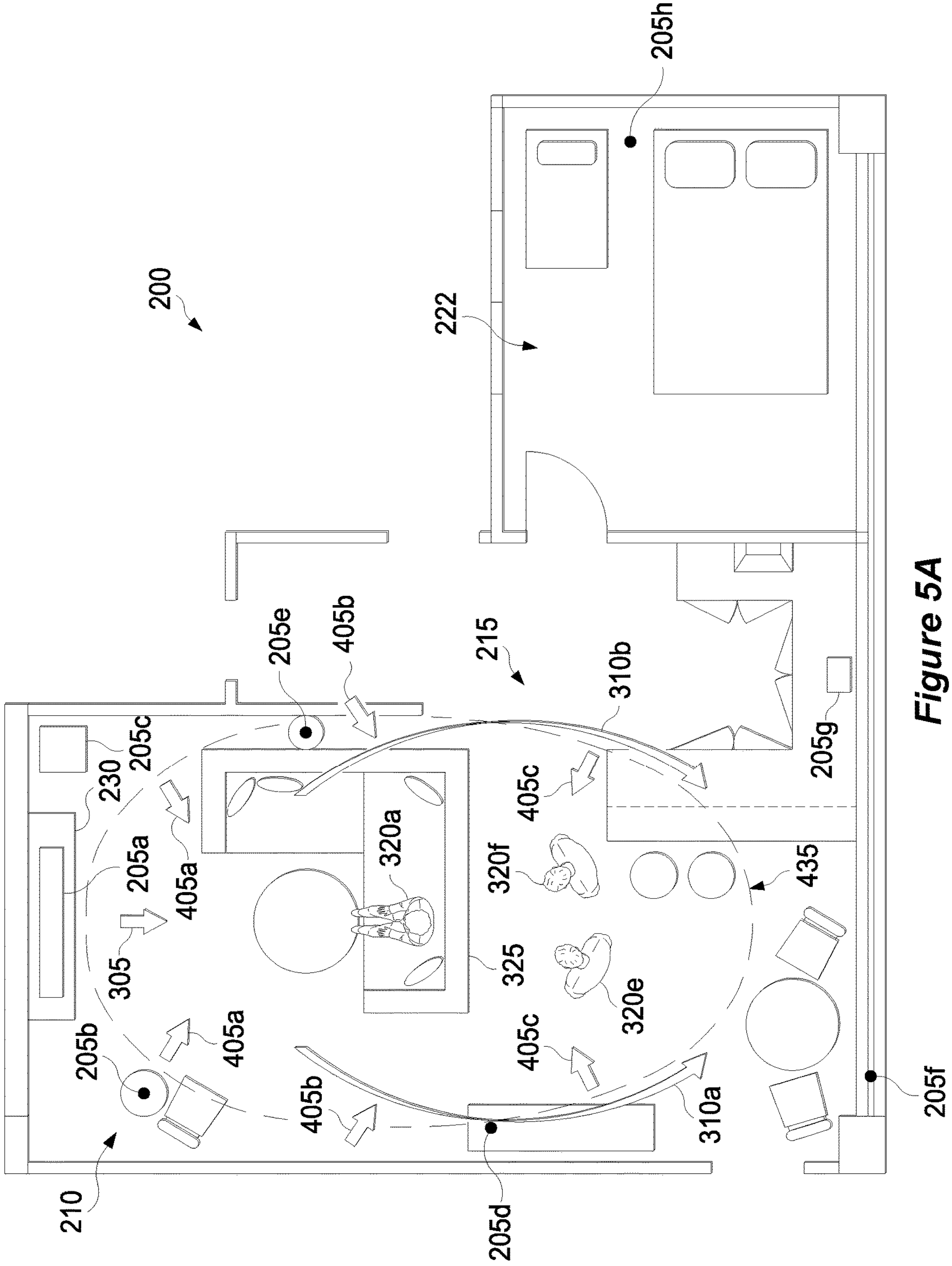
FIG. 5A depicts a partially distributed spatial rendering mode according to one example.
Figure 5B:
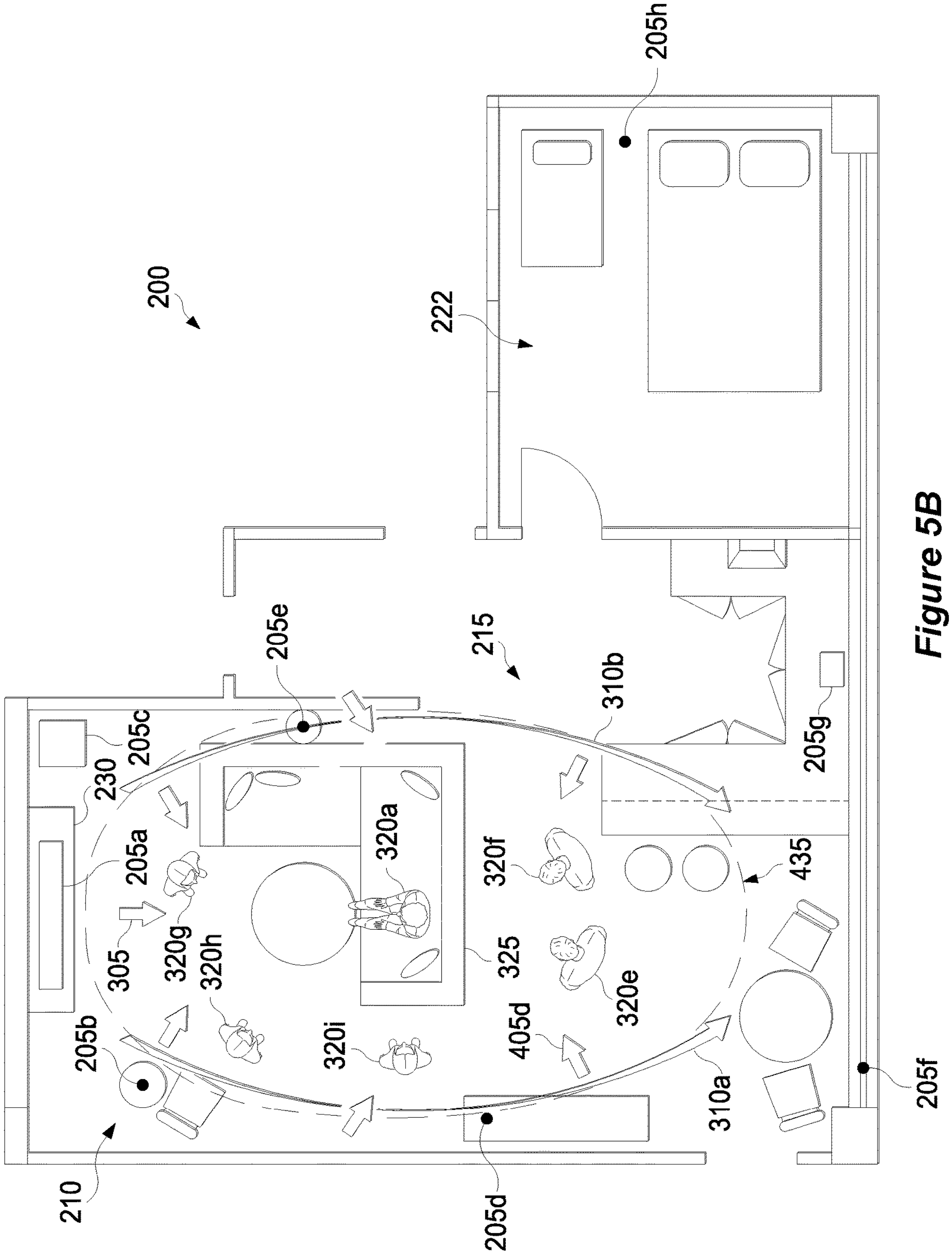
FIG. 5B depicts a fully distributed spatial rendering mode according to one example.

FIGS. 3A, 5A and 5B illustrate this behavior. In FIG. 3A, the system detects only a single listener on the couch (the person 320*a*), facing the television, and so the rendering mode is set to the reference spatial mode for this listener location and orientation. FIG. 5A depicts a partially distributed spatial rendering mode according to one example. In FIG. 5A, two additional people (persons 320*e* and 320*f*) are detected behind the person 320*a*, and the rendering mode is set at a point between the reference spatial mode and a fully distributed spatial mode. This is depicted with some of the front sound stage (the arrows 405*a*, 405*b* and 405*c*) being pulled back toward the additional listeners (persons 320*e* and 320*f*), but still with more of an emphasis towards the location of the front sound stage of the reference spatial mode. This emphasis is indicated in FIG. 5A by the arrow 305 and the relatively greater length of the arrows 405*a*, as comparted to the lengths of the arrows 405*b* and 405*c*. Also, the surround field is only partially expanded towards the location of the front sound stage of the reference spatial mode, as indicated by the lengths and positions of the arrows 310*a* and 310*b*.

FIG. 5B depicts a fully distributed spatial rendering mode according to one example. In some examples, the system may have detected numerous listeners (persons 320*a*, 320*e*, 320*f*, 320*g*, 320*h* and 320*i*) spanning the entire space, and the system may have automatically set the rendering mode to a fully distributed spatial mode. In other examples, the rendering mode may have been set according to user input. The fully distributed spatial mode is indicated in FIG. 5B by the uniform, or substantially uniform, lengths of the arrows 405*d*, as well as the lengths and positions of the arrows 310*a* and 310*b*.

In the preceding examples, the part of the spatial mix rendered with more uniform distribution in the distributed rendering mode is specified as the front sound stage. In the context of many spatial mixes, this makes sense since traditional mixing practices typically place the most important parts of the mix, such as dialog for movies and lead vocals, drums, and bass for music, in the front sound stage.

This is true for most 5.1 and 7.1 surround sound mixes as well as stereo content up-mixed to 5.1 or 7.1 using algorithms such as Dolby Pro-Logic or Dolby Surround, where the front sound stage is given by the left, right and center channels. This is also true for many object-based audio mixes, such as Dolby Atmos, wherein audio data may be specified as front sound stage according to spatial metadata indicating an (x,y) spatial position of $y<0.5$. However, with object-based audio, mixing engineers have the freedom to place audio anywhere in 3D space. With object-based music, in particular, mixing engineers are beginning to break from traditional mixing norms and place what would be considered important parts of the mix, such as lead vocals, in non-traditional locations, such as overhead. In such cases it becomes difficult to construct a simple rule for determining which components of the mix are appropriate for rendering in a more distributed spatial manner for the distributed rendering mode. Object-based audio already contains metadata associated with each of its constituent audio signals describing where in 3D space the signal should be rendered. To deal with the described problem, additional metadata may be added allowing the content creator to flag particular signals as being appropriate for more distributed spatial rendering in the distributed rendering mode. During rendering, the system then uses this metadata to select the components of the mix to which the more distributed rendering is applied. This gives the content creator complete control over the way that the distributed rendering mode sounds for a particular piece of content.

In some alternative implementations, a control system may be configured for implementing a content type classifier to identify one or more elements of the audio data to be rendered in a more spatially distributed manner. In some examples, the content type classifier may refer to content type metadata, (e.g., metadata that indicates that the audio data is dialogue, vocals, percussion, bass, etc.) in order to determine whether the audio data should be rendered in a more spatially distributed manner According to some such implementations, the content type metadata to be rendered in a more spatially distributed manner may be selectable by a user, e.g., according to user input via a GUI displayed on a display device.

The exact mechanism used to render the one or more elements of the spatial audio mix in a more spatially distributed manner than in the reference spatial mode may vary between different embodiments, and the present disclosure is meant to cover all such mechanisms. One example mechanism involves creating multiple copies of each such element with multiple associated rendering locations distributed more uniformly across the listening space. In some implementations, the rendering locations and/or the number of rendering locations for a distributed spatial mode may be user-selectable, whereas in other implementations the rendering locations and/or the number of rendering locations for a distributed spatial mode may be pre-set. In some such implementations, a user may select a number of rendering locations for a distributed spatial mode and the rendering locations may be pre-set, e.g., evenly spaced throughout a listening environment. The system then renders all of these copies at their set of distributed positions as opposed to the original single element at its original intended position. According to some implementations, the copies may be modified in level so that the perceived level associated with the combined rendering of all the copies is the same as, or substantially the same as (e.g., within a threshold number of decibels, such as 2 dB, 3 dB, 4 dB, 5 dB, 6 dB, etc.) the level of the original single element in the reference rendering mode.

A more elegant mechanism may be implemented in the context of either the CMAP or FV flexible rendering systems, or with a hybrid of both systems. In these systems, each element of a spatial mix is rendered at a particular position in space; associated with each element may be an assumed fixed location, for example the canonical location of a channel in a 5.1 or 7.1 surround sound mix, or a time-varying position as is the case with object-based audio such as Dolby Atmos.

From a high level, both these techniques render a set of one or more audio signals, each with an associated desired perceived spatial position, for playback over a set of two or more speakers, where the relative activation of speakers of the set is a function of a model of perceived spatial position of said audio signals played back over the speakers and a proximity of the desired perceived spatial position of the audio signals to the positions of the speakers. The model ensures that the audio signal is heard by the listener near its intended spatial position, and the proximity term controls which speakers are used to achieve this spatial impression. In particular, the proximity term favors the activation of speakers that are near the desired perceived spatial position of the audio signal. For both CMAP and FV, this functional relationship is conveniently derived from a cost function written as the sum of two terms, one for the spatial aspect and one for proximity:

$$C(g)=C_{spatial}(g,\vec{o},\{\vec{s}_i\})+C_{proximity}(g,\vec{o},\{\vec{s}_i\}) \qquad (1)$$

Here, the set $\{\vec{s}_i\}$ denotes the positions of a set of M loudspeakers, $\vec{o}$ denotes the desired perceived spatial position of the audio signal, and g denotes an M dimensional vector of speaker activations. For CMAP, each activation in the vector represents a gain per speaker, while for FV each activation represents a filter (in this second case g can equivalently be considered a vector of complex values at a particular frequency and a different g is computed across a plurality of frequencies to form the filter). The optimal vector of activations is found by minimizing the cost function across activations:

$$g_{opt}=\min_g C(g,\vec{o},\{\vec{s}_i\}) \qquad (2a)$$

With certain definitions of the cost function, it is difficult to control the absolute level of the optimal activations resulting from the above minimization, though the relative level between the components of $g_{opt}$ is appropriate. To deal with this problem, a subsequent normalization of $g_{opt}$ may be performed so that the absolute level of the activations is controlled. For example, normalization of the vector to have unit length may be desirable, which is in line with a commonly used constant power panning rules:

$$\bar{g}_{opt}=\frac{g_{opt}}{\|g_{opt}\|} \qquad (2b)$$

The exact behavior of the flexible rendering algorithm is dictated by the particular construction of the two terms of the cost function, $C_{spatial}$ and $C_{proximity}$. For CMAP, $C_{spatial}$ is derived from a model that places the perceived spatial position of an audio signal playing from a set of loudspeakers at the center of mass of those loudspeakers' positions weighted by their associated activating gains $g_i$ (elements of the vector g):

$$\vec{o} = \frac{\sum_{i=1}^{M} g_i \vec{s}_i}{\sum_{i=1}^{M} g_i} \tag{3}$$

Equation 3 is then manipulated into a spatial cost representing the squared error between the desired audio position and that produced by the activated loudspeakers:

$$C_{spatial}(g,\vec{o},\{\vec{s}_i\}) = \|(\Sigma_{i=1}^{M} g_i)\vec{o} - \Sigma_{i=1}^{M} g_i \vec{s}_i\|^2 = \|\Sigma_{i=1}^{M} g_i(\vec{o}-\vec{s}_i)\|^2 \tag{4}$$

With FV, the spatial term of the cost function is defined differently. There the goal is to produce a binaural response b corresponding to the audio object position $\vec{o}$ at the left and right ears of the listener. Conceptually, b is a 2×1 vector of filters (one filter for each ear) but is more conveniently treated as a 2×1 vector of complex values at a particular frequency. Proceeding with this representation at a particular frequency, the desired binaural response may be retrieved from a set of HRTFs index by object position:

$$b = \mathrm{HRTF}\{\vec{o}\} \tag{5}$$

At the same time, the 2×1 binaural response e produced at the listener's ears by the loudspeakers is modelled as a 2×M acoustic transmission matrix H multiplied with the M×1 vector g of complex speaker activation values:

$$e = Hg \tag{6}$$

The acoustic transmission matrix H is modelled based on the set of loudspeaker positions $\{\vec{s}_i\}$ with respect to the listener position. Finally, the spatial component of the cost function is defined as the squared error between the desired binaural response (Equation 5) and that produced by the loudspeakers (Equation 6):

$$C_{spatial}(g,\vec{o},\{\vec{s}_i\}) = (b-Hg)^*(b-Hg) \tag{7}$$

Conveniently, the spatial term of the cost function for CMAP and FV defined in Equations 4 and 7 can both be rearranged into a matrix quadratic as a function of speaker activations g:

$$C_{spatial}(g,\vec{o},\{\vec{s}_i\}) = g^*Ag + Bg + C \tag{8}$$

where A is an M×M square matrix, B is a 1×M vector, and C is a scalar. The matrix A is of rank 2, and therefore when M>2 there exist an infinite number of speaker activations g for which the spatial error term equals zero. Introducing the second term of the cost function, $C_{proximity}$ removes this indeterminacy and results in a particular solution with perceptually beneficial properties in comparison to the other possible solutions. For both CMAP and FV, $C_{proximity}$ is constructed such that activation of speakers whose position $\vec{s}_i$ is distant from the desired audio signal position $\vec{o}$ is penalized more than activation of speakers whose position is close to the desired position. This construction yields an optimal set of speaker activations that is sparse, where only speakers in close proximity to the desired audio signal's position are significantly activated, and practically results in a spatial reproduction of the audio signal that is perceptually more robust to listener movement around the set of speakers.

To this end, the second term of the cost function, $C_{proximity}$, may be defined as a distance-weighted sum of the absolute values squared of speaker activations. This is represented compactly in matrix form as:

$$C_{proximity}(g,\vec{o},\{\vec{s}_i\}) = g^*Dg \tag{9a}$$

where D is a diagonal matrix of distance penalties between the desired audio position and each speaker:

$$D = \begin{bmatrix} d_1 & \dots & 0 \\ \vdots & \ddots & \vdots \\ 0 & \dots & d_M \end{bmatrix},\ d_i = \mathrm{distance}(\vec{o}, \vec{s}_i) \tag{9b}$$

The distance penalty function can take on many forms, but the following is a useful parameterization $$\mathrm{distance}(\vec{o}, \vec{s}_i) = \alpha d_0^2 \left( \frac{\|\vec{o} - \vec{s}_i\|}{d_0} \right)^{\beta} \tag{9c}$$

where $\|\vec{o}-\vec{s}_i\|$ is the Euclidean distance between the desired audio position and speaker position and α and β are tunable parameters. The parameter α indicates the global strength of the penalty; $d_0$ corresponds to the spatial extent of the distance penalty (loudspeakers at a distance around $d_0$ or futher away will be penalized), and β accounts for the abruptness of the onset of the penalty at distance $d_0$.

Combining the two terms of the cost function defined in Equations 8 and 9a yields the overall cost function $$C(g) = g^*Ag + Bg + C + g^*Dg = g^*(A+D)g + Bg + C \tag{10}$$

Setting the derivative of this cost function with respect to g equal to zero and solving for g yields the optimal speaker activation solution:

$$g_{opt} = \tfrac{1}{2}(A+D)^{-1}B \tag{11}$$

In general, the optimal solution in Equation 11 may yield speaker activations that are negative in value. For the CMAP construction of the flexible renderer, such negative activations may not be desirable, and thus Equation (11) may be minimized subject to all activations remaining positive.

Figure 6:
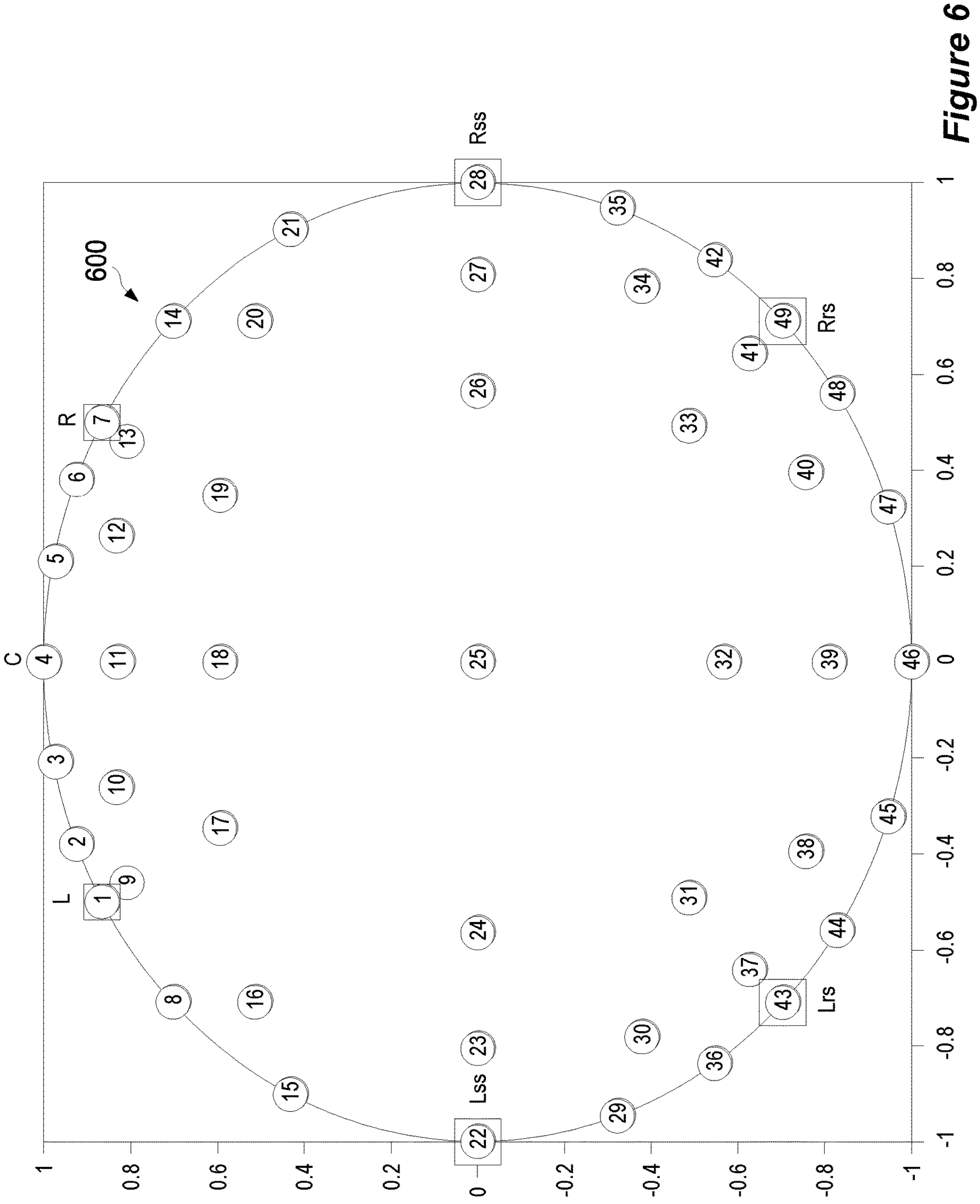
FIG. 6 depicts example rendering locations for Center of Mass Amplitude Panning (CMAP) and Flexible Virtualization (FV) rendering systems on a 2D plane.

FIG. 6 depicts example rendering locations for CMAP and FV rendering systems on a 2D plane. Each small numbered circle represents an example rendering location, and the rendering systems are capable of rendering an element of the spatial mix anywhere on or within the circle 600. The positions on the circle 600 labelled L, R, C, Lss, Rss, Lrs, and Rrs represent the fixed canonical rendering locations of the 7 full-range channels of a 7.1 surround mix in this example: Left (L), Right (R), Center (C), Left side surround (Lss), Right side surround (Rss), Left rear surround (Lrs), and Right rear surround (Rrs). In this context, rendering locations near L, R, and C are considered the front sound stage. For the reference rendering mode (also referred to herein as the "reference spatial mode"), the listener is assumed to be located at the center of the large circle facing towards the C rendering position. For any of FIGS. 3A-3D depicting reference rendering for various listening positions and orientations, one may conceptualize the superposition of the center of FIG. 6 on top of the listener, with FIG. 6 additionally rotated and scaled so that the C position aligns with the position of the front sound stage (the arrow 305) and the circle 600 of FIG. 6 encircles the cloud 335. The resulting alignment then describes the relative proximity of any of the speakers from FIGS. 3A-3D to any of the rendering locations in FIG. 6. It is this proximity that governs, to a large extent, the relative activation of speakers when rendering an element of the spatial mix at a particular location for both the CMAP and FV rendering systems.

When spatial audio is mixed in a studio, speakers are generally placed around the listening position at a uniform distance. In most instances, no speakers lie within the bounds of the resulting circle or hemisphere. When audio is placed “in the room” (for examples, at the center of FIG. 6), rendering tends towards the firing of all speakers on the perimeter to achieve a “sound of nowhere.” In the CMAP and FV rendering systems, a similar effect may be achieved by altering the proximity penalty term of the cost function governing speaker activation. In particular, for a rendering position on the perimeter of the circle 600 of FIG. 6, the proximity penalty term fully penalizes the use of speakers distant from the desired rendering position. As such, only speakers near the intended rendering location are activated in a substantial manner. As the desired rendering position moves towards the center of the circle (radius zero), the proximity penalty term reduces to zero so that at the center, no preference is given to any speaker. The corresponding result for a rendering position at radius zero is completely uniform perceived distribution of audio across the listening space, which is also precisely the desired outcome for certain elements of the mix in the most distributed spatial rendering mode.

Given this behavior of the CMAP and FV systems at radius zero, a more spatially distributed rendering of any element of the spatial mix may be achieved by warping its intended spatial position towards the zero-radius point. This warping may be made continuous between the original intended position and zero-radius, thereby providing a natural continuous control between a reference spatial mode and various distributed spatial modes. FIGS. 7A, 7B, 7C and 7D show examples of a warping applied to all of the rendering points in FIG. 6 to achieve various distributed spatial rendering modes. FIG. 7D depicts an example of such a warping applied to all of the rendering points in FIG. 6 to achieve a fully distributed rendering mode. One sees that the L, R, and C points (the front sound stage) have been collapsed to zero-radius, thereby ensuring their rendering in a completely uniform manner. In addition, the Lss and Rss rendering points have been pulled along the perimeter of the circle towards the original front sound stage so that the spatialized surround field (Lss, Rss, Lbs, and Rbs) encircles the entire listening area. This warping is applied to the entire rendering space, and one sees that all of the rendering points from FIG. 6 have been warped to new locations in FIG. 7D commensurate with warping of the 7.1 canonical locations. The spatial mode referenced in FIG. 7D is one example of what may be referred to herein as a “most distributed spatial mode” or a “fully distributed spatial mode.”

Figure 7A:
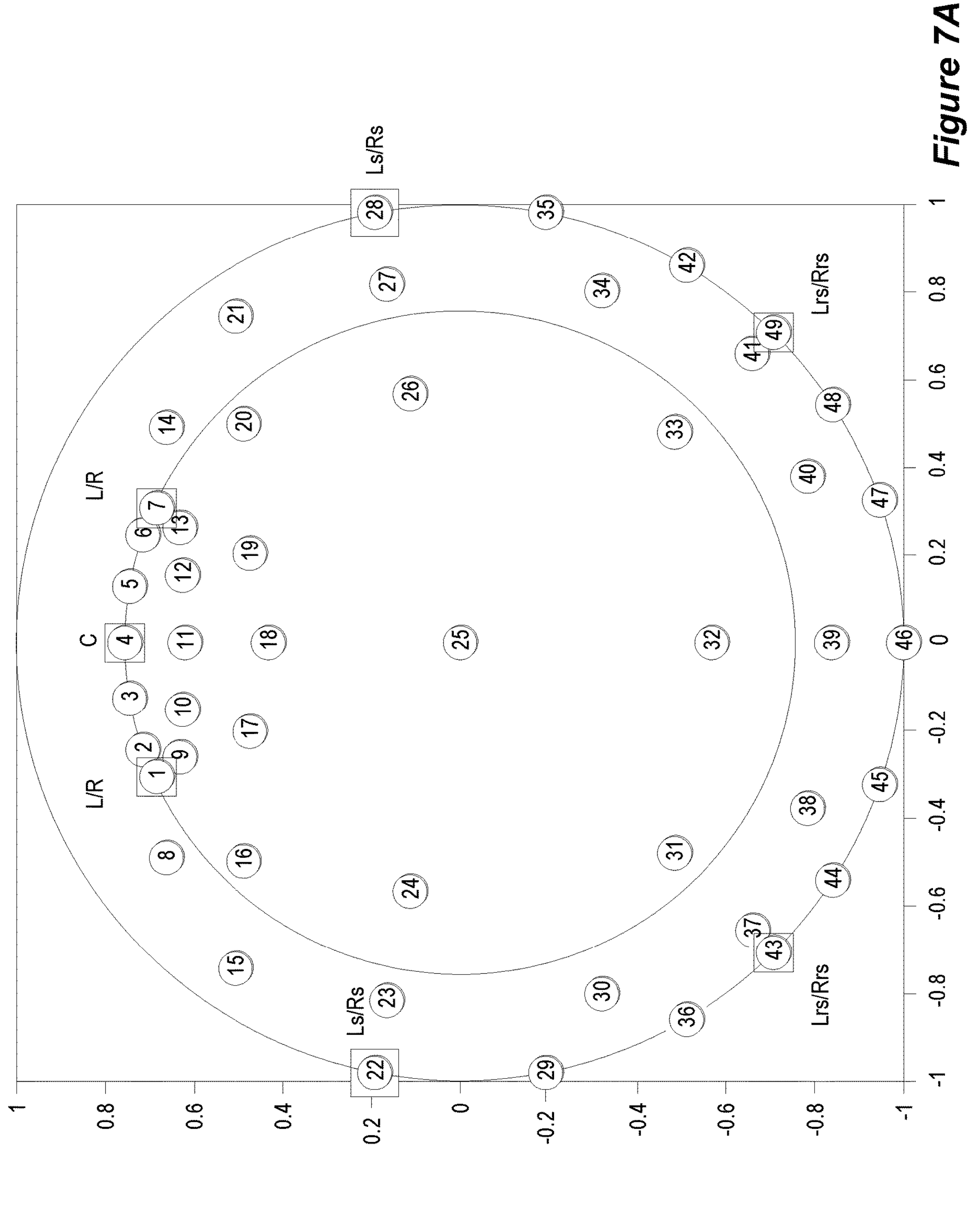
FIGS. 7A, 7B, 7C and 7D show examples of a warping applied to all of the rendering points in FIG. 6 to achieve various distributed spatial rendering modes.
Figure 7B:
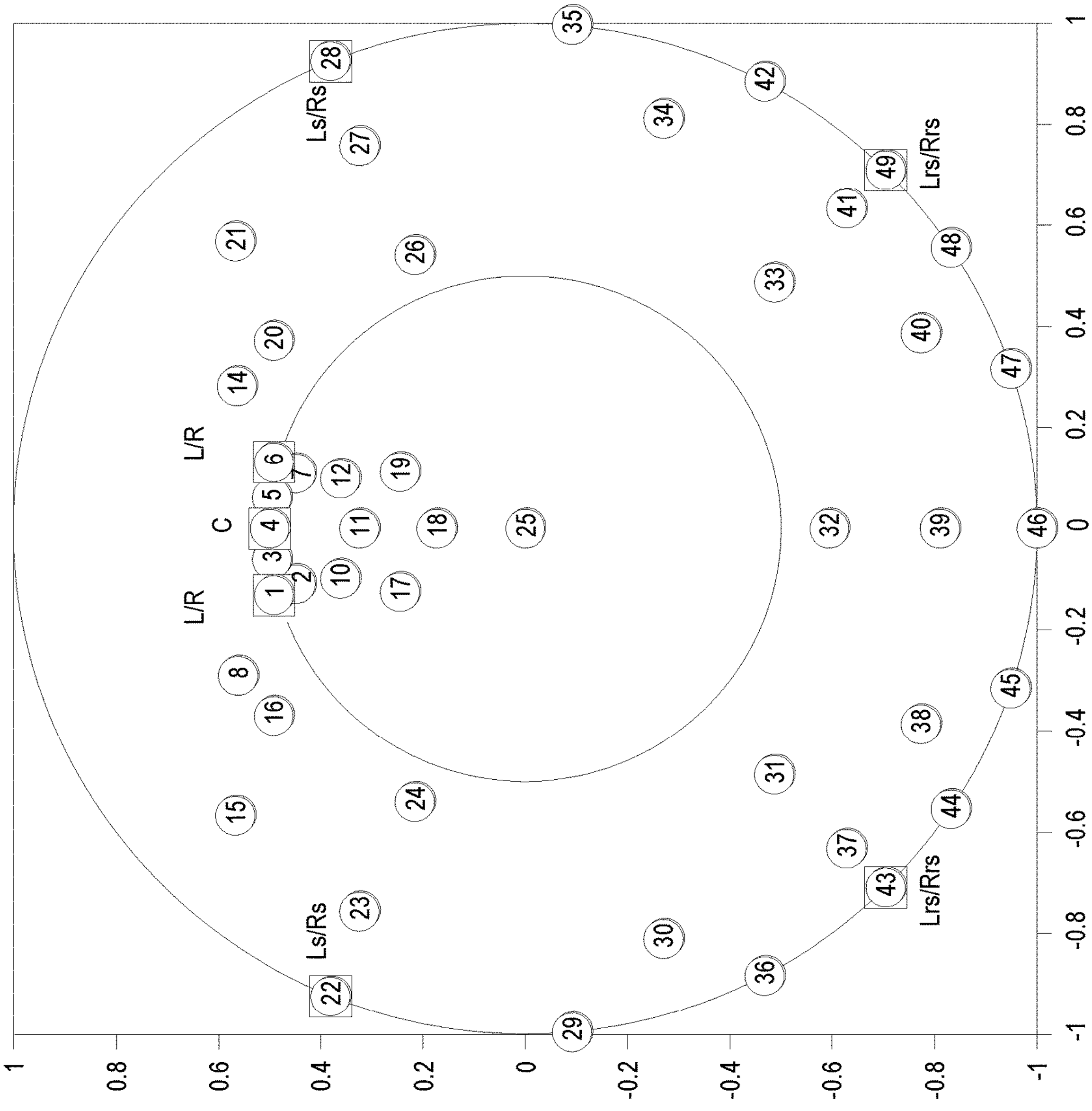
Figure 7C:
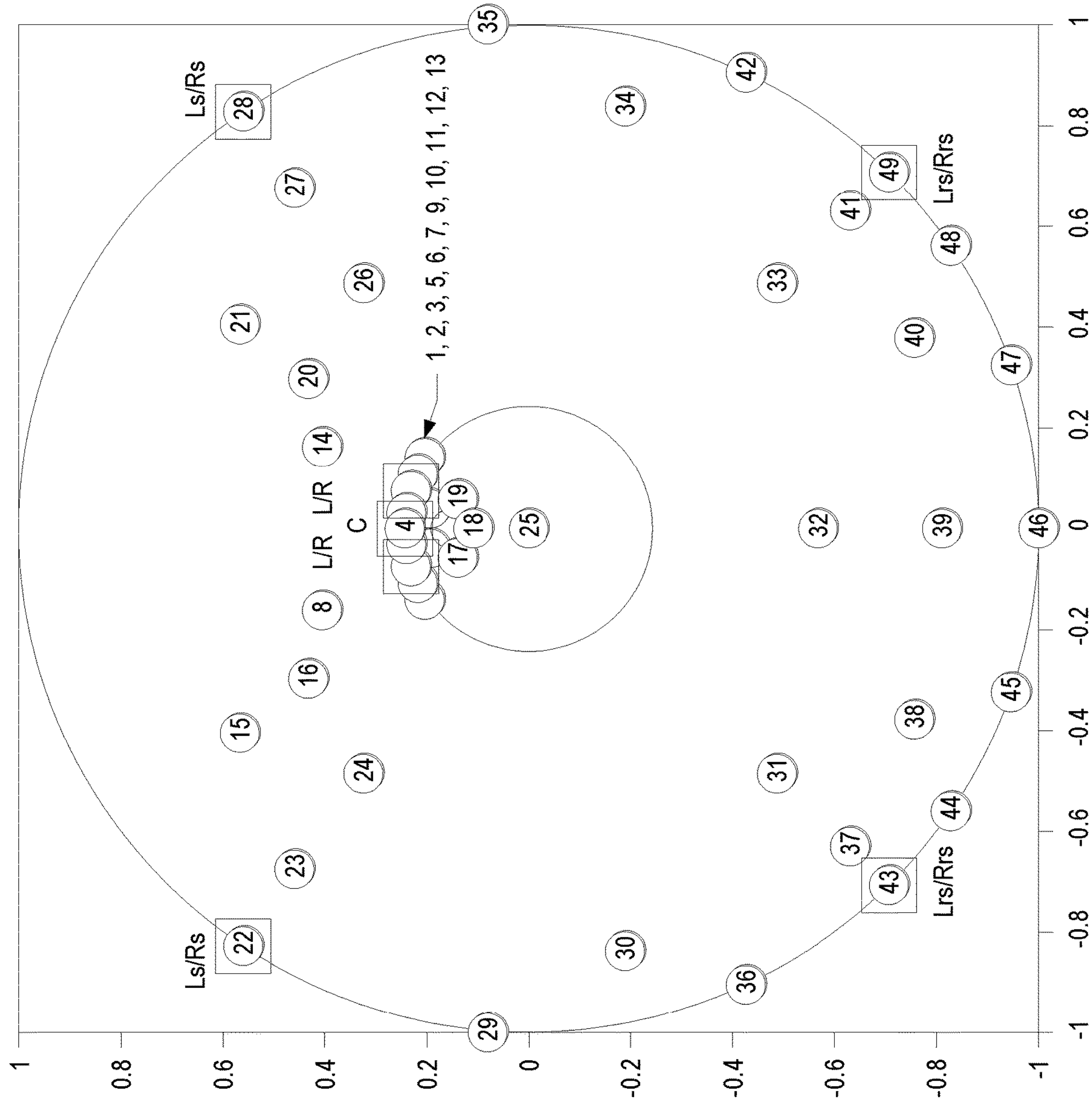
Figure 7D:
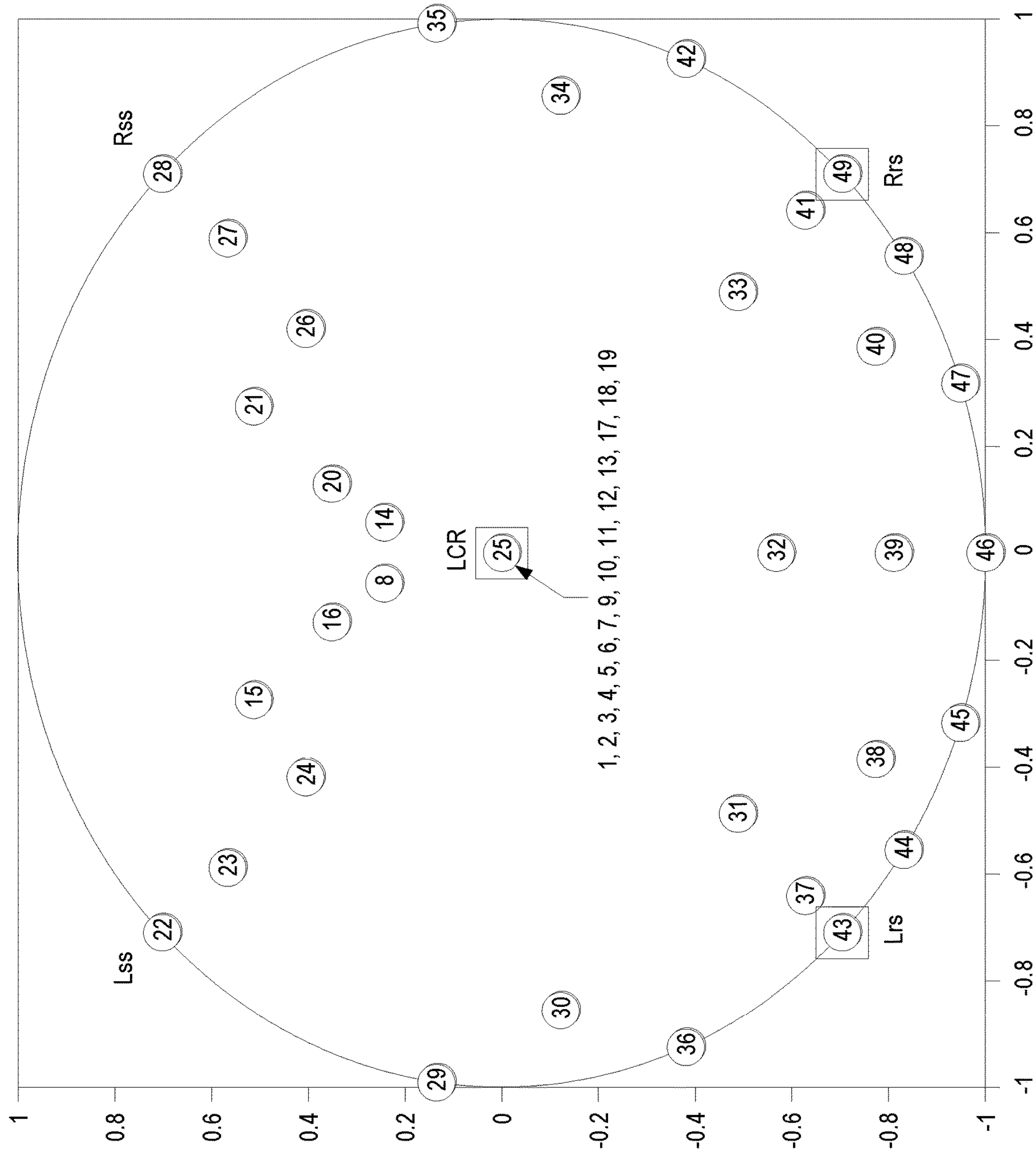

FIGS. 7A, 7B and 7C show various examples of intermediate distributed spatial modes between the distributed spatial mode represented in FIG. 6 and the distributed spatial mode represented in FIG. 7D. FIG. 7B represents a midpoint between the distributed spatial mode represented in FIG. 6 and the distributed spatial mode represented in FIG. 7D. FIG. 7A represents a midpoint between the distributed spatial mode represented in FIG. 6 and the distributed spatial mode represented in FIG. 7B. FIG. 7C represents a midpoint between the distributed spatial mode represented in FIG. 7B and the distributed spatial mode represented in FIG. 7D.

Figure 8:
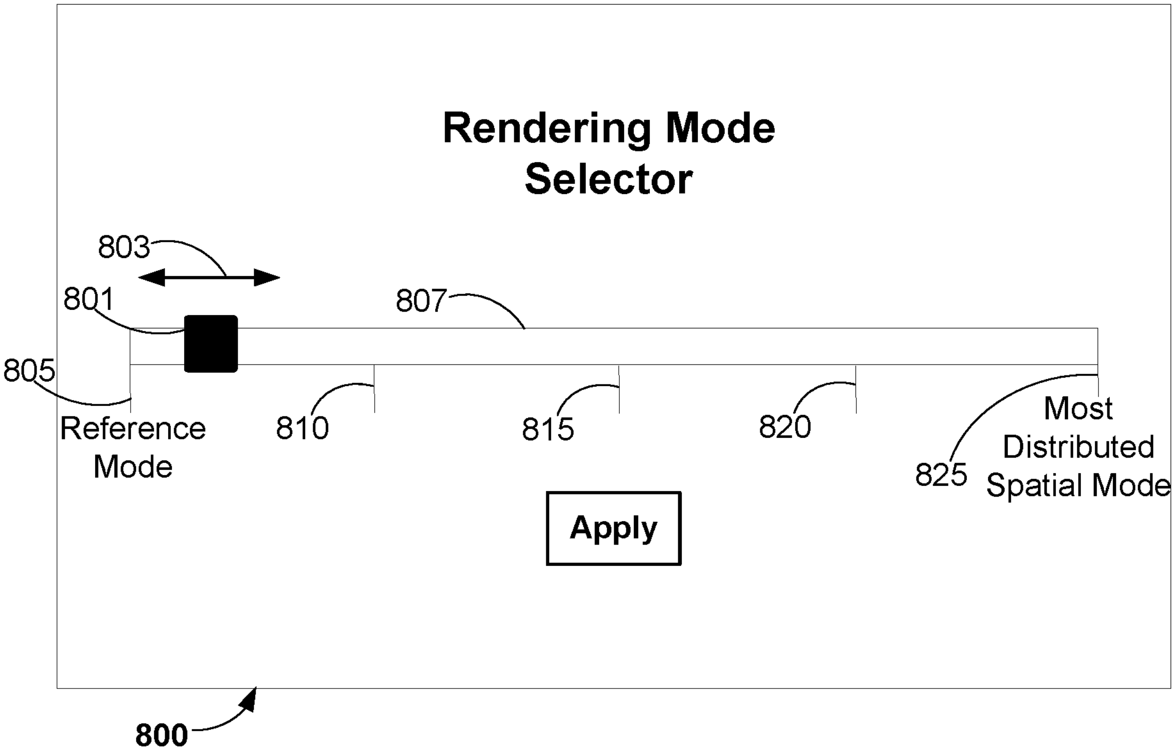
FIG. 8 shows an example of a GUI with which a user may select a rendering mode.

FIG. 8 shows an example of a GUI with which a user may select a rendering mode. According to some implementations, a control system may control a display device (e.g., a cellular telephone) to display the GUI 800, or a similar GUI, on a display. The display device may include a sensor system (such as a touch sensor system or a gesture sensor system proximate the display (e.g., overlying the display or under the display). The control system may be configured to receive user input via the GUI 800 in the form of sensor signals from the sensor system. The sensor signals may correspond with user touches or gestures corresponding with elements of the GUI 800.

According to this example, the GUI includes a virtual slider 801, with which a user may interact in order to select a rendering mode. As indicated by the arrows 803, a user may cause the slider to move in either direction along the track 807. In this example, the line 805 indicates a position of the virtual slider 801 that corresponds with a reference spatial mode, such as one of the reference spatial modes disclosed herein. Other implementations may provide other features on a GUI with which a user may interact, such as a virtual knob or dial. According to some implementations, after selecting a reference spatial mode, the control system may present a GUI such as that shown in FIG. 4A or another such GUI that allows the user to select a listener position and orientation for the reference spatial mode.

In this example, the line 825 indicates a position of the virtual slider 801 that corresponds with a most distributed spatial mode, such as the distributed spatial mode shown in FIG. 4B. According to this implementation, the lines 810, 815 and 820 indicate positions of the virtual slider 801 that correspond with intermediate spatial modes. In this example, the position of the line 810 corresponds with an intermediate spatial mode such as that of FIG. 7A. Here, the position of the line 815 corresponds with an intermediate spatial mode such as that of FIG. 7B. In this implementation, the position of the line 820 corresponds with an intermediate spatial mode such as that of FIG. 7C. According to this example, a user may interact with (e.g., touch) the “Apply” button in order to instruct the control system to implement a selected rendering mode.

However, other implementations may provide other ways for a user to select one of the foregoing distributed spatial modes. According to some examples, a user may utter a voice command, for example, “Play [insert name of content] in a half distributed mode.” The “half distributed mode” may correspond with a distributed mode indicated by the position of the line 815 in the GUI 800 of FIG. 8. According to some such examples, a user may utter a voice command, for example, “Play [insert name of content] in a one-quarter distributed mode.” The “one-quarter distributed mode” may correspond with a distributed mode indicated by the position of the line 810.

Figure 9:
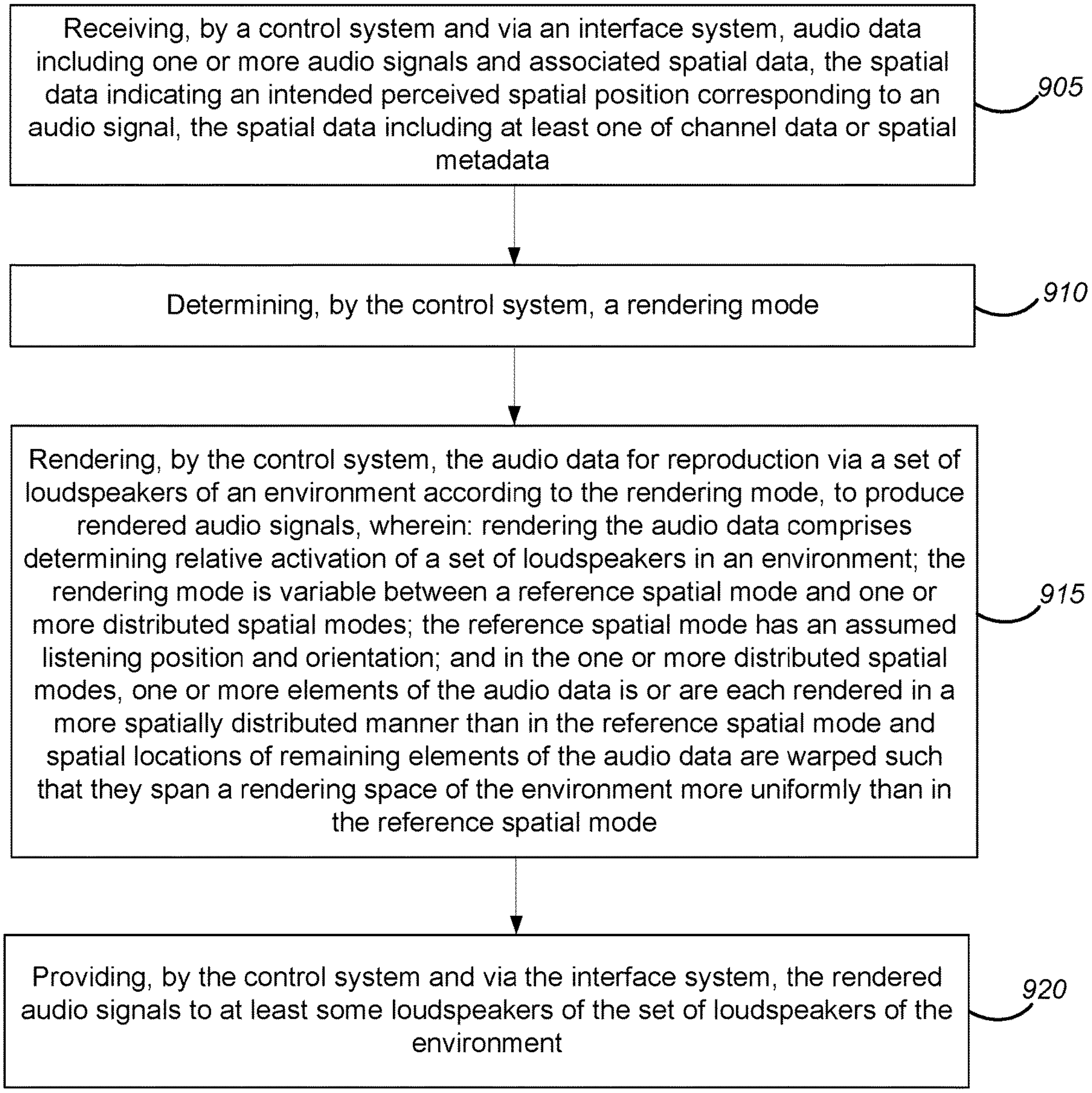
FIG. 9 is a flow diagram that outlines one example of a method that may be performed by an apparatus or system such as those disclosed herein.

FIG. 9 is a flow diagram that outlines one example of a method that may be performed by an apparatus or system such as those disclosed herein. The blocks of method 900, like other methods described herein, are not necessarily performed in the order indicated. In some implementations, one or more of the blocks of method 900 may be performed concurrently. Moreover, some implementations of method 900 may include more or fewer blocks than shown and/or described. The blocks of method 900 may be performed by one or more devices, which may be (or may include) a control system such as the control system 110 that is shown in FIG. 1A and described above, or one of the other disclosed control system examples.

In this implementation, block 905 involves receiving, by a control system and via an interface system, audio data including one or more audio signals and associated spatial data. In this example, the spatial data indicates an intended perceived spatial position corresponding to an audio signal. Here, the spatial data includes channel data and/or spatial metadata.

In this example, block 910 involves determining, by the control system, a rendering mode. Determining the rendering mode may, in some instances, involve receiving a rendering mode indication via the interface system. Receiving the rendering mode indication may, for example, involve receiving microphone signals corresponding to a voice command. In some examples, receiving the rendering mode indication may involve receiving sensor signals corresponding to user input via a graphical user interface. The sensor signals may, for example, be touch sensor signals and/or gesture sensor signals.

In some implementations, receiving the rendering mode indication may involve receiving an indication of a number of people in a listening area. According to some such examples, the control system may be configured for determining the rendering mode based, at least in part, on the number of people in the listening area. In some such examples, the indication of the number of people in the listening area may be based on microphone data from a microphone system and/or image data from a camera system.

According to the example shown in FIG. 9, block 915 involves rendering, by the control system, the audio data for reproduction via a set of loudspeakers of an environment according to the rendering mode determined in block 910, to produce rendered audio signals. In this example, rendering the audio data involves determining relative activation of a set of loudspeakers in an environment. Here, the rendering mode is variable between a reference spatial mode and one or more distributed spatial modes. In this implementation, the reference spatial mode has an assumed listening position and orientation. According to this example, in the one or more distributed spatial modes, one or more elements of the audio data is or are each rendered in a more spatially distributed manner than in the reference spatial mode. In this example, in the one or more distributed spatial modes, spatial locations of remaining elements of the audio data are warped such that they span a rendering space of the environment more completely than in the reference spatial mode.

In some implementations, rendering the one or more elements of the audio data in a more spatially distributed manner than in the reference spatial mode may involve creating copies of the one or more elements. Some such implementations may involve rendering all of the copies simultaneously at a distributed set of positions across the environment.

According to some implementations, the rendering may be based on CMAP, FV or a combination thereof. Rendering the one or more elements of the audio data in a more spatially distributed manner than in the reference spatial mode may involve warping a rendering position of each of the one or more elements towards a zero radius.

In this example, block 920 involves providing, by the control system and via the interface system, the rendered audio signals to at least some loudspeakers of the set of loudspeakers of the environment.

According to some implementations, the rendering mode may be selectable from a continuum of rendering modes ranging from the reference spatial mode to a most distributed spatial mode. In some such implementations, the control system may be further configured to determine the assumed listening position and/or orientation of the reference spatial mode according to reference spatial mode data received via the interface system. According to some such implementations, the reference spatial mode data may include microphone data from a microphone system and/or image data from a camera system. In some such examples, the reference spatial mode data may include microphone data corresponding to a voice command. Alternatively, or additionally, the reference spatial mode data may include microphone data corresponding to a location of one or more utterances of a person in the listening environment. In some such examples, the reference spatial mode data may include image data indicating the location and/or orientation of a person in the listening environment.

However, in some instances the apparatus or system may include a display device and a sensor system proximate the display device. The control system may be configured for controlling the display device to present a graphical user interface. Receiving reference spatial mode data may involve receiving sensor signals corresponding to user input via the graphical user interface.

According to some implementations, the one or more elements of the audio data each rendered in a more spatially distributed manner may correspond to front sound stage data, music vocals, dialogue, bass, percussion, and/or other solo or lead instruments. In some instances, the front sound stage data may include the left, right or center signals of audio data received in, or upmixed to, a Dolby 5.1, Dolby 7.1 or Dolby 9.1 format. In some examples, the front sound stage data may include audio data received in Dolby Atmos format and having spatial metadata indicating an (x,y) spatial position wherein $y<0.5$ In some instances, the audio data may include spatial distribution metadata indicating which elements of the audio data are to be rendered in a more spatially distributed manner. In some such examples, the control system may be configured for identifying the one or more elements of the audio data to be rendered in a more spatially distributed manner according to the spatial distribution metadata.

Alternatively, or additionally, the control system may be configured for implementing a content type classifier to identify the one or more elements of the audio data to be rendered in a more spatially distributed manner. In some examples, the content type classifier may refer to content type metadata, (e.g., metadata that indicates that the audio data is dialogue, vocals, percussion, bass, etc.) in order to determine whether the audio data should be rendered in a more spatially distributed manner According to some such implementations, the content type metadata to be rendered in a more spatially distributed manner may be selectable by a user, e.g., according to user input via a GUI displayed on a display device.

Alternatively, or additionally, the content type classifier may operate directly on the audio signals in combination with the rendering system. For example, classifiers may be implemented using neural networks trained on a variety of content types to analyze the audio signals and determine if they belong to any content type (vocals, lead guitar, drums, etc.) that may be deemed appropriate for rendering in a more spatially distributed manner. Such classification may be performed in a continuous and dynamic manner, and the resulting classification results may also adjust the set of signals being rendered in a more spatially distributed manner in a continuous and dynamic manner. Some such implementations may involve the use of technology such as neural networks to implement such a dynamic classification system according to methods that are known in the art.

In some examples, at least one of the one or more distributed spatial modes may involve applying a time-varying modification to the spatial location of at least one element. According to some such examples, the time-varying modification may be a periodic modification. For example, the periodic modification may involve revolving one or more rendering locations around a periphery of the listening environment. According to some such implementations, the periodic modification may involve a tempo of music being reproduced in the environment, a beat of music being reproduced in the environment, or one or more other features of audio data being reproduced in the environment. For example, some such periodic modifications may involve alternating between two, three, four or more rendering locations. The alternations may correspond to a beat of music being reproduced in the environment. In some implementations, the periodic modification may be selectable according to user input, e.g., according to one or more voice commands, according to user input received via a GUI, etc.

Figure 10:
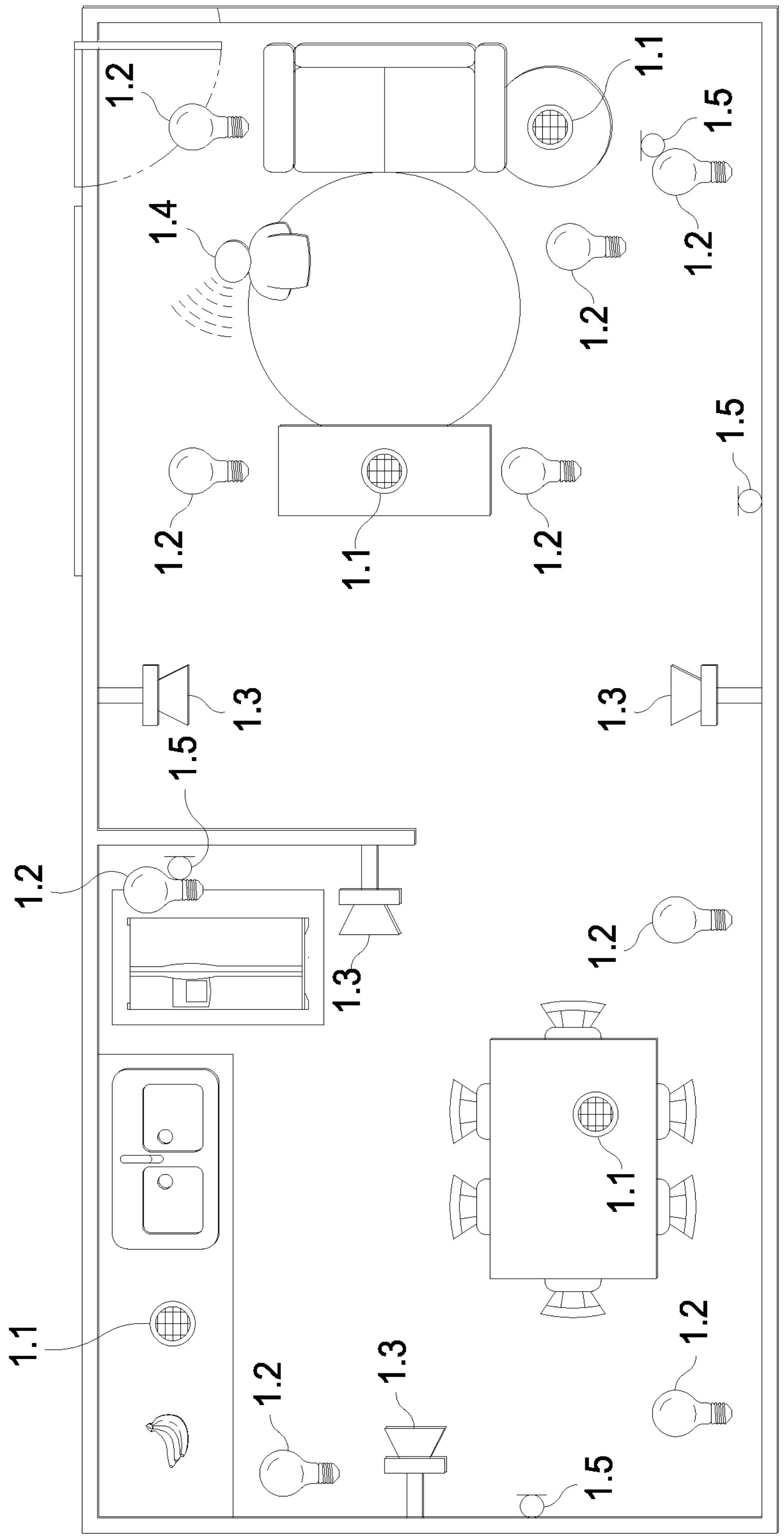
FIG. 10 is a diagram of an environment, which is a living space in this example.

FIG. 10 is a diagram of an environment, which is a living space in this example. The environment shown in FIG. 10 includes a set of smart audio devices (devices 1.1) for audio interaction, speakers (1.3) for audio output, and controllable lights (1.2). In an example, only the devices 1.1 contain microphones and therefore have a sense of where is a user (1.4) who issues a vocal utterance (e.g., wakeword command) Using various methods, information may be obtained collectively from these devices to provide a positional estimate (e.g., a fine grained positional estimation) of the user who issues (e.g., speaks) the wakeword.

In such a living space there are a set of natural activity zones where a person would be performing a task or activity, or crossing a threshold. These action areas (zones) are where there may be an effort to estimate the location (e.g., to determine an uncertain location) or context of the user to assist with other aspects of the interface. A rendering system including (i.e., implemented by) at least some of the devices 1.1 and speakers 1.3 (and/or, optionally, at least one other subsystem or device) may operate to render audio for playback (e.g., by some or all of speakers 1.3) in the living space or in one or more zones thereof. It is contemplated that such rendering system may be operable in either a reference spatial mode or a distributed spatial mode in accordance with any embodiment of the disclosed method. In the FIG. 8 example, the key action areas are:

1. The kitchen sink and food preparation area (in the upper left region of the living space);
2. The refrigerator door (to the right of the sink and food preparation area);
3. The dining area (in the lower left region of the living space);
4. The open area of the living space (to the right of the sink and food preparation area and dining area);
5. The TV couch (at the right of the open area);
6. The TV itself;
7. Tables; and
8. The door area or entry way (in the upper right region of the living space).

There are often a similar number of lights with similar positioning to suit action areas. Some or all of the lights may be individually controllable networked agents.

In accordance with some embodiments, audio is rendered (e.g., by one of devices 1.1, or another device of the FIG. 8 system) for playback (in accordance with any disclosed embodiment) by one or more of the speakers 1.3 (and/or speaker(s) of one or more of devices 1.1).

Figure 11:
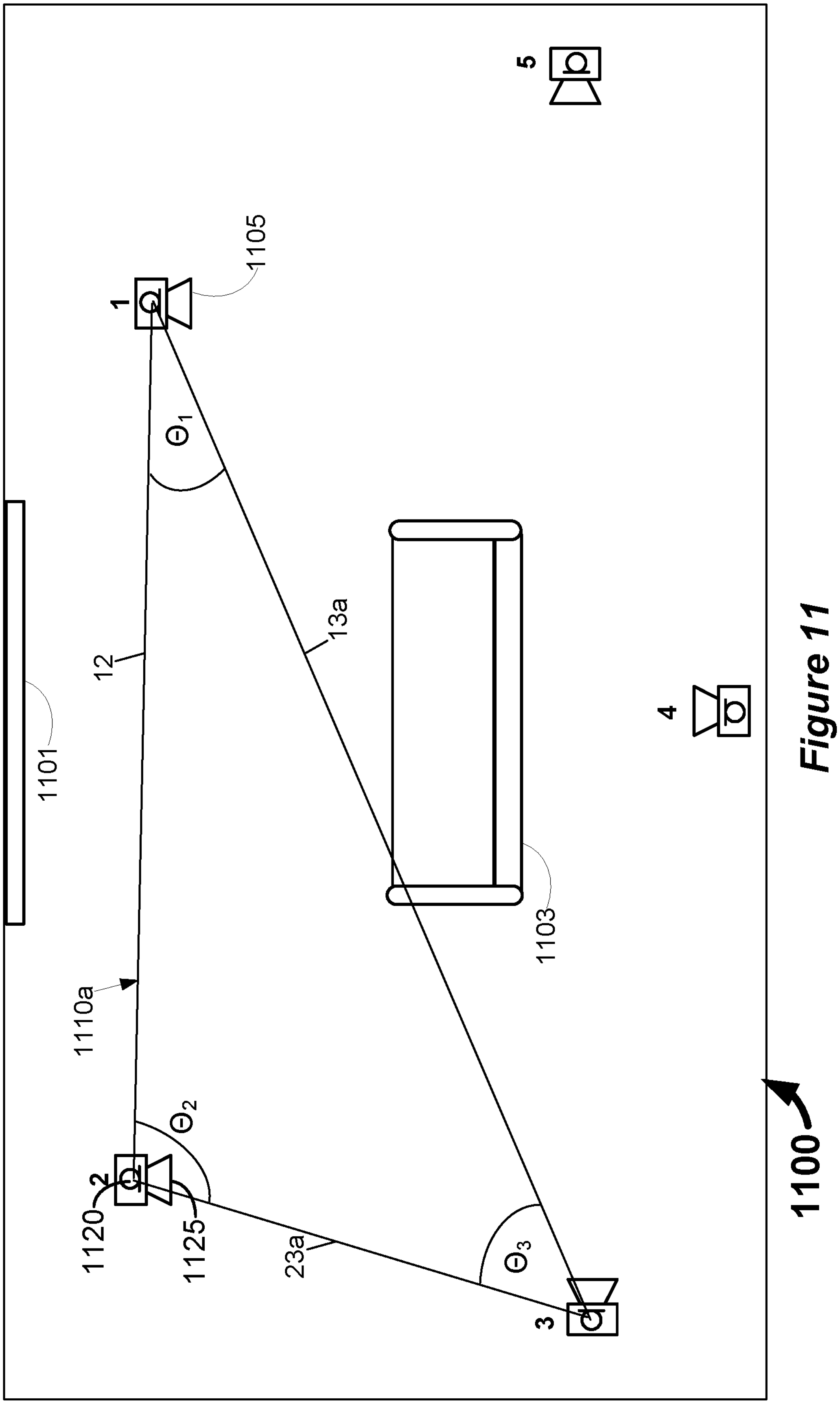
FIG. 11 shows an example of geometric relationships between three audio devices in an environment.

FIG. 11 shows an example of geometric relationships between three audio devices in an environment. In this example, the environment 1100 is a room that includes a television 101, a sofa 1103 and five audio devices 1105. According to this example, the audio devices 1105 are in locations 1 through 5 of the environment 1100. In this implementation, each of the audio devices 1105 includes a microphone system 1120 having at least three microphones and a speaker system 1125 that includes at least one speaker. In some implementations, each microphone system 1120 includes an array of microphones. According to some implementations, each of the audio devices 1105 may include an antenna system that includes at least three antennas.

As with other examples disclosed herein, the type, number and arrangement of elements shown in FIG. 11 are merely made by way of example. Other implementations may have different types, numbers and arrangements of elements, e.g., more or fewer audio devices 1105, audio devices 1105 in different locations, etc.

In this example, the triangle 1110*a* has its vertices at locations 1, 2 and 3. Here, the triangle 1110*a* has sides 12, 23*a* and 13*a*. According to this example, the angle between sides 12 and 23 is $\theta_2$, the angle between sides 12 and 13*a* is $\theta_1$ and the angle between sides 23*a* and 13*a* is $\theta_3$. These angles may be determined according to DOA data, as described in more detail below.

In some implementations, only the relative lengths of triangle sides may be determined. In alternative implementations, the actual lengths of triangle sides may be estimated. According to some such implementations, the actual length of a triangle side may be estimated according to TOA data, e.g., according to the time of arrival of sound produced by an audio device located at one triangle vertex and detected by an audio device located at another triangle vertex. Alternatively, or additionally, the length of a triangle side may be estimated according to electromagnetic waves produced by an audio device located at one triangle vertex and detected by an audio device located at another triangle vertex. For example, the length of a triangle side may be estimated according to the signal strength of electromagnetic waves produced by an audio device located at one triangle vertex and detected by an audio device located at another triangle vertex. In some implementations, the length of a triangle side may be estimated according to a detected phase shift of electromagnetic waves.

Figure 12:
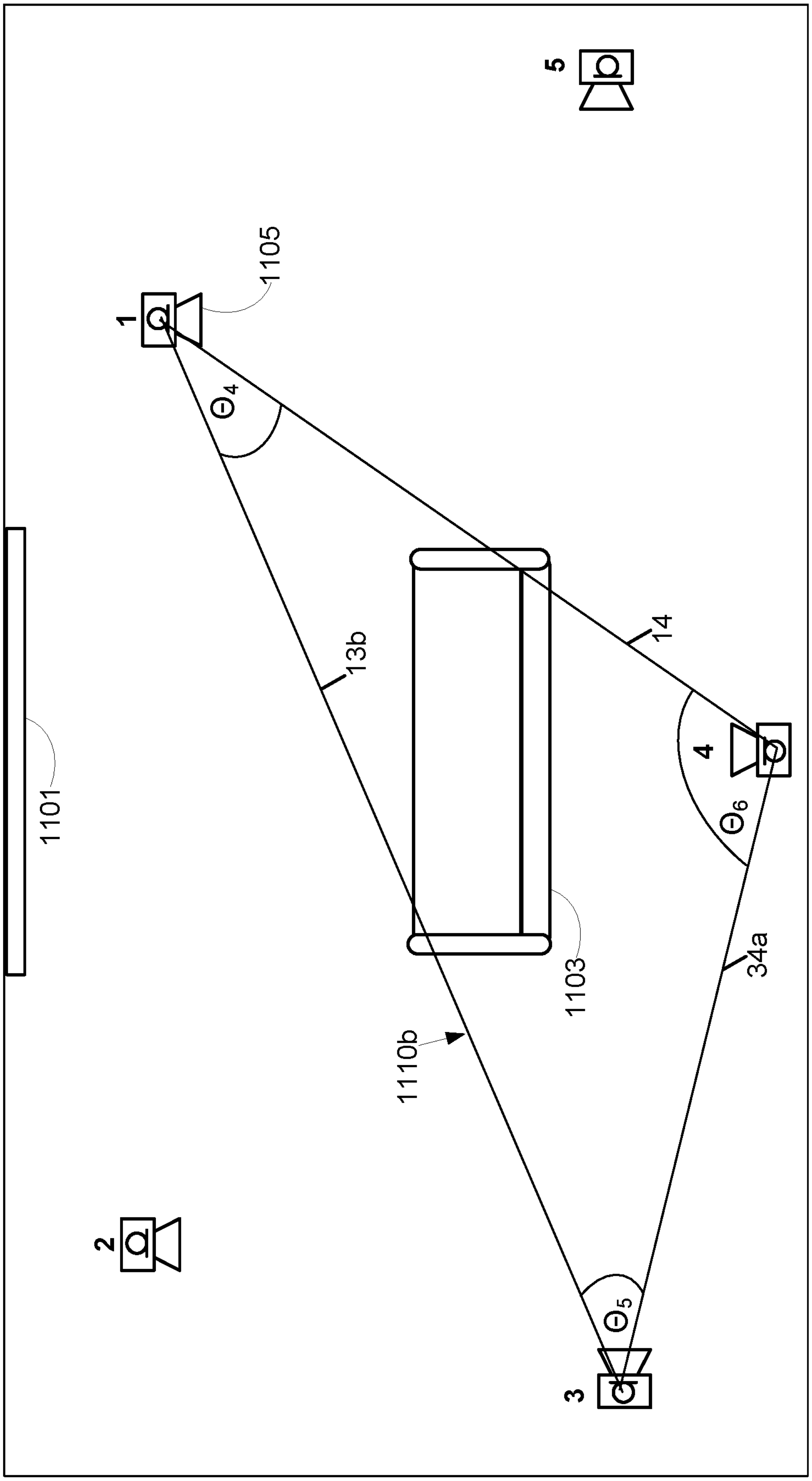
FIG. 12 shows another example of geometric relationships between three audio devices in the environment shown in FIG. 11.

FIG. 12 shows another example of geometric relationships between three audio devices in the environment shown in FIG. 11. In this example, the triangle 1110*b* has its vertices at locations 1, 3 and 4. Here, the triangle 1110*b* has sides 13*b*, 14 and 34*a*. According to this example, the angle between sides 13*b* and 14 is $\theta_4$, the angle between sides 13*b* and 34*a* is $\theta_5$ and the angle between sides 34*a* and 14 is $\theta_6$.

By comparing FIGS. 11 and 12, one may observe that the length of side 13*a* of triangle 1110*a* should equal the length of side 13*b* of triangle 1110*b*. In some implementations, the side lengths of one triangle (e.g., triangle 1110*a*) may be assumed to be correct, and the length of a side shared by an adjacent triangle will be constrained to this length.

Figure 13A:
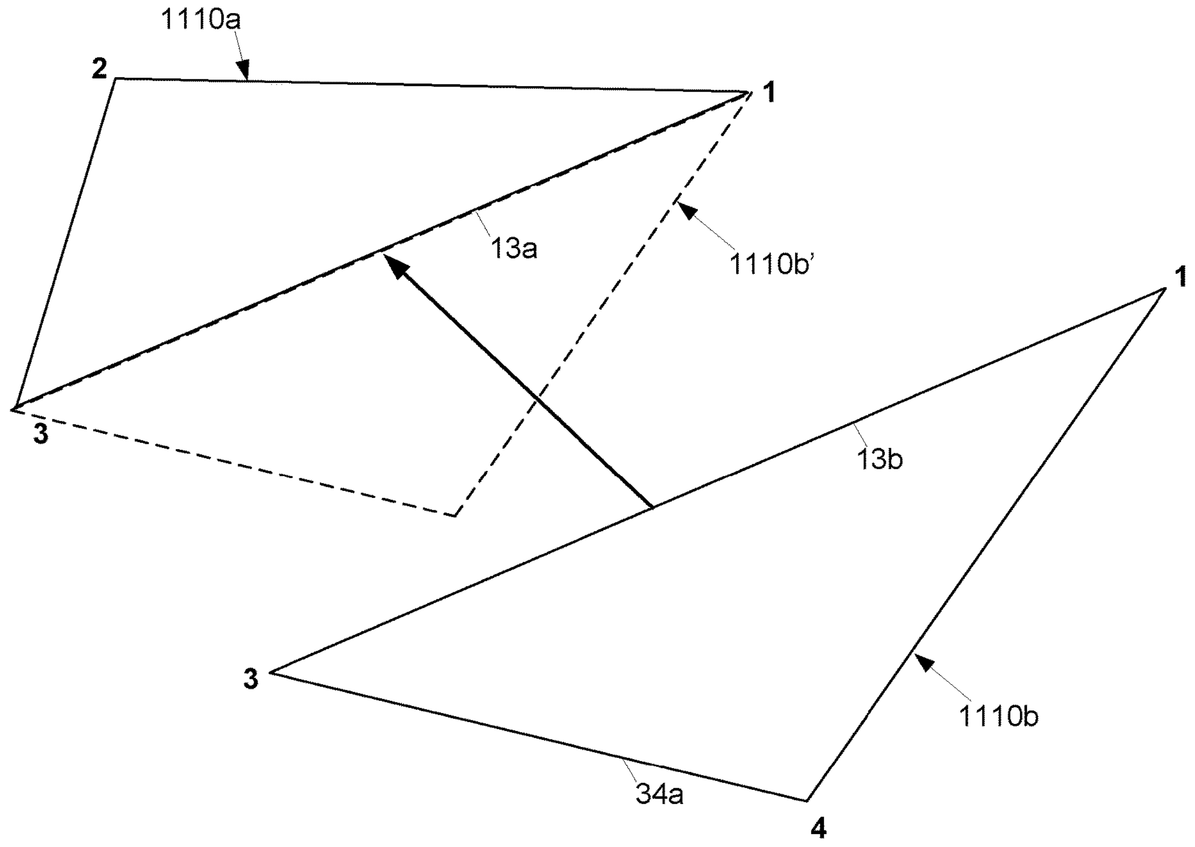
FIG. 13A shows both of the triangles depicted in FIGS. 11 and 12, without the corresponding audio devices and the other features of the environment.

FIG. 13A shows both of the triangles depicted in FIGS. 11 and 12, without the corresponding audio devices and the other features of the environment. FIG. 13A shows estimates of the side lengths and angular orientations of triangles 1110*a* and 1110*b*. In the example shown in FIG. 13A, the length of side 13*b* of triangle 1110*b* is constrained to be the same length as side 13*a* of triangle 1110*a*. The lengths of the other sides of triangle 1110*b* are scaled in proportion to the resulting change in the length of side 13*b*. The resulting triangle 1110*b*' is shown in FIG. 13A, adjacent to the triangle 1110*a*.

According to some implementations, the side lengths of other triangles adjacent to triangle 1110*a* and 1110*b* may be all determined in a similar fashion, until all of the audio device locations in the environment 1100 have been determined.

Some examples of audio device location may proceed as follows. Each audio device may report the DOA of every other audio device in an environment (e.g., a room) based on sounds produced by every other audio device in the environment. The Cartesian coordinates of the ith audio device may be expressed as $x_i=[x_i, y_i]^T$, where the superscript T indicates a vector transpose. Given M audio devices in the environment, i={1 . . . M}.

Figure 13B:
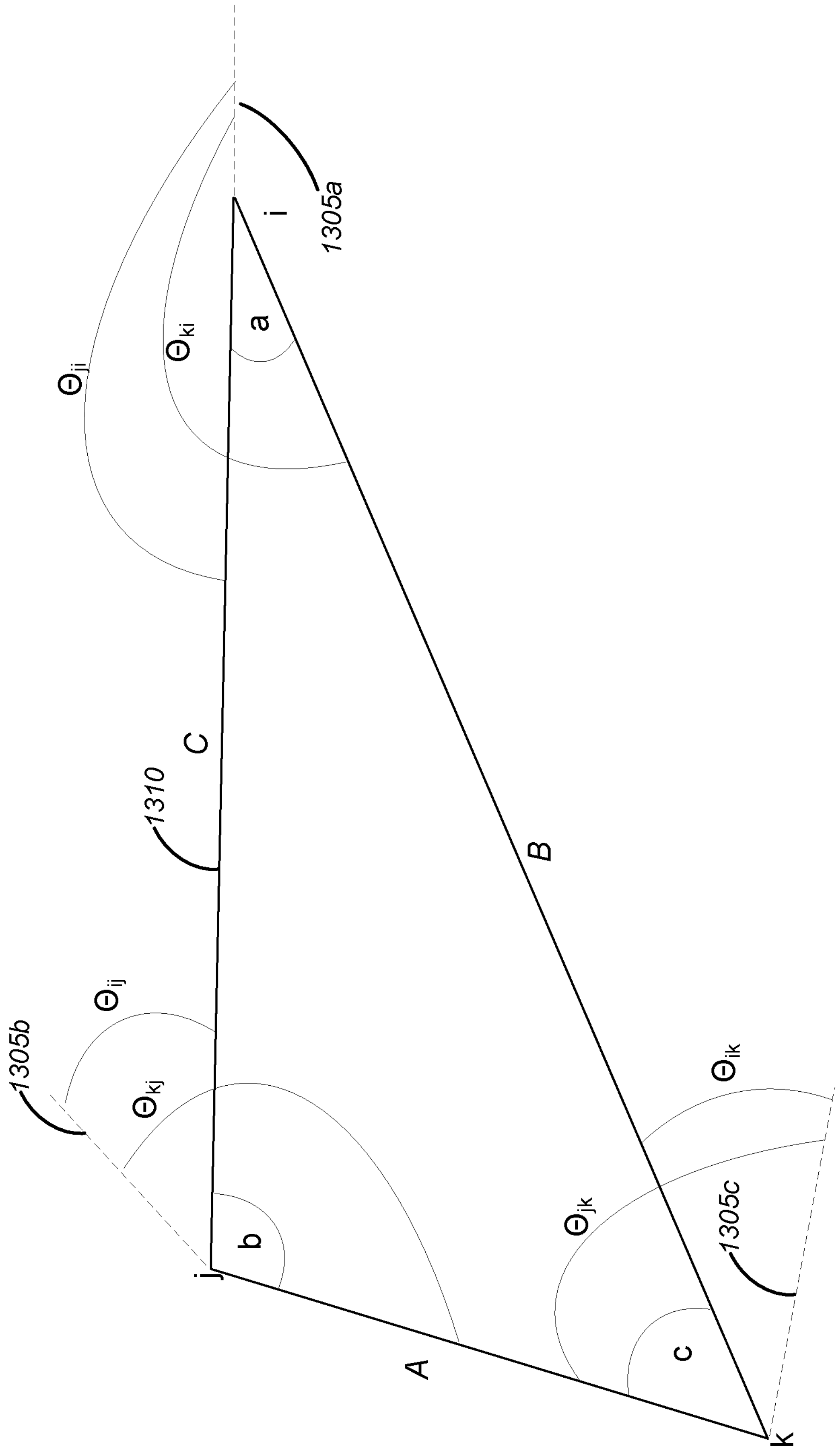
FIG. 13B shows an example of estimating the interior angles of a triangle formed by three audio devices.

FIG. 13B shows an example of estimating the interior angles of a triangle formed by three audio devices. In this example, the audio devices are i, j and k. The DOA of a sound source emanating from device j as observed from device i may be expressed as $\theta_{ji}$. The DOA of a sound source emanating from device k as observed from device i may be expressed as $\theta_{ki}$. In the example shown in FIG. 13B, $\theta_{ji}$ and $\theta_{ki}$ are measured from axis 1305*a*, the orientation of which is arbitrary and which may, for example, correspond to the orientation of audio device i. Interior angle a of triangle 1310 may be expressed as $a=\theta_{ki}-\theta_{ji}$. One may observe that the calculation of interior angle a does not depend on the orientation of the axis 1305*a*.

In the example shown in FIG. 13B, $\theta_{ij}$ and $\theta_{kj}$ are measured from axis 1305*b*, the orientation of which is arbitrary and which may correspond to the orientation of audio device j. Interior angle b of triangle 1310 may be expressed as $b=\theta_{ij}-\theta_{kj}$. Similarly, $\theta_{jk}$ and $\theta_{ik}$ are measured from axis 1305*c* in this example. Interior angle c of triangle 1310 may be expressed as $c=\theta_{jk}-\theta_{ik}$.

In the presence of measurement error, $a+b+c\neq180°$. Robustness can be improved by predicting each angle from the other two angles and averaging, e.g., as follows:

$$\tilde{a}=0.5(a+\text{sgn}(a)(180-|b+c|)).$$

In some implementations, the edge lengths (A, B, C) may be calculated (up to a scaling error) by applying the sine rule. In some examples, one edge length may be assigned an arbitrary value, such as 1. For example, by making A=1 and placing vertex $\hat{x}_a=[0,0]^T$ at the origin, the locations of the remaining two vertices may be calculated as follows:

$$\hat{x}_b=[A\cos a,-A\sin a]^T,\hat{x}_c=[B,0]^T$$

However, an arbitrary rotation may be acceptable.

According to some implementations, the process of triangle parameterization may be repeated for all possible subsets of three audio devices in the environment, enumerated in superset ζ of size $$N=\binom{M}{3}.$$

In some examples, $T_l$ may represent the lth triangle. Depending on the implementation, triangles may not be enumerated in any particular order. The triangles may overlap and may not align perfectly, due to possible errors in the DOA and/or side length estimates.

Figure 14:
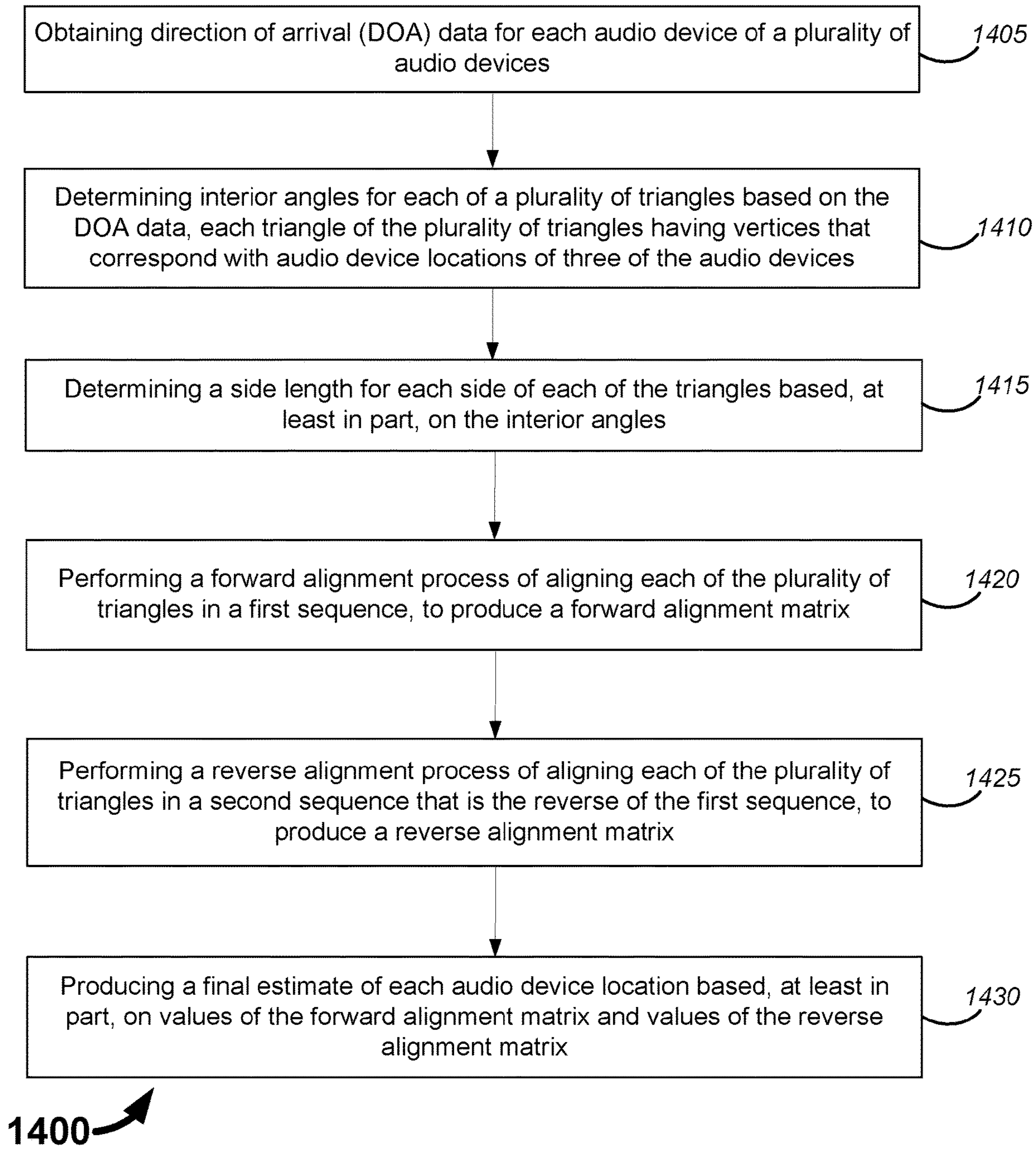
FIG. 14 is a flow diagram that outlines one example of a method that may be performed by an apparatus such as that shown in FIG. 1.

FIG. 14 is a flow diagram that outlines one example of a method that may be performed by an apparatus such as that shown in FIG. 1. The blocks of method 1400, like other methods described herein, are not necessarily performed in the order indicated. Moreover, such methods may include more or fewer blocks than shown and/or described. In this implementation, method 1400 involves estimating a speaker's location in an environment. The blocks of method 1400 may be performed by one or more devices, which may be (or may include) the apparatus 100 shown in FIG. 1.

In this example, block 1405 involves obtaining direction of arrival (DOA) data for each audio device of a plurality of audio devices. In some examples, the plurality of audio devices may include all of the audio devices in an environment, such as all of the audio devices 1105 shown in FIG. 11.

However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to this example, block 1410 involves determining interior angles for each of a plurality of triangles based on the DOA data. In this example, each triangle of the plurality of triangles has vertices that correspond with audio device locations of three of the audio devices. Some such examples are described above.

Figure 15:
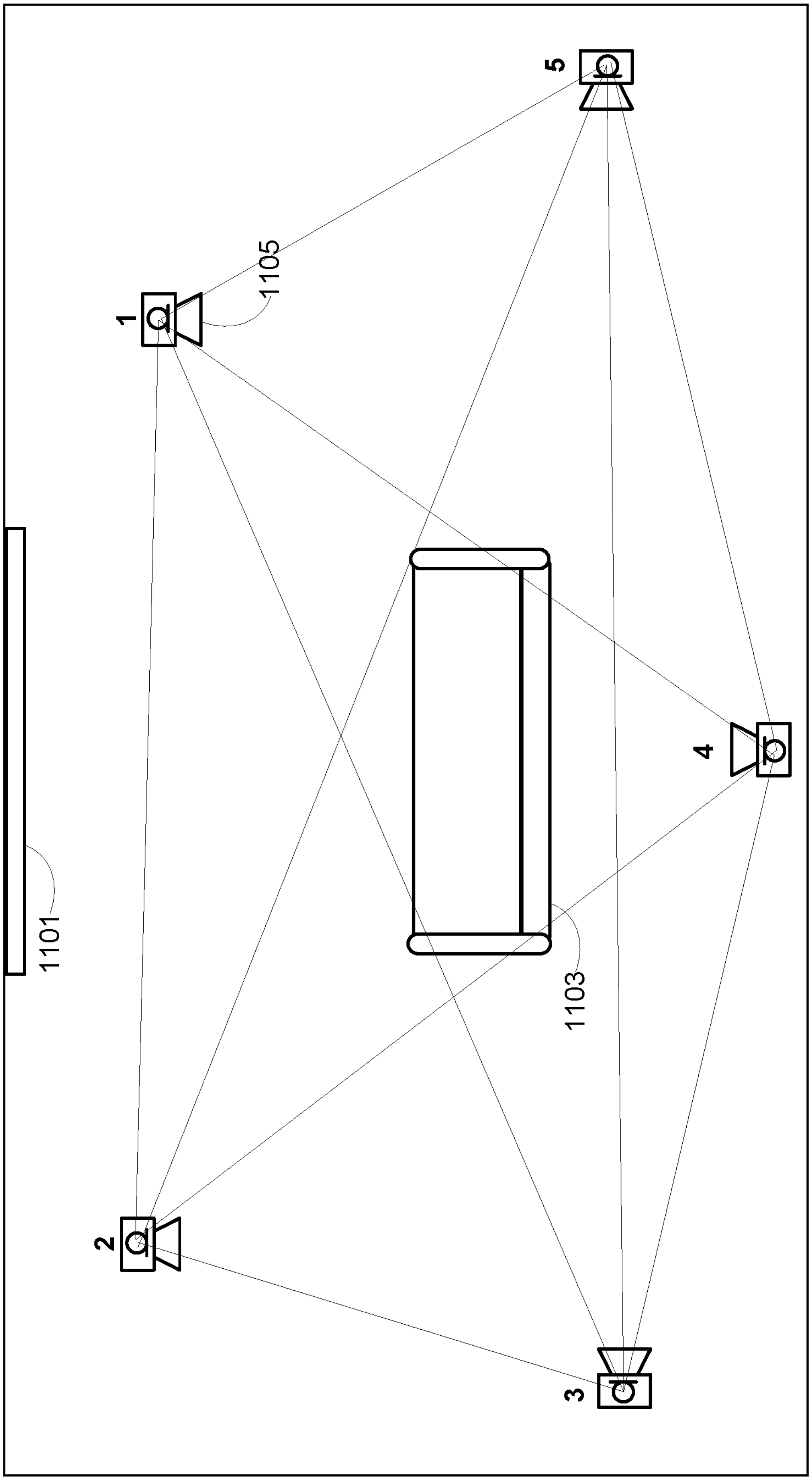
FIG. 15 shows an example in which each audio device in an environment is a vertex of multiple triangles.

FIG. 15 shows an example in which each audio device in an environment is a vertex of multiple triangles. The sides of each triangle correspond with distances between two of the audio devices 1105.

In this implementation, block 1415 involves determining a side length for each side of each of the triangles. (A side of a triangle may also be referred to herein as an "edge.") According to this example, the side lengths are based, at least in part, on the interior angles. In some instances, the side lengths may be calculated by determining a first length of a first side of a triangle and determining lengths of a second side and a third side of the triangle based on the interior angles of the triangle. Some such examples are described above.

According to some such implementations, determining the first length may involve setting the first length to a predetermined value. However, determining the first length may, in some examples, be based on time-of-arrival data and/or received signal strength data. The time-of-arrival data and/or received signal strength data may, in some implementations, correspond to sound waves from a first audio device in an environment that are detected by a second audio device in the environment. Alternatively, or additionally, the time-of-arrival data and/or received signal strength data may correspond to electromagnetic waves (e.g., radio waves, infrared waves, etc.) from a first audio device in an environment that are detected by a second audio device in the environment.

According to this example, block 1420 involves performing a forward alignment process of aligning each of the plurality of triangles in a first sequence. According to this example, the forward alignment process produces a forward alignment matrix.

According to some such examples, triangles are expected to align in such a way that an edge $(x_i, x_j)$ is equal to a neighboring edge, e.g., as shown in FIG. 13A and described above. Let $\varepsilon$ be the set of all edges of size $$P = \binom{M}{2}.$$

In some such implementations, block 1420 may involve traversing through $\varepsilon$ and aligning the common edges of triangles in forward order by forcing an edge to coincide with that of a previously aligned edge.

Figure 16:
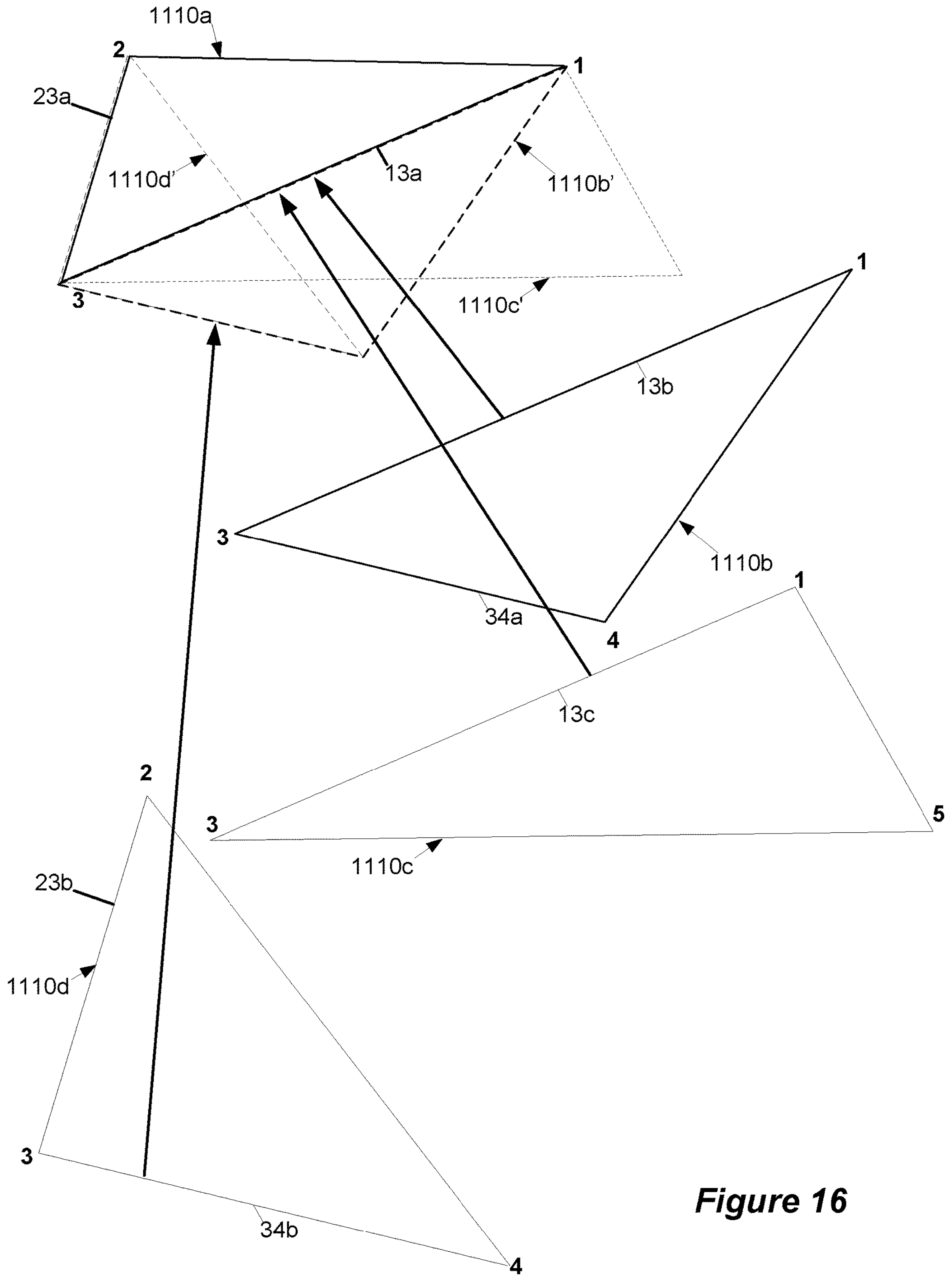
FIG. 16 provides an example of part of a forward alignment process.

FIG. 16 provides an example of part of a forward alignment process. The numbers 1 through 5 that are shown in bold in FIG. 16 correspond with the audio device locations shown in FIGS. 1, 2 and 5. The sequence of the forward alignment process that is shown in FIG. 16 and described herein is merely an example.

In this example, as in FIG. 13A, the length of side 13*b* of triangle 1110*b* is forced to coincide with the length of side 13*a* of triangle 1110*a*. The resulting triangle 1110*b*' is shown in FIG. 16, with the same interior angles maintained. According to this example, the length of side 13*c* of triangle 1110*c* is also forced to coincide with the length of side 13*a* of triangle 1110*a*. The resulting triangle 1110*c*' is shown in FIG. 16, with the same interior angles maintained.

Next, in this example, the length of side 34*b* of triangle 1110*d* is forced to coincide with the length of side 34*a* of triangle 1110*b*'. Moreover, in this example, the length of side 23*b* of triangle 1110*d* is forced to coincide with the length of side 23*a* of triangle 1110*a*. The resulting triangle 1110*d*' is shown in FIG. 16, with the same interior angles maintained. According to some such examples, the remaining triangles shown in FIG. 5 may be processed in the same manner as triangles 1110*b*, 1110*c* and 1110*d*.

The results of the forward alignment process may be stored in a data structure. According to some such examples, the results of the forward alignment process may be stored in a forward alignment matrix. For example, the results of the forward alignment process may be stored in matrix $\vec{X} \in \mathbb{R}^{3N\times 2}$, where N indicates the total number of triangles.

When the DOA data and/or the initial side length determinations contain errors, multiple estimates of audio device location will occur. The errors will generally increase during the forward alignment process.

Figure 17:
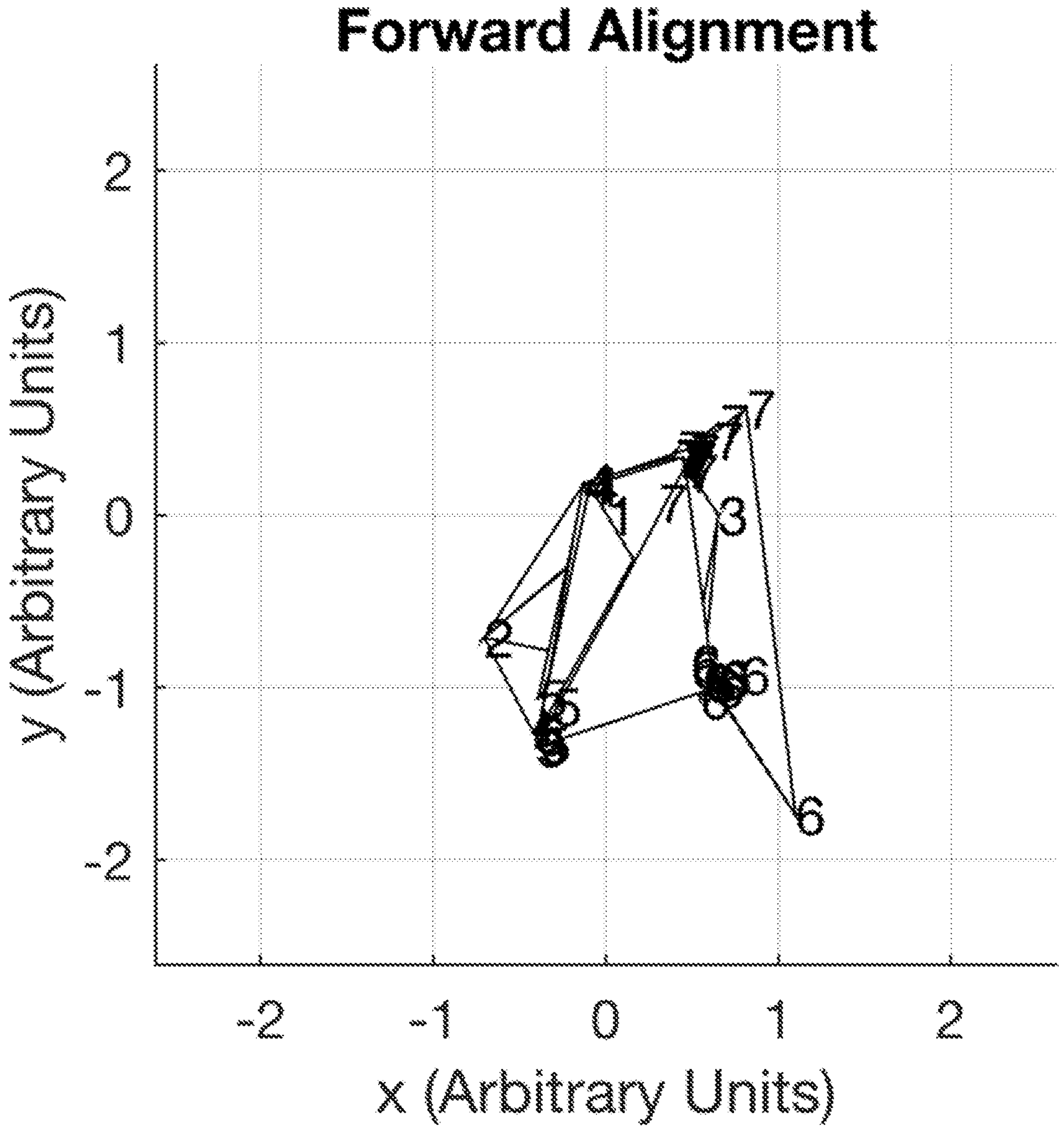
FIG. 17 shows an example of multiple estimates of audio device location that have occurred during a forward alignment process.

FIG. 17 shows an example of multiple estimates of audio device location that have occurred during a forward alignment process. In this example, the forward alignment process is based on triangles having seven audio device locations as their vertices. Here, the triangles do not align perfectly due to additive errors in the DOA estimates. The locations of the numbers 1 through 7 that are shown in FIG. 17 correspond to the estimated audio device locations produced by the forward alignment process. In this example, the audio device location estimates labelled "1" coincide but the audio device locations estimates for audio devices 6 and 7 show larger differences, as indicted by the relatively larger areas over which the numbers 6 and 7 are located.

Returning to FIG. 14, in this example block 1425 involves a reverse alignment process of aligning each of the plurality of triangles in a second sequence that is the reverse of the first sequence. According to some implementations, the reverse alignment process may involve traversing through E as before, but in reverse order. In alternative examples, the reverse alignment process may not be precisely the reverse of the sequence of operations of the forward alignment process. According to this example, the reverse alignment process produces a reverse alignment matrix, which may be represented herein as $\overleftarrow{\mathbf{X}} \in \mathbb{R}^{3N\times 2}$.

Figure 18:
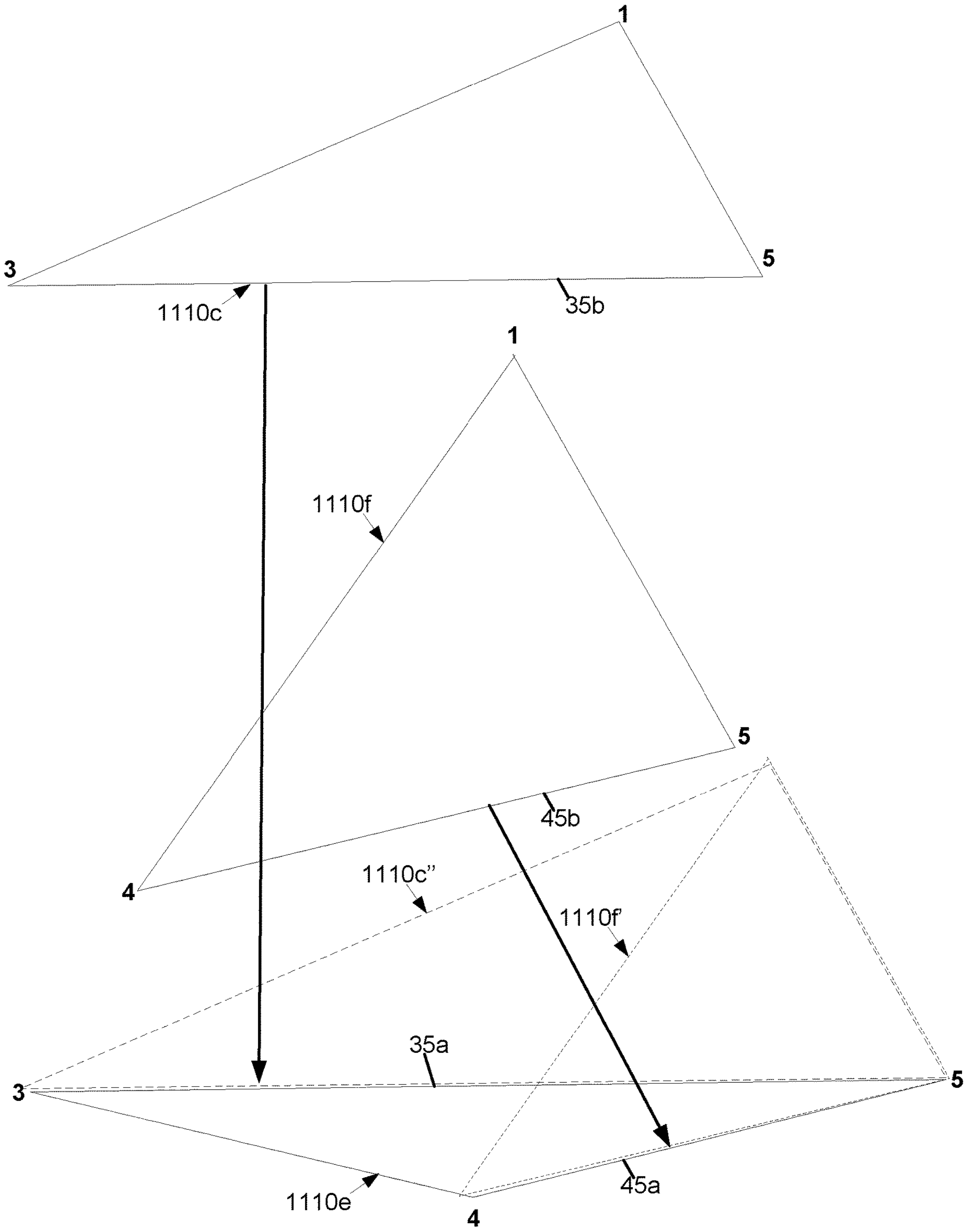
FIG. 18 provides an example of part of a reverse alignment process.

FIG. 18 provides an example of part of a reverse alignment process. The numbers 1 through 5 that are shown in bold in FIG. 18 correspond with the audio device locations shown in FIGS. 11, 21 and 15. The sequence of the reverse alignment process that is shown in FIG. 18 and described herein is merely an example.

In the example shown in FIG. 18, triangle 1110*e* is based on audio device locations 3, 4 and 5. In this implementation, the side lengths (or "edges") of triangle 1110*e* are assumed to be correct, and the side lengths of adjacent triangles are forced to coincide with them. According to this example, the length of side 45*b* of triangle 1110*f* is forced to coincide with the length of side 45*a* of triangle 1110*e*. The resulting triangle 1110*f*', with interior angles remaining the same, is shown in FIG. 18. In this example, the length of side 35*b* of triangle 1110*c* is forced to coincide with the length of side 35*a* of triangle 1110*e*. The resulting triangle 1110*c*", with interior angles remaining the same, is shown in FIG. 18. According to some such examples, the remaining triangles shown in FIG. 5 may be processed in the same manner as triangles 1110*c* and 1110*f*, until the reverse alignment process has included all remaining triangles.

Figure 19:
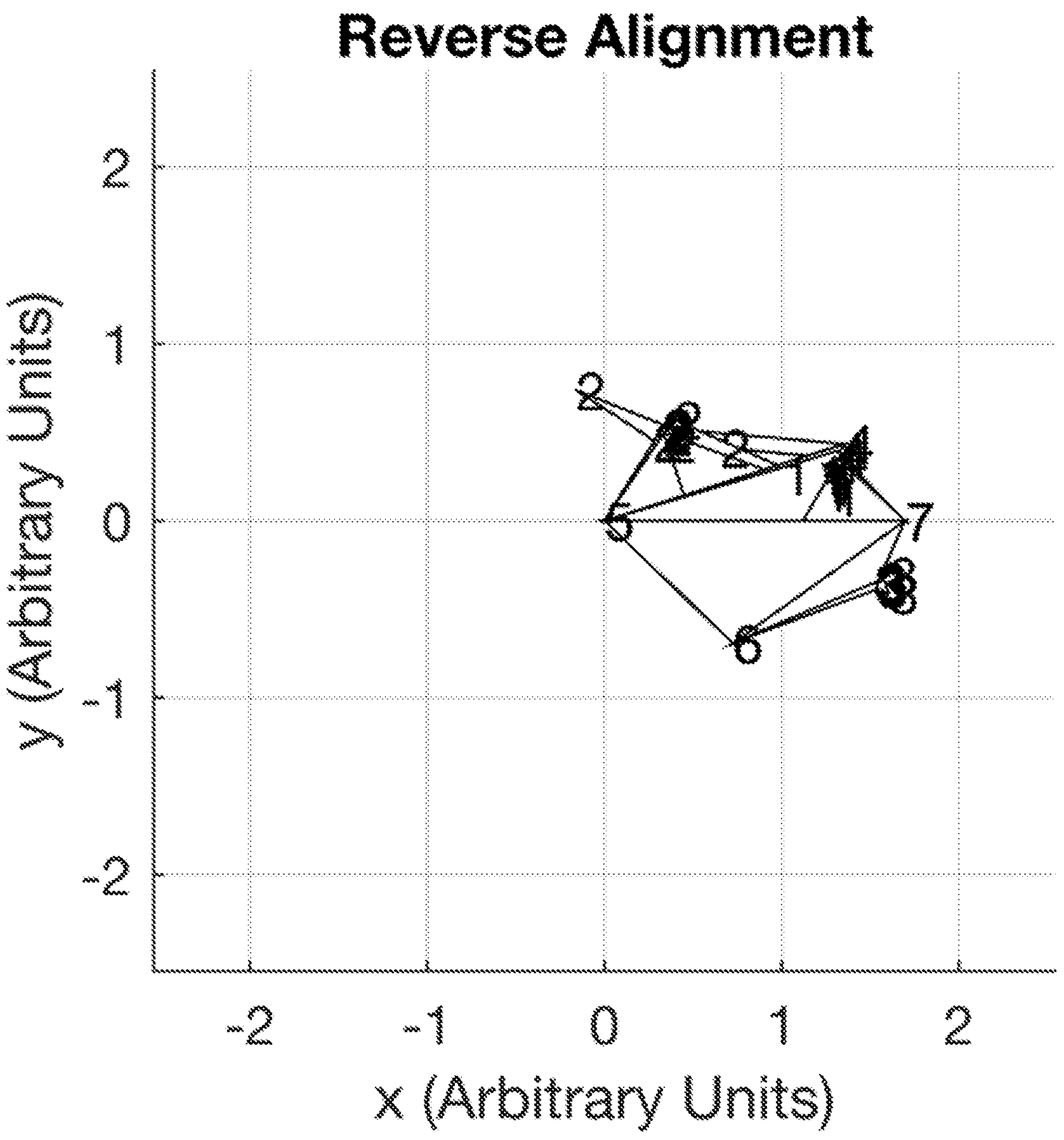
FIG. 19 shows an example of multiple estimates of audio device location that have occurred during a reverse alignment process.

FIG. 19 shows an example of multiple estimates of audio device location that have occurred during a reverse alignment process. In this example, the reverse alignment process is based on triangles having the same seven audio device locations as their vertices that are described above with reference to FIG. 17. The locations of the numbers 1 through 7 that are shown in FIG. 19 correspond to the estimated audio device locations produced by the reverse alignment process. Here again, the triangles do not align perfectly due to additive errors in the DOA estimates. In this example, the audio device location estimates labelled 6 and 7 coincide, but the audio device location estimates for audio devices 1 and 2 show larger differences.

Returning to FIG. 14, block 1430 involves producing a final estimate of each audio device location based, at least in part, on values of the forward alignment matrix and values of the reverse alignment matrix. In some examples, producing the final estimate of each audio device location may involve translating and scaling the forward alignment matrix to produce a translated and scaled forward alignment matrix, and translating and scaling the reverse alignment matrix to produce a translated and scaled reverse alignment matrix.

For example, translation and scaling are fixed by moving the centroids to the origin and forcing unit Frobenius norm, e.g., $\vec{\bar{\mathbf{X}}} = \vec{X}/\|\vec{X}\|_2^F$ and $\overleftarrow{\bar{\mathbf{X}}} = \overleftarrow{\mathbf{X}}/\|\overleftarrow{\mathbf{X}}\|_2^F$.

According to some such examples, producing the final estimate of each audio device location also may involve producing a rotation matrix based on the translated and scaled forward alignment matrix and the translated and scaled reverse alignment matrix. The rotation matrix may include a plurality of estimated audio device locations for each audio device. An optimal rotation between forward and reverse alignments is can be found, for example, by singular value decomposition. In some such examples, involve producing the rotation matrix may involve performing a singular value decomposition on the translated and scaled forward alignment matrix and the translated and scaled reverse alignment matrix, e.g., as follows:

$$U\Sigma V = \overrightarrow{\mathbf{X}}^T \overrightarrow{\mathbf{X}}$$

In the foregoing equation, U represents the left-singular vector and V represents the right-singular vector of matrix $\overleftarrow{\mathbf{X}}^T \overleftarrow{\mathbf{X}}$ respectively. Σ represents a matrix of singular values. The foregoing equation yields a rotation matrix $R=VU^T$. The matrix product $VU^T$ yields a rotation matrix such that $R\overleftarrow{\mathbf{X}}$ is optimally rotated to align with $\overrightarrow{X}$.

According to some examples, after determining the rotation matrix $R=VU^T$ alignments may be averaged, e.g., as follows:

$$\overleftrightarrow{\mathbf{X}} = 0.5(\overrightarrow{X} + R\overleftarrow{\mathbf{X}}).$$

In some implementations, producing the final estimate of each audio device location also may involve averaging the estimated audio device locations for each audio device to produce the final estimate of each audio device location. Various disclosed implementations have proven to be robust, even when the DOA data and/or other calculations include significant errors. For example, $\overleftrightarrow{\mathbf{X}}$ contains $$\frac{(N-1)(N-2)}{2}$$

estimates of the same node due to overlapping vertices from multiple triangles. Averaging across common nodes yields a final estimate $\hat{X} \in \mathbb{R}^{M \times 3}$.

Figure 20:
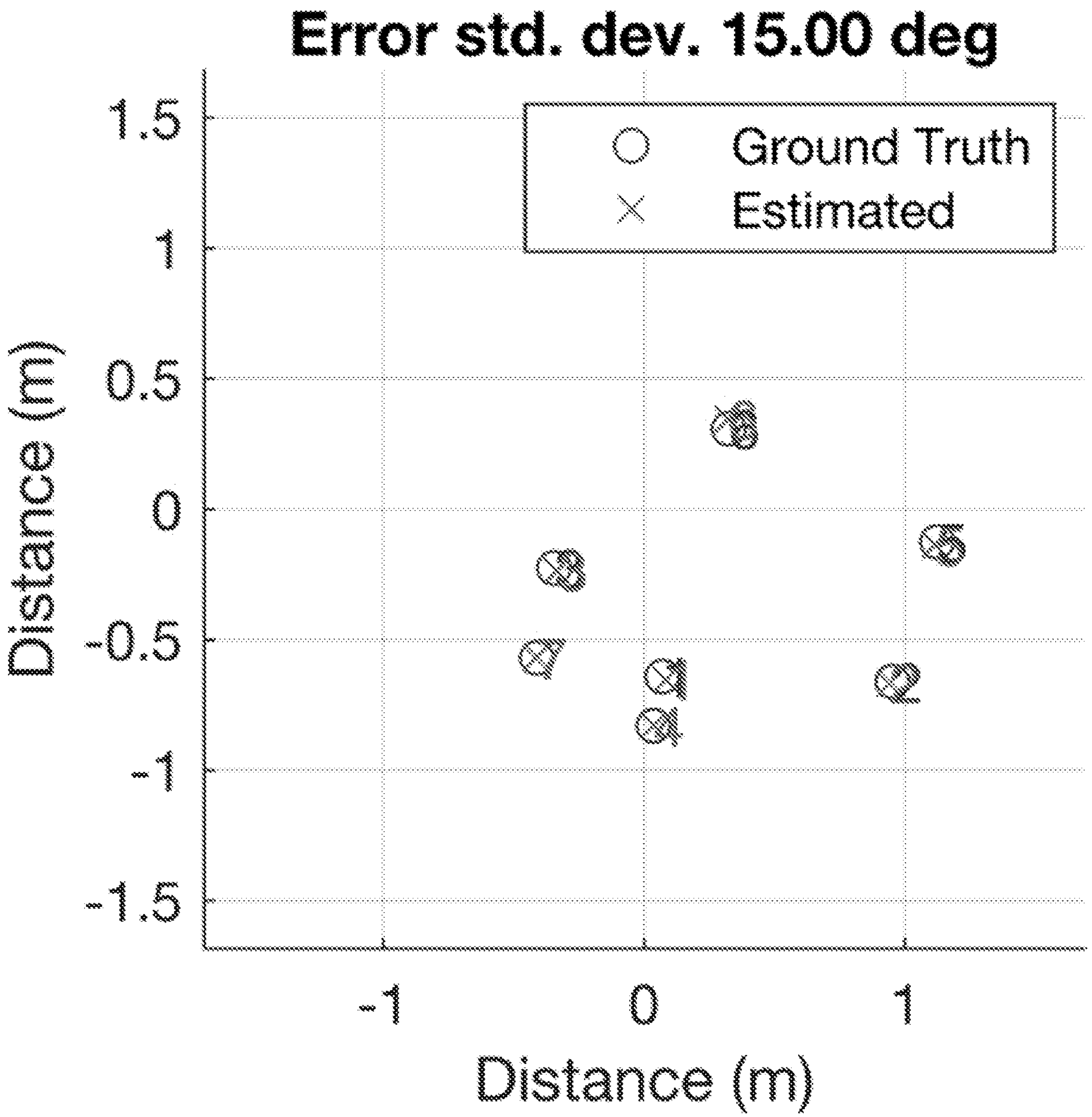
FIG. 20 shows a comparison of estimated and actual audio device locations.

FIG. 20 shows a comparison of estimated and actual audio device locations. In the example shown in FIG. 20, the audio device locations correspond to those that were estimated during the forward and reverse alignment processes that are described above with reference to FIGS. 17 and 19. In these examples, the errors in the DOA estimations had a standard deviation of 15 degrees. Nonetheless, the final estimates of each audio device location (each of which is represented by an "x" in FIG. 20) correspond well with the actual audio device locations (each of which is represented by a circle in FIG. 20).

Much of the foregoing discussion involves audio device auto-location. The following discussion expands upon some methods of determining listener location and listener angular orientation that are described briefly above. In the foregoing description, the term "rotation" is used in essentially the same way as the term "orientation" is used in the following description. For example, the above-referenced "rotation" may refer to a global rotation of the final speaker geometry, not the rotation of the individual triangles during the process that is described above with reference to FIG. 14 et seq. This global rotation or orientation may be resolved with reference to a listener angular orientation, e.g., by the direction in which the listener is looking, by the direction in which the listener's nose is pointing, etc.

Various satisfactory methods for estimating listener location are described below. However, estimating the listener angular orientation can be challenging. Some relevant methods are described in detail below.

Determining listener location and listener angular orientation can enable some desirable features, such as orienting located audio devices relative to the listener. Knowing the listener position and angular orientation allows a determination of, e.g., which speakers within an environment would be in the front, which are in the back, which are near the center (if any), etc., relative to the listener.

After making a correlation between audio device locations and a listener's location and orientation, some implementations may involve providing the audio device location data, the audio device angular orientation data, the listener location data and the listener angular orientation data to an audio rendering system. Alternatively, or additionally, some implementations may involve an audio data rendering process that is based, at least in part, on the audio device location data, the audio device angular orientation data, the listener location data and the listener angular orientation data.

Figure 21:
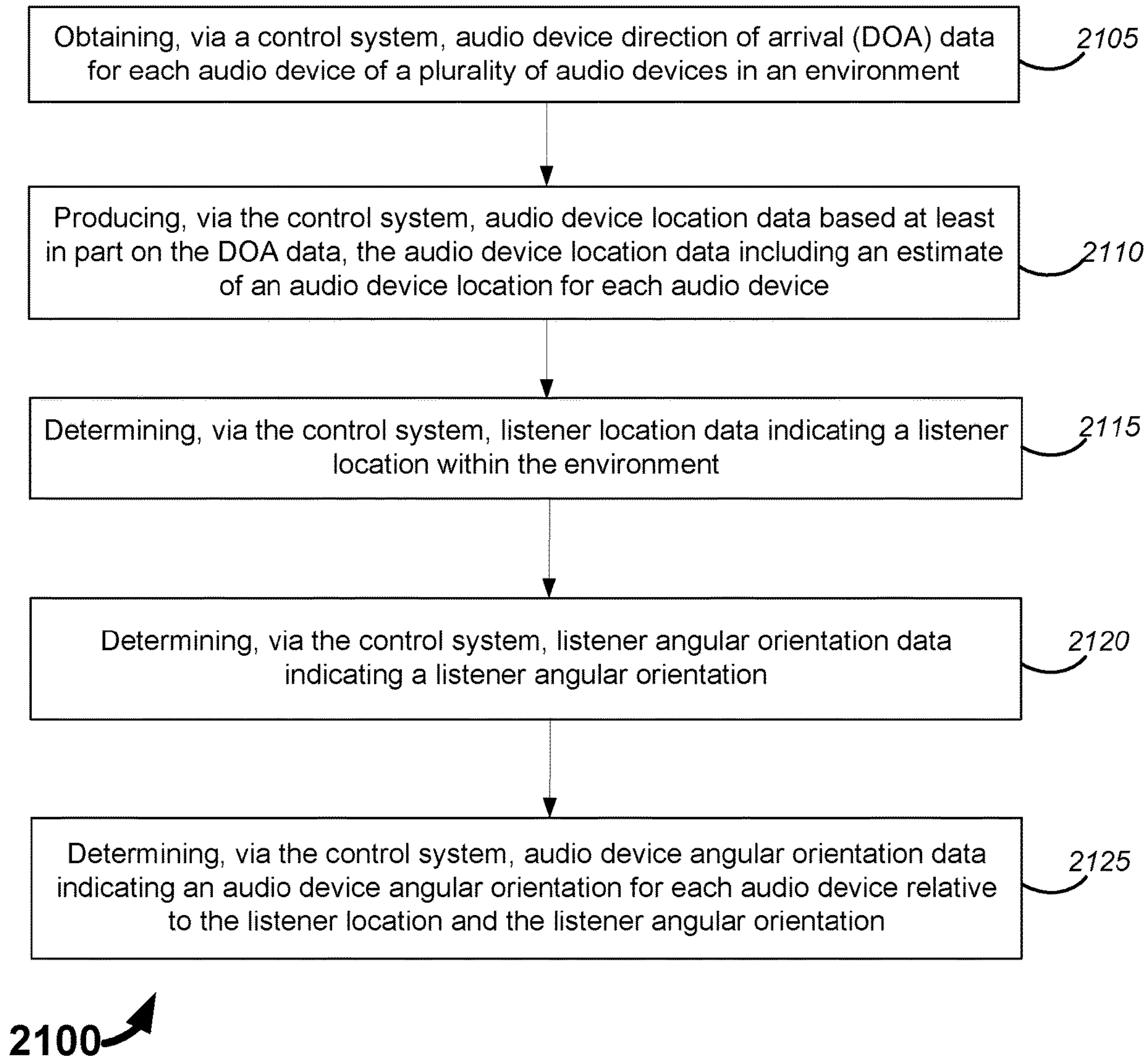
FIG. 21 is a flow diagram that outlines another example of a method that may be performed by an apparatus such as that shown in FIG. 1.

FIG. 21 is a flow diagram that outlines one example of a method that may be performed by an apparatus such as that shown in FIG. 1. The blocks of method 2100, like other methods described herein, are not necessarily performed in the order indicated. Moreover, such methods may include more or fewer blocks than shown and/or described. In this example, the blocks of method 2100 are performed by a control system, which may be (or may include) the control system 110 shown in FIG. 1. As noted above, in some implementations the control system 110 may reside in a single device, whereas in other implementations the control system 110 may reside in two or more devices.

In this example, block 1205 involves obtaining direction of arrival (DOA) data for each audio device of a plurality of audio devices in an environment. In some examples, the plurality of audio devices may include all of the audio devices in an environment, such as all of the audio devices 1105 shown in FIG. 11.

However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. In some examples, the DOA data may be obtained by controlling each loudspeaker of a plurality of loudspeakers in the environment to reproduce a test signal. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to the example shown in FIG. 21, block 2110 involves producing, via the control system, audio device location data based at least in part on the DOA data. In this example, the audio device location data includes an estimate of an audio device location for each audio device referenced in block 2105.

The audio device location data may, for example, be (or include) coordinates of a coordinate system, such as a Cartesian, spherical or cylindrical coordinate system. The coordinate system may be referred to herein as an audio device coordinate system. In some such examples, the audio device coordinate system may be oriented with reference to one of the audio devices in the environment. In other examples, the audio device coordinate system may be oriented with reference to an axis defined by a line between two of the audio devices in the environment. However, in other examples the audio device coordinate system may be oriented with reference to another part of the environment, such as a television, a wall of a room, etc.

In some examples, block 2110 may involve the processes described above with reference to FIG. 14. According to some such examples, block 2110 may involve determining interior angles for each of a plurality of triangles based on the DOA data. In some instances, each triangle of the plurality of triangles may have vertices that correspond with audio device locations of three of the audio devices. Some such methods may involve determining a side length for each side of each of the triangles based, at least in part, on the interior angles.

Some such methods may involve performing a forward alignment process of aligning each of the plurality of triangles in a first sequence, to produce a forward alignment matrix. Some such methods may involve performing a reverse alignment process of aligning each of the plurality of triangles in a second sequence that is the reverse of the first sequence, to produce a reverse alignment matrix. Some such methods may involve producing a final estimate of each audio device location based, at least in part, on values of the forward alignment matrix and values of the reverse alignment matrix. However, in some implementations of method 2100 block 2110 may involve applying methods other than those described above with reference to FIG. 14.

In this example, block 2115 involves determining, via the control system, listener location data indicating a listener location within the environment. The listener location data may, for example, be with reference to the audio device coordinate system. However, in other examples the coordinate system may be oriented with reference to the listener or to a part of the environment, such as a television, a wall of a room, etc.

In some examples, block 2115 may involve prompting the listener (e.g., via an audio prompt from one or more loudspeakers in the environment) to make one or more utterances and estimating the listener location according to DOA data. The DOA data may correspond to microphone data obtained by a plurality of microphones in the environment. The microphone data may correspond with detections of the one or more utterances by the microphones. At least some of the microphones may be co-located with loudspeakers. According to some examples, block 2115 may involve a triangulation process. For example, block 2115 may involve triangulating the user's voice by finding the point of intersection between DOA vectors passing through the audio devices, e.g., as described below with reference to FIG. 22A. According to some implementations, block 2115 (or another operation of the method 2100) may involve co-locating the origins of the audio device coordinate system and the listener coordinate system, which is after the listener location is determined. Co-locating the origins of the audio device coordinate system and the listener coordinate system may involve transforming the audio device locations from the audio device coordinate system to the listener coordinate system.

According to this implementation, block 2120 involves determining, via the control system, listener angular orientation data indicating a listener angular orientation. The listener angular orientation data may, for example, be made with reference to a coordinate system that is used to represent the listener location data, such as the audio device coordinate system. In some such examples, the listener angular orientation data may be made with reference to an origin and/or an axis of the audio device coordinate system.

However, in some implementations the listener angular orientation data may be made with reference to an axis defined by the listener location and another point in the environment, such as a television, an audio device, a wall, etc. In some such implementations, the listener location may be used to define the origin of a listener coordinate system. The listener angular orientation data may, in some such examples, be made with reference to an axis of the listener coordinate system.

Various methods for performing block 2120 are disclosed herein. According to some examples, the listener angular orientation may correspond to a listener viewing direction. In some such examples the listener viewing direction may be inferred with reference to the listener location data, e.g., by assuming that the listener is viewing a particular object, such as a television. In some such implementations, the listener viewing direction may be determined according to the listener location and a television location. Alternatively, or additionally, the listener viewing direction may be determined according to the listener location and a television soundbar location.

However, in some examples the listener viewing direction may be determined according to listener input. According to some such examples, the listener input may include inertial sensor data received from a device held by the listener. The listener may use the device to point at location in the environment, e.g., a location corresponding with a direction in which the listener is facing. For example, the listener may use the device to point to a sounding loudspeaker (a loudspeaker that is reproducing a sound). Accordingly, in such examples the inertial sensor data may include inertial sensor data corresponding to the sounding loudspeaker.

In some such instances, the listener input may include an indication of an audio device selected by the listener. The indication of the audio device may, in some examples, include inertial sensor data corresponding to the selected audio device.

However, in other examples the indication of the audio device may be made according to one or more utterances of the listener (e.g., "the television is in front of me now." "speaker 2 is in front of me now," etc.). Other examples of determining listener angular orientation data according to one or more utterances of the listener are described below.

According to the example shown in FIG. 21, block 2125 involves determining, via the control system, audio device angular orientation data indicating an audio device angular orientation for each audio device relative to the listener location and the listener angular orientation. According to some such examples, block 2125 may involve a rotation of audio device coordinates around a point defined by the listener location. In some implementations, block 2125 may involve a transformation of the audio device location data from an audio device coordinate system to a listener coordinate system. Some examples are described below.

Figure 22A:
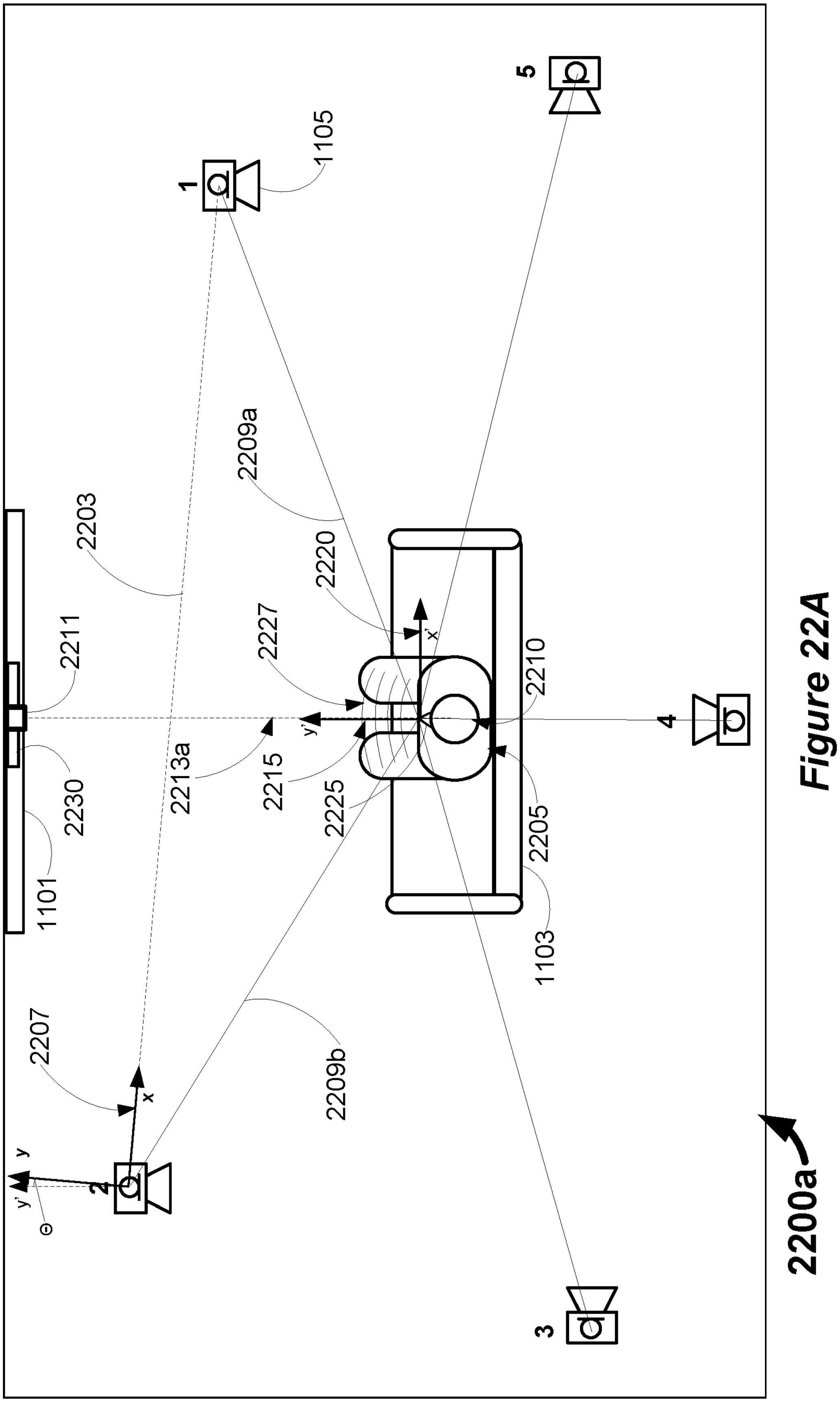
FIG. 22A shows examples of some blocks of FIG. 21.

FIG. 22A shows examples of some blocks of FIG. 21. According to some such examples, the audio device location data includes an estimate of an audio device location for each of audio devices 1-5, with reference to the audio device coordinate system 2207. In this implementation, the audio device coordinate system 2207 is a Cartesian coordinate system having the location of the microphone of audio device 2 as its origin. Here, the x axis of the audio device coordinate system 2207 corresponds with a line 2203 between the location of the microphone of audio device 2 and the location of the microphone of audio device 1.

In this example, this example, the listener location is determined by prompting the listener 2205 who is shown seated on the couch 1103 (e.g., via an audio prompt from one or more loudspeakers in the environment 2200*a*) to make one or more utterances 2227 and estimating the listener location according to time-of-arrival (TOA) data. The TOA data corresponds to microphone data obtained by a plurality of microphones in the environment. In this example, the microphone data corresponds with detections of the one or more utterances 2227 by the microphones of at least some (e.g., 3, 4 or all 5) of the audio devices 1-5.

Alternatively, or additionally, the listener location according to DOA data provided by the microphones of at least some (e.g., 2, 3, 4 or all 5) of the audio devices 1-5. According to some such examples, the listener location may be determined according to the intersection of lines 2209*a*, 2209*b*, etc., corresponding to the DOA data.

According to this example, the listener location corresponds with the origin of the listener coordinate system 2220. In this example, the listener angular orientation data is indicated by the y' axis of the listener coordinate system 2220, which corresponds with a line 2213*a* between the listener's head 2210 (and/or the listener's nose 2225) and the sound bar 2230 of the television 101. In the example shown in FIG. 22A, the line 2213*a* is parallel to the y' axis. Therefore, the angle ⊖ represents the angle between the y axis and the y' axis. In this example, block 2125 of FIG. 21 may involve a rotation by the angle ⊖ of audio device coordinates around the origin of the listener coordinate system 2220. Accordingly, although the origin of the audio device coordinate system 2207 is shown to correspond with audio device 2 in FIG. 22A, some implementations involve co-locating the origin of the audio device coordinate system 2207 with the origin of the listener coordinate system 2220 prior to the rotation by the angle ⊖ of audio device coordinates around the origin of the listener coordinate system 2220. This co-location may be performed by a coordinate transformation from the audio device coordinate system 2207 to the listener coordinate system 2220.

The location of the sound bar 2230 and/or the television 101 may, in some examples, be determined by causing the sound bar to emit a sound and estimating the sound bar's location according to DOA and/or TOA data, which may correspond detections of the sound by the microphones of at least some (e.g., 3, 4 or all 5) of the audio devices 1-5. Alternatively, or additionally, the location of the sound bar 2230 and/or the television 1101 may be determined by prompting the user to walk up to the TV and locating the user's speech by DOA and/or TOA data, which may correspond detections of the sound by the microphones of at least some (e.g., 3, 4 or all 5) of the audio devices 1-5. Such methods may involve triangulation. Such examples may be beneficial in situations wherein the sound bar 2230 and/or the television 101 has no associated microphone.

In some other examples wherein the sound bar 2230 and/or the television 101 does have an associated microphone, the location of the sound bar 2230 and/or the television 101 may be determined according to TOA or DOA methods, such as the DOA methods disclosed herein. According to some such methods, the microphone may be co-located with the sound bar 2230.

According to some implementations, the sound bar 2230 and/or the television 101 may have an associated camera 2211. A control system may be configured to capture an image of the listener's head 2210 (and/or the listener's nose 2225). In some such examples, the control system may be configured to determine a line 2213*a* between the listener's head 2210 (and/or the listener's nose 2225) and the camera 2211. The listener angular orientation data may correspond with the line 2213*a*. Alternatively, or additionally, the control system may be configured to determine an angle ⊖ between the line 2213*a* and the y axis of the audio device coordinate system.

Figure 22B:
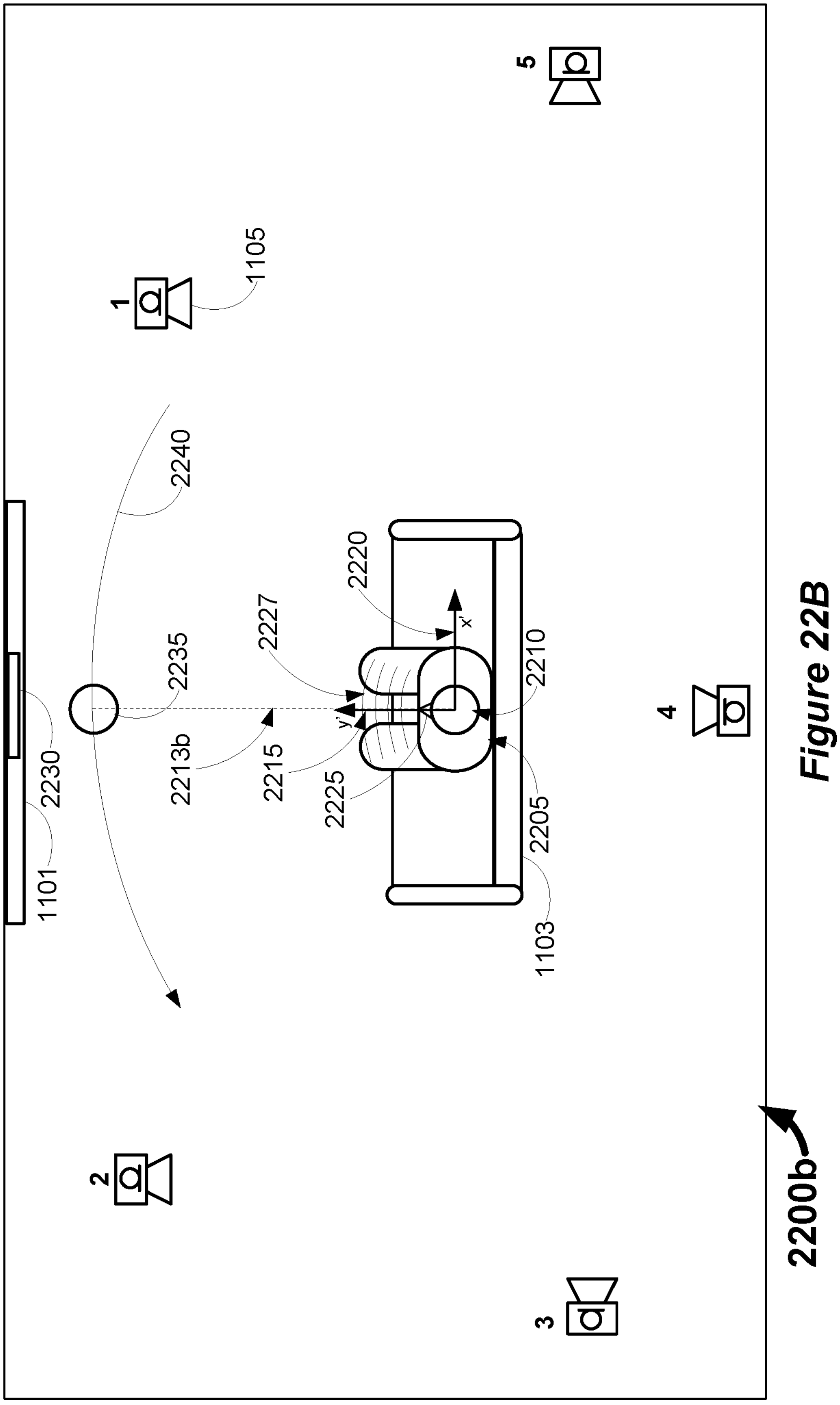
FIG. 22B shows an additional example of determining listener angular orientation data.

FIG. 22B shows an additional example of determining listener angular orientation data. According to this example, the listener location has already been determined in block 2115 of FIG. 21. Here, a control system is controlling loudspeakers of the environment 2200*b* to render the audio object 2235 to a variety of locations within the environment 2200*b*. In some such examples, the control system may cause the loudspeakers to render the audio object 2235 such that the audio object 2235 seems to rotate around the listener 2205, e.g., by rendering the audio object 2235 such that the audio object 2235 seems to rotate around the origin of the listener coordinate system 2220. In this example, the curved arrow 2240 shows a portion of the trajectory of the audio object 2235 as it rotates around the listener 2205.

According to some such examples, the listener 2205 may provide user input (e.g., saying "Stop") indicating when the audio object 2235 is in the direction that the listener 2205 is facing. In some such examples, the control system may be configured to determine a line 2213*b* between the listener location and the location of the audio object 2235. In this example, the line 2213*b* corresponds with the y' axis of the listener coordinate system, which indicates the direction that the listener 2205 is facing. In alternative implementations, the listener 2205 may provide user input indicating when the audio object 2235 is in the front of the environment, at a TV location of the environment, at an audio device location, etc.

Figure 22C:
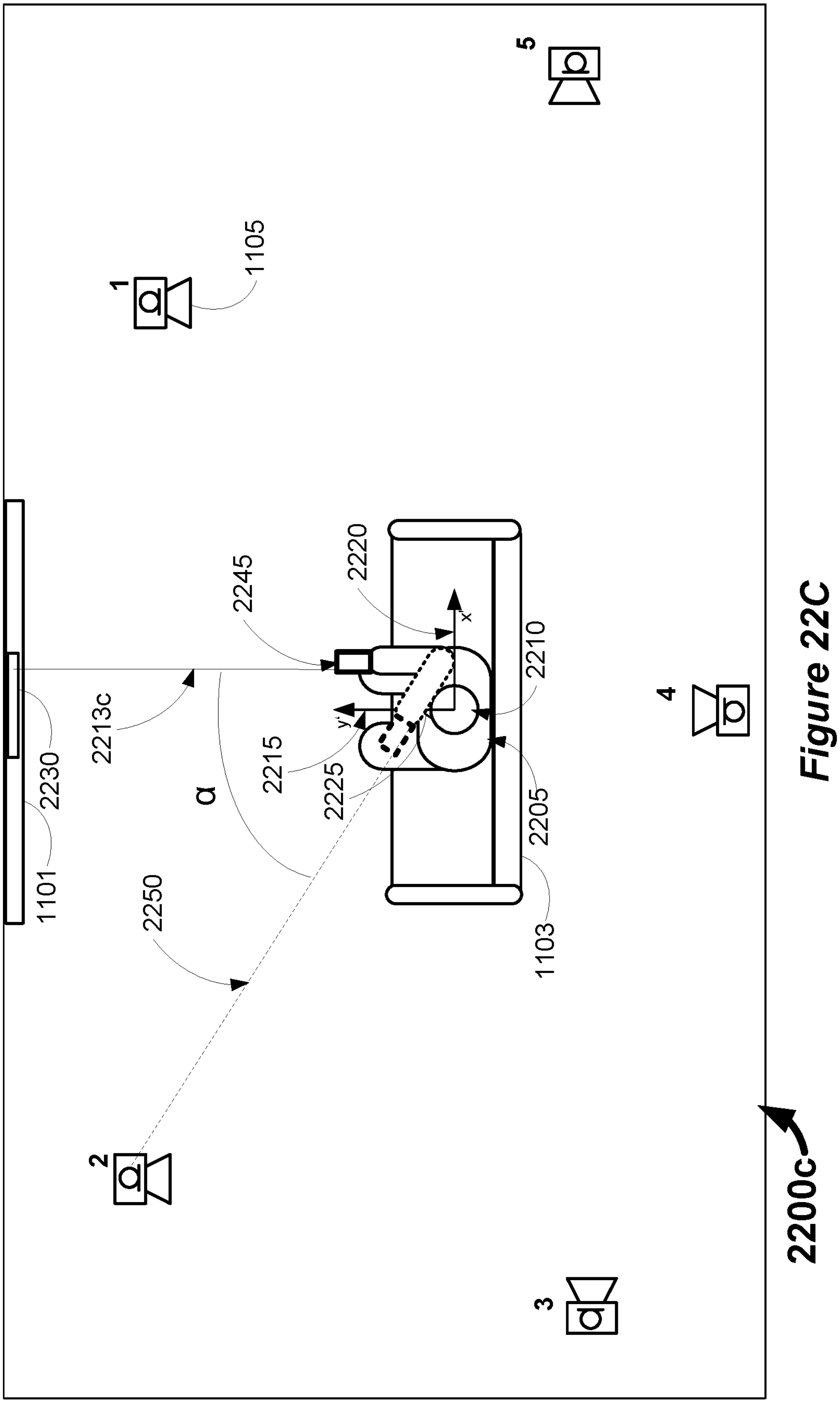
FIG. 22C shows an additional example of determining listener angular orientation data.

FIG. 22C shows an additional example of determining listener angular orientation data. According to this example, the listener location has already been determined in block 2115 of FIG. 21. Here, the listener 2205 is using a handheld device 2245 to provide input regarding a viewing direction of the listener 2205, by pointing the handheld device 2245 towards the television 101 or the soundbar 2230. The dashed outline of the handheld device 2245 and the listener's arm indicate that at a time prior to the time at which the listener 2205 was pointing the handheld device 2245 towards the television 101 or the soundbar 2230, the listener 2205 was pointing the handheld device 2245 towards audio device 2 in this example. In other examples, the listener 2205 may have pointed the handheld device 2245 towards another audio device, such as audio device 1. According to this example, the handheld device 2245 is configured to determine an angle α between audio device 2 and the television 101 or the soundbar 2230, which approximates the angle between audio device 2 and the viewing direction of the listener 2205.

The handheld device 2245 may, in some examples, be a cellular telephone that includes an inertial sensor system and a wireless interface configured for communicating with a control system that is controlling the audio devices of the environment 2200*c*. In some examples, the handheld device 2245 may be running an application or "app" that is configured to control the handheld device 2245 to perform the necessary functionality, e.g., by providing user prompts (e.g., via a graphical user interface), by receiving input indicating that the handheld device 2245 is pointing in a desired direction, by saving the corresponding inertial sensor data and/or transmitting the corresponding inertial sensor data to the control system that is controlling the audio devices of the environment 2200*c*, etc.

According to this example, a control system (which may be a control system of the handheld device 2245 or a control system that is controlling the audio devices of the environment 2200*c*) is configured to determine the orientation of lines 2213*c* and 2250 according to the inertial sensor data, e.g., according to gyroscope data. In this example, the line 2213*c* is parallel to the axis y' and may be used to determine the listener angular orientation. According to some examples, a control system may determine an appropriate rotation for the audio device coordinates around the origin of the listener coordinate system 2220 according to the angle $\alpha$ between audio device 2 and the viewing direction of the listener 2205.

Figure 22D:
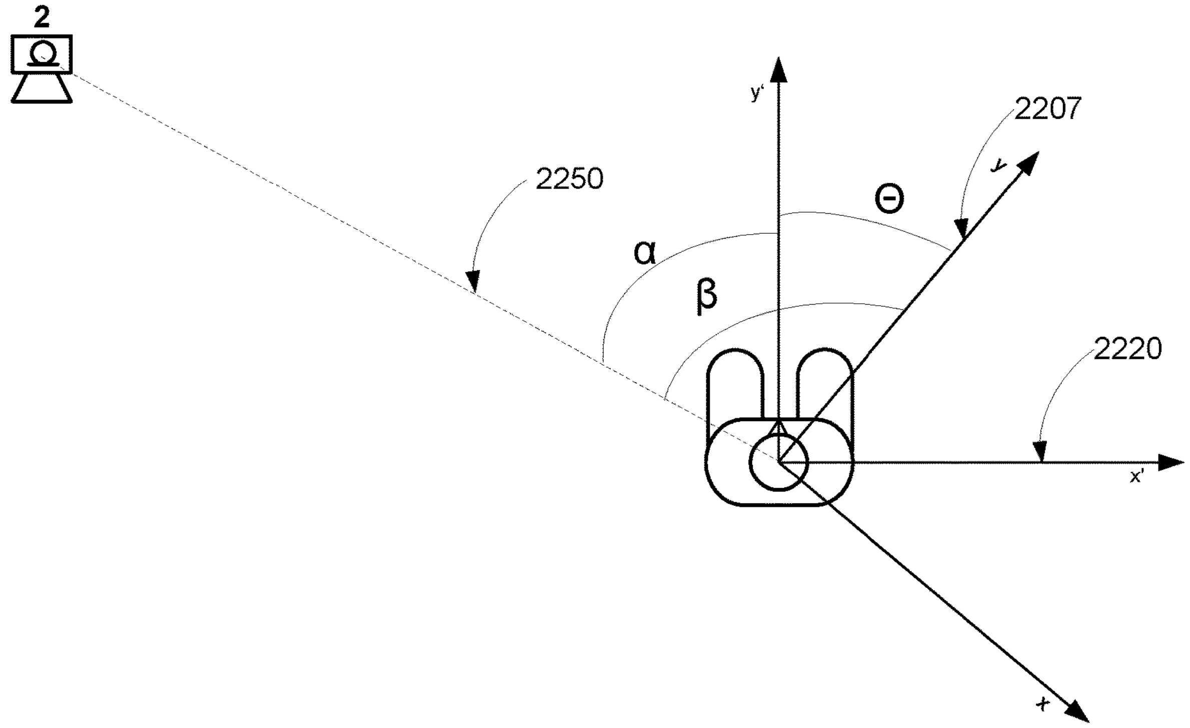
FIG. 22D shows an example of determining an appropriate rotation for the audio device coordinates in accordance with the method described with reference to FIG. 22C.

FIG. 22D shows an example of determining an appropriate rotation for the audio device coordinates in accordance with the method described with reference to FIG. 22C. In this example, the origin of the audio device coordinate system 2207 is co-located with the origin of the listener coordinate system 2220. Co-locating the origins of the audio device coordinate system 2207 and the listener coordinate system 2220 is made possible after the process of 2115, wherein the listener location is determined. Co-locating the origins of the audio device coordinate system 2207 and the listener coordinate system 2220 may involve transforming the audio device locations from the audio device coordinate system 2207 to the listener coordinate system 2220. The angle $\alpha$ has been determined as described above with reference to FIG. 22C. Accordingly, the angle $\alpha$ corresponds with the desired orientation of the audio device 2 in the listener coordinate system 2220. In this example, the angle $\beta$ corresponds with the orientation of the audio device 2 in the audio device coordinate system 2207. The angle $\ominus$, which is $\beta$-$\alpha$ in this example, indicates the necessary rotation to align the y axis of the of the audio device coordinate system 2207 with the y' axis of the listener coordinate system 2220.

In some implementations, the method of FIG. 21 may involve controlling at least one of the audio devices in the environment based at least in part on a corresponding audio device location, a corresponding audio device angular orientation, the listener location data and the listener angular orientation data.

For example, some implementations may involve providing the audio device location data, the audio device angular orientation data, the listener location data and the listener angular orientation data to an audio rendering system. In some examples, the audio rendering system may be implemented by a control system, such as the control system 110 of FIG. 1. Some implementations may involve controlling an audio data rendering process based, at least in part, on the audio device location data, the audio device angular orientation data, the listener location data and the listener angular orientation data. Some such implementations may involve providing loudspeaker acoustic capability data to the rendering system. The loudspeaker acoustic capability data may correspond to one or more loudspeakers of the environment. The loudspeaker acoustic capability data may indicate an orientation of one or more drivers, a number of drivers or a driver frequency response of one or more drivers. In some examples, the loudspeaker acoustic capability data may be retrieved from a memory and then provided to the rendering system.

A class of embodiments involve methods for rendering audio for playback, and/or playback of the audio, by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some (i.e., by speaker(s) of all or some) of the smart audio devices. Many interactions with the system are contemplated which require dynamic modifications to the rendering and/or playback. Such modifications may be, but are not necessarily, focused on spatial fidelity.

Some embodiments implement rendering for playback, and/or playback, by speaker(s) of a plurality of smart audio devices that are coordinated (orchestrated). Other embodiments implement rendering for playback, and/or playback, by speaker(s) of another set of speakers.

Some embodiments (e.g., a rendering system or renderer, or a rendering method, or a playback system or method) pertain to systems and methods for rendering audio for playback, and/or playback, by some or all speakers (i.e., each activated speaker) of a set of speakers. In some embodiments, the speakers are speakers of a coordinated (orchestrated) set of smart audio devices.

Many embodiments are technologically possible. It will be apparent to those of ordinary skill in the art from the present disclosure how to implement them. Some embodiments of the disclosed system and method are described herein.

Some aspects of the present disclosure include a system or device configured (e.g., programmed) to perform any embodiment of the disclosed method, and a tangible computer readable medium (e.g., a disc) which stores code for implementing any embodiment of the disclosed method or steps thereof. For example, the disclosed system can be or include a programmable general purpose processor, digital signal processor, or microprocessor, programmed with software or firmware and/or otherwise configured to perform any of a variety of operations on data, including an embodiment of the disclosed method or steps thereof. Such a general purpose processor may be or include a computer system including an input device, a memory, and a processing subsystem that is programmed (and/or otherwise configured) to perform an embodiment of the disclosed method (or steps thereof) in response to data asserted thereto.

Some embodiments of the disclosed system are implemented as a configurable (e.g., programmable) digital signal processor (DSP) that is configured (e.g., programmed and otherwise configured) to perform required processing on audio signal(s), including performance of an embodiment of the disclosed method. Alternatively, embodiments of the disclosed system (or elements thereof) are implemented as a general purpose processor (e.g., a personal computer (PC) or other computer system or microprocessor, which may include an input device and a memory) which is programmed with software or firmware and/or otherwise configured to perform any of a variety of operations including an embodiment of the disclosed method. Alternatively, elements of some embodiments of the disclosed system are implemented as a general purpose processor or DSP configured (e.g., programmed) to perform an embodiment of the disclosed method, and the system also includes other elements (e.g., one or more loudspeakers and/or one or more microphones). A general purpose processor configured to perform an embodiment of the disclosed method would typically be coupled to an input device (e.g., a mouse and/or a keyboard), a memory, and a display device.

Another aspect of the present disclosure is a computer readable medium (for example, a disc or other tangible storage medium) which stores code for performing (e.g., coder executable to perform) any embodiment of the disclosed method or steps thereof.

While specific embodiments and applications have been described herein, it will be apparent to those of ordinary skill in the art that many variations on the embodiments and applications described herein are possible without departing from the scope of the embodiments described and claimed herein. It should be understood that while certain embodiments have been shown and described, the present disclosure is not to be limited to the specific embodiments described and shown or the specific methods described.

The invention claimed is:

1. An audio processing system, comprising:

an interface system; and a control system configured for:

receiving audio data via the interface system, the audio data including one or more audio signals and associated spatial data, the spatial data indicating an intended perceived spatial position corresponding to an audio signal, the spatial data including at least one of channel data or spatial metadata;

receiving, via the interface system, a rendering mode indication, wherein receiving the rendering mode indication involves receiving an indication of a number of people in a listening area;

determining a rendering mode based, at least in part, on the number of people in the listening area;

rendering the audio data for reproduction via a set of loudspeakers of an environment according to the rendering mode, to produce rendered audio signals, wherein:

rendering the audio data comprises determining relative activation of the set of loudspeakers in an environment;

the rendering mode is variable between a reference spatial mode and one or more distributed spatial modes;

the reference spatial mode has an assumed listening position and orientation; and in the one or more distributed spatial modes, one or more elements of the audio data is or are each rendered in a more spatially distributed manner than in the reference spatial mode and spatial locations of remaining elements of the audio data are warped such that they span a rendering space of the environment more completely than in the reference spatial mode; and providing, via the interface system, the rendered audio signals to at least some loudspeakers of the set of loudspeakers of the environment.

2. The audio processing system of claim 1, wherein receiving the rendering mode indication involves receiving microphone signals corresponding to a voice command.

3. The audio processing system of claim 1, further comprising a display device and a sensor system proximate the display device, wherein:

the control system is further configured for controlling the display device to present a graphical user interface; and receiving the rendering mode indication involves receiving sensor signals corresponding to user input via the graphical user interface.

4. The audio processing system of claim 3, wherein the sensor signals are touch sensor signals or gesture sensor signals.

5. The audio processing system of claim 1, wherein the indication of the number of people in the listening area is based on at least one of microphone data from a microphone system or image data from a camera system.

6. The audio processing system of claim 1, wherein the rendering mode is selectable from a continuum of rendering modes ranging from the reference spatial mode to a most distributed spatial mode.

7. The audio processing system of claim 1, wherein the control system is further configured to determine the assumed listening position of the reference spatial mode, the assumed listening orientation of the reference spatial mode, or both, according to reference spatial mode data received via the interface system.

8. The audio processing system of claim 7, wherein the reference spatial mode data comprises at least one of microphone data from a microphone system or image data from a camera system.

9. The audio processing system of claim 7, further comprising a display device and a sensor system proximate the display device, wherein:

the control system is further configured for controlling the display device to present a graphical user interface; and receiving reference spatial mode data involves receiving sensor signals corresponding to user input via the graphical user interface.

10. The audio processing system of claim 1, wherein the one or more elements of the audio data each rendered in a more spatially distributed manner correspond to one or more of front sound stage data, music vocals, dialogue, bass, percussion, or other solo or lead instruments.

11. The audio processing system of claim 10, wherein the front sound stage data comprises one or more of the left, right or center signals of audio data received in, or upmixed to, a Dolby 5.1, Dolby 7.1 or Dolby 9.1 format.

12. The audio processing system of claim 10, wherein the front sound stage data comprises audio data received in Dolby Atmos format and having spatial metadata indicating an (x,y) spatial position wherein $y<0.5$.

13. The audio processing system of claim 1, wherein the audio data includes spatial distribution metadata indicating which elements of the audio data are to be rendered in a more spatially distributed manner and wherein the control system is configured for identifying the one or more elements of the audio data to be rendered in a more spatially distributed manner according to the spatial distribution metadata.

14. The audio processing system of claim 1, wherein the control system is configured for implementing a content type classifier to identify the one or more elements of the audio data to be rendered in a more spatially distributed manner.

15. The audio processing system of claim 1, wherein at least one of the one or more distributed spatial modes involves applying a time-varying modification to the spatial location of the at least one element.

16. The audio processing system of claim 15, wherein the time-varying modification is a periodic modification.

17. The audio processing system of claim 16, wherein the periodic modification corresponds with at least one of user input, a tempo of music being reproduced in the environment, a beat of music being reproduced in the environment, or one or more other features of audio data being reproduced in the environment.

18. The audio processing system of claim 1, wherein rendering the one or more elements of the audio data in a more spatially distributed manner than in the reference spatial mode involves creating copies of the one or more elements and rendering all of the copies simultaneously at a distributed set of positions across the environment.

19. The audio processing system of claim 1, wherein the rendering is based on Center of Mass Amplitude Panning, Flexible Virtualization or a combination thereof, and wherein rendering the one or more elements of the audio data in a more spatially distributed manner than in the reference spatial mode involves warping a rendering position of each of the one or more elements towards a zero radius.

20. An audio processing method, comprising:

receiving audio data by a control system and via an interface system, the audio data including one or more audio signals and associated spatial data, the spatial data indicating an intended perceived spatial position corresponding to an audio signal, the spatial data including at least one of channel data or spatial metadata;

determining, by the control system, a rendering mode by implementing a content type classifier to identify one or more elements of the audio data to be rendered in a more spatially distributed manner;

rendering, by the control system, the audio data for reproduction via a set of loudspeakers of an environment according to the rendering mode, to produce rendered audio signals, wherein:

rendering the audio data comprises determining relative activation of a set of loudspeakers in an environment;

the rendering mode is variable between a reference spatial mode and one or more distributed spatial modes;

the reference spatial mode has an assumed listening position and orientation; and in the one or more distributed spatial modes, the one or more elements of the audio data is or are each rendered in a more spatially distributed manner than in the reference spatial mode and spatial locations of remaining elements of the audio data are warped such that they span a rendering space of the environment more completely than in the reference spatial mode; and providing, via the interface system, the rendered audio signals to at least some loudspeakers of the set of loudspeakers of the environment.

21. The audio processing method of claim 20, wherein determining the rendering mode involves receiving, via the interface system, a rendering mode indication.

22. The audio processing method of claim 21, wherein receiving the rendering mode indication involves receiving microphone signals corresponding to a voice command.

23. One or more non-transitory media having software encoded thereon, the software including instructions for controlling one or more devices to perform an audio processing method comprising:

receiving audio data by a control system and via an interface system, the audio data including one or more audio signals and associated spatial data, the spatial data indicating an intended perceived spatial position corresponding to an audio signal, the spatial data including at least one of channel data or spatial metadata;

determining, by the control system, a rendering mode;

rendering, by the control system, the audio data for reproduction via a set of loudspeakers of an environment according to the rendering mode, to produce rendered audio signals, wherein:

rendering the audio data comprises determining relative activation of a set of loudspeakers in an environment;

the rendering mode is variable between a reference spatial mode and one or more distributed spatial modes;

the reference spatial mode has an assumed listening position and orientation; and in the one or more distributed spatial modes, one or more elements of the audio data is or are each rendered in a more spatially distributed manner than in the reference spatial mode and spatial locations of remaining elements of the audio data are warped such that they span a rendering space of the environment more completely than in the reference spatial mode, wherein rendering the one or more elements of the audio data in a more spatially distributed manner than in the reference spatial mode involves creating copies of the one or more elements and rendering all of the copies simultaneously at a distributed set of positions across the environment; and providing, via the interface system, the rendered audio signals to at least some loudspeakers of the set of loudspeakers of the environment.

24. The one or more non-transitory media of claim 23, wherein determining the rendering mode involves receiving, via the interface system, a rendering mode indication.

25. The one or more non-transitory media of claim 24, wherein receiving the rendering mode indication involves receiving microphone signals corresponding to a voice command.

26. An audio processing system, comprising:

an interface system; and a control system configured for:

receiving audio data via the interface system, the audio data including one or more audio signals and associated spatial data, the spatial data indicating an intended perceived spatial position corresponding to an audio signal, the spatial data including at least one of channel data or spatial metadata;

determining a rendering mode;

rendering the audio data for reproduction via a set of loudspeakers of an environment according to the rendering mode, to produce rendered audio signals, wherein:

rendering the audio data comprises determining relative activation of a set of loudspeakers in an environment;

the rendering mode is variable between a reference spatial mode and one or more distributed spatial modes, wherein at least one of the one or more distributed spatial modes involves applying a periodic modification to the spatial location of the at least one element;

the reference spatial mode has an assumed listening position and orientation; and in the one or more distributed spatial modes, one or more elements of the audio data is or are each rendered in a more spatially distributed manner than in the reference spatial mode and spatial locations of remaining elements of the audio data are warped such that they span a rendering space of the environment more completely than in the reference spatial mode;

providing, via the interface system, the rendered audio signals to at least some loudspeakers of the set of loudspeakers of the environment.

27. The audio processing system of claim 26, wherein the periodic modification corresponds with at least one of user input, a tempo of music being reproduced in the environment, a beat of music being reproduced in the environment, or one or more other features of audio data being reproduced in the environment.

28. An audio processing system, comprising:

an interface system; and a control system configured for:

receiving audio data via the interface system, the audio data including one or more audio signals and associated spatial data, the spatial data indicating an intended perceived spatial position corresponding to an audio signal, the spatial data including at least one of channel data or spatial metadata;

determining a rendering mode;

rendering the audio data for reproduction via a set of loudspeakers of an environment according to the rendering mode, to produce rendered audio signals, wherein:

the rendering is based on Center of Mass Amplitude Panning, Flexible Virtualization or a combination thereof;

rendering the audio data comprises determining relative activation of a set of loudspeakers in an environment;

the rendering mode is variable between a reference spatial mode and one or more distributed spatial modes;

the reference spatial mode has an assumed listening position and orientation; and in the one or more distributed spatial modes, one or more elements of the audio data is or are each rendered in a more spatially distributed manner than in the reference spatial mode and spatial locations of remaining elements of the audio data are warped such that they span a rendering space of the environment more completely than in the reference spatial mode;

rendering the one or more elements of the audio data in a more spatially distributed manner than in the reference spatial mode involves warping a rendering position of each of the one or more elements towards a zero radius; and providing, via the interface system, the rendered audio signals to at least some loudspeakers of the set of loudspeakers of the environment.

29. An audio processing system, comprising:

an interface system; and a control system configured for:

receiving audio data via the interface system, the audio data including one or more audio signals and associated spatial data, the spatial data indicating an intended perceived spatial position corresponding to an audio signal, the spatial data including at least one of channel data or spatial metadata;

determining a rendering mode;

rendering the audio data for reproduction via a set of loudspeakers of an environment according to the rendering mode, to produce rendered audio signals, wherein:

rendering the audio data comprises determining relative activation of a set of loudspeakers in an environment;

the rendering mode is variable between a reference spatial mode and one or more distributed spatial modes;

the reference spatial mode has an assumed listening position and orientation; and in the one or more distributed spatial modes, one or more elements of the audio data is or are each rendered in a more spatially distributed manner than in the reference spatial mode and spatial locations of remaining elements of the audio data are warped such that they span a rendering space of the environment more completely than in the reference spatial mode, the one or more elements of the audio data each rendered in a more spatially distributed manner corresponding to one or more of front sound stage data, music vocals, dialogue, bass, percussion, or other solo or lead instruments, the front sound stage data comprising audio data received in Dolby Atmos format and having spatial metadata indicating an (x,y) spatial position wherein $y<0.5$; and providing, via the interface system, the rendered audio signals to at least some loudspeakers of the set of loudspeakers of the environment.

* * * * *